US010769217B2

(12) United States Patent
Clark et al.

(10) Patent No.: US 10,769,217 B2
(45) Date of Patent: Sep. 8, 2020

(54) HARVESTING ADDRESSES

(71) Applicant: Apple Inc., Cupertino, CA (US)

(72) Inventors: Ashley B. Clark, San Francisco, CA (US); Jorge Fino, San Jose, CA (US); Scott Herz, San Jose, CA (US); Emanuele Vulcano, San Francisco, CA (US); Marcel van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/985,847

(22) Filed: May 22, 2018

(65) Prior Publication Data

US 2018/0276300 A1  Sep. 27, 2018

Related U.S. Application Data

(63) Continuation of application No. 14/081,850, filed on Nov. 15, 2013, now abandoned.
(Continued)

(51) Int. Cl.
*G06F 16/951* (2019.01)
*G06F 16/2457* (2019.01)
(Continued)

(52) U.S. Cl.
CPC ............. *G06F 16/951* (2019.01); *G06F 7/26* (2013.01); *G06F 16/24578* (2019.01);
(Continued)

(58) Field of Classification Search
None
See application file for complete search history.

(56) References Cited

U.S. PATENT DOCUMENTS

| 1,102,037 A | 6/1914 | Gibson |
|---|---|---|
| 4,846,836 A | 7/1989 | Reich |

(Continued)

FOREIGN PATENT DOCUMENTS

| AU | 2014235244 A1 | 9/2015 |
|---|---|---|
| AU | 2014235248 A1 | 9/2015 |

(Continued)

OTHER PUBLICATIONS

Moren, "Google unveils free turn-by-turn directions for Android devices," Macworld, http://www.macworld.com/article/1143547/android_turnbyturn.html[Jul. 8, 2016 9:58:56 AM], Oct. 28, 2009 (Year: 2009).*

(Continued)

*Primary Examiner* — Richard L Bowen
(74) *Attorney, Agent, or Firm* — Invoke

(57) ABSTRACT

Some embodiments of the invention provide an address harvester that harvests addresses from one or more applications executing on a device. Some embodiments use the harvested addresses to facilitate the operation of one or more applications executing on the device. Alternatively, or conjunctively, some embodiments use the harvested addresses to facilitate the operation of one or more applications executing on another device than the one used for harvesting the addresses. In some embodiments, a prediction system uses the harvested addresses to formulate predictions, which it then provides to the same set of applications from which it harvested the addresses in some embodiments.

35 Claims, 36 Drawing Sheets

Related U.S. Application Data

(60) Provisional application No. 61/832,850, filed on Jun. 8, 2013.

(51) Int. Cl.

| | | |
|---|---|---|
| G06F 7/26 | (2006.01) | |
| G01C 21/36 | (2006.01) | |
| H04L 29/08 | (2006.01) | |
| H04W 4/02 | (2018.01) | |

(52) U.S. Cl.
CPC .......... *G01C 21/3617* (2013.01); *H04L 67/22* (2013.01); *H04W 4/025* (2013.01)

(56) References Cited

U.S. PATENT DOCUMENTS

| | | | |
|---|---|---|---|
| 4,914,605 A | 4/1990 | Loughmiller et al. | |
| 5,289,572 A | 2/1994 | Yano et al. | |
| 5,459,667 A | 10/1995 | Odagaki et al. | |
| 5,654,892 A | 8/1997 | Fujii et al. | |
| 6,101,443 A | 8/2000 | Kato et al. | |
| 6,321,158 B1 | 11/2001 | Delorme et al. | |
| 6,321,161 B1 | 11/2001 | Herbst et al. | |
| 6,322,538 B1 | 11/2001 | Elbert et al. | |
| 6,480,783 B1 | 11/2002 | Myr | |
| 6,615,130 B2 | 9/2003 | Myr | |
| 6,653,948 B1 | 11/2003 | Kunimatsu et al. | |
| 6,710,774 B1 | 3/2004 | Kawasaki et al. | |
| 6,764,518 B2 | 7/2004 | Godin | |
| 6,845,776 B2 | 1/2005 | Stack et al. | |
| 6,847,889 B2 | 1/2005 | Park et al. | |
| 6,862,524 B1 | 3/2005 | Nagda et al. | |
| 6,960,233 B1 | 11/2005 | Berg et al. | |
| 7,149,625 B2 | 12/2006 | Mathews et al. | |
| 7,158,878 B2 | 1/2007 | Rasmussen et al. | |
| 7,200,394 B2 | 4/2007 | Aoki et al. | |
| 7,254,580 B1* | 8/2007 | Gharachorloo ..... G06F 16/2471 | |
| 7,274,311 B1 | 9/2007 | Macleod | |
| 7,469,827 B2 | 12/2008 | Katragadda et al. | |
| 7,552,009 B2 | 6/2009 | Nelson | |
| 7,555,525 B2 | 6/2009 | Malik | |
| 7,555,725 B2 | 6/2009 | Abramson et al. | |
| 7,634,463 B1 | 12/2009 | Katragadda et al. | |
| 7,702,456 B2 | 4/2010 | Singh | |
| 7,708,684 B2 | 5/2010 | Demarais et al. | |
| 7,729,854 B2 | 6/2010 | Muramatsu | |
| 7,831,384 B2 | 11/2010 | Bill | |
| 7,846,174 B2 | 12/2010 | Baker et al. | |
| 7,860,645 B2 | 12/2010 | Kim et al. | |
| 7,885,761 B2 | 2/2011 | Tajima et al. | |
| 7,917,288 B2 | 3/2011 | Cheung et al. | |
| 7,925,427 B2 | 4/2011 | Zehler | |
| 7,981,162 B2 | 7/2011 | Stack et al. | |
| 8,020,104 B2 | 9/2011 | Robarts et al. | |
| 8,078,397 B1 | 12/2011 | Zilka | |
| 8,100,931 B2 | 1/2012 | Baker et al. | |
| 8,190,326 B2 | 5/2012 | Nezu et al. | |
| 8,205,157 B2 | 6/2012 | Van et al. | |
| 8,255,830 B2 | 8/2012 | Ording et al. | |
| 8,355,862 B2 | 1/2013 | Matas et al. | |
| 8,370,736 B2 | 2/2013 | Ording et al. | |
| 8,423,052 B2 | 4/2013 | Ueda et al. | |
| 8,428,871 B1 | 4/2013 | Matthews et al. | |
| 8,463,289 B2 | 6/2013 | Shklarski et al. | |
| 8,464,182 B2 | 6/2013 | Blumenberg et al. | |
| 8,509,816 B2 | 8/2013 | Branch et al. | |
| 8,510,665 B2 | 8/2013 | Ording et al. | |
| 8,529,431 B2 | 9/2013 | Baker et al. | |
| 8,564,544 B2 | 10/2013 | Jobs et al. | |
| 8,584,050 B2 | 11/2013 | Ording et al. | |
| 8,606,516 B2 | 12/2013 | Vertelney et al. | |
| 8,607,167 B2 | 12/2013 | Matas et al. | |
| 8,639,654 B2 | 1/2014 | Vervaet et al. | |
| 8,694,791 B1 | 4/2014 | Rohrweck et al. | |
| 8,745,018 B1 | 6/2014 | Singleton et al. | |
| 8,756,534 B2 | 6/2014 | Ording et al. | |
| 8,762,048 B2 | 6/2014 | Kosseifi et al. | |
| 8,798,918 B2 | 8/2014 | Onishi et al. | |
| 8,825,362 B2 | 9/2014 | Kirsch | |
| 8,825,381 B2 | 9/2014 | Tang | |
| 8,849,564 B2 | 9/2014 | Mutoh | |
| 8,881,060 B2 | 11/2014 | Chaudhri et al. | |
| 8,881,061 B2 | 11/2014 | Chaudhri et al. | |
| 8,886,398 B2 | 11/2014 | Kato et al. | |
| 8,918,736 B2 | 12/2014 | Jobs et al. | |
| 8,954,524 B1 | 2/2015 | Hamon | |
| 9,043,150 B2 | 5/2015 | Forstall et al. | |
| 9,060,844 B2 | 6/2015 | Kagan et al. | |
| 9,170,122 B2 | 10/2015 | Moore et al. | |
| 9,200,915 B2 | 12/2015 | Vulcano et al. | |
| 9,223,494 B1 | 12/2015 | Desalvo et al. | |
| 9,317,813 B2* | 4/2016 | McGavran ......... G01C 21/3617 | |
| 9,326,058 B2 | 4/2016 | Tachibana et al. | |
| 9,347,787 B2 | 5/2016 | Moore et al. | |
| 9,500,492 B2 | 11/2016 | Moore et al. | |
| 2001/0056325 A1 | 12/2001 | Pu et al. | |
| 2003/0040808 A1 | 2/2003 | Stack et al. | |
| 2003/0093117 A1 | 5/2003 | Saadat | |
| 2003/0156097 A1 | 8/2003 | Kakihara et al. | |
| 2004/0009815 A1 | 1/2004 | Zotto et al. | |
| 2004/0070602 A1 | 4/2004 | Kobuya et al. | |
| 2004/0092892 A1 | 5/2004 | Kagan et al. | |
| 2004/0128066 A1 | 7/2004 | Kudo et al. | |
| 2004/0138761 A1 | 7/2004 | Stack et al. | |
| 2004/0143342 A1 | 7/2004 | Stack et al. | |
| 2004/0158395 A1 | 8/2004 | Yamada et al. | |
| 2004/0160342 A1 | 8/2004 | Curley et al. | |
| 2004/0172141 A1 | 9/2004 | Stack et al. | |
| 2004/0193371 A1 | 9/2004 | Koshiji et al. | |
| 2004/0220682 A1 | 11/2004 | Levine et al. | |
| 2004/0236498 A1 | 11/2004 | Le et al. | |
| 2005/0096673 A1 | 5/2005 | Stack et al. | |
| 2005/0096750 A1 | 5/2005 | Kagan et al. | |
| 2005/0125148 A1 | 6/2005 | Van et al. | |
| 2005/0131631 A1 | 6/2005 | Nakano et al. | |
| 2005/0149261 A9 | 7/2005 | Lee et al. | |
| 2005/0177181 A1 | 8/2005 | Kagan et al. | |
| 2005/0192629 A1 | 9/2005 | Saadat et al. | |
| 2005/0247320 A1 | 11/2005 | Stack et al. | |
| 2005/0251324 A1 | 11/2005 | Wiener et al. | |
| 2005/0273251 A1 | 12/2005 | Nix et al. | |
| 2005/0273252 A1 | 12/2005 | Nix et al. | |
| 2006/0004680 A1 | 1/2006 | Robarts et al. | |
| 2006/0015246 A1 | 1/2006 | Hui | |
| 2006/0025925 A1 | 2/2006 | Fushiki et al. | |
| 2006/0041372 A1 | 2/2006 | Kubota et al. | |
| 2006/0074553 A1 | 4/2006 | Foo et al. | |
| 2006/0155375 A1 | 7/2006 | Kagan et al. | |
| 2006/0155431 A1 | 7/2006 | Berg et al. | |
| 2006/0161440 A1 | 7/2006 | Nakayama et al. | |
| 2006/0173841 A1 | 8/2006 | Bill | |
| 2006/0195257 A1 | 8/2006 | Nakamura | |
| 2006/0206063 A1 | 9/2006 | Kagan et al. | |
| 2006/0252983 A1 | 11/2006 | Lembo et al. | |
| 2006/0264982 A1 | 11/2006 | Viola et al. | |
| 2006/0271287 A1 | 11/2006 | Gold et al. | |
| 2006/0287818 A1 | 12/2006 | Okude et al. | |
| 2007/0016362 A1 | 1/2007 | Nelson | |
| 2007/0021914 A1 | 1/2007 | Song | |
| 2007/0060932 A1 | 3/2007 | Stack et al. | |
| 2007/0135990 A1 | 6/2007 | Seymour et al. | |
| 2007/0140187 A1 | 6/2007 | Rokusek et al. | |
| 2007/0166396 A1 | 7/2007 | Badylak et al. | |
| 2007/0185374 A1 | 8/2007 | Kick et al. | |
| 2007/0185938 A1* | 8/2007 | Prahlad ............... G06F 16/2365 | |
| 2007/0185939 A1* | 8/2007 | Prahland ............... G06F 16/184 | |
| 2007/0208429 A1 | 9/2007 | Leahy | |
| 2007/0233162 A1 | 10/2007 | Gannoe et al. | |
| 2007/0276596 A1 | 11/2007 | Solomon et al. | |
| 2007/0276911 A1 | 11/2007 | Bhumkar et al. | |
| 2007/0293716 A1 | 12/2007 | Baker et al. | |
| 2007/0293958 A1 | 12/2007 | Stehle et al. | |
| 2008/0015523 A1 | 1/2008 | Baker | |
| 2008/0208356 A1 | 8/2008 | Stack et al. | |

(56) References Cited

U.S. PATENT DOCUMENTS

| | | |
|---|---|---|
| 2008/0208450 A1 | 8/2008 | Katzer |
| 2008/0228030 A1 | 9/2008 | Godin |
| 2008/0228393 A1 | 9/2008 | Geelen et al. |
| 2008/0238941 A1 | 10/2008 | Kinnan et al. |
| 2008/0255678 A1 | 10/2008 | Cully et al. |
| 2008/0319653 A1 | 12/2008 | Moshfeghi |
| 2009/0005981 A1 | 1/2009 | Forstall et al. |
| 2009/0010405 A1 | 1/2009 | Toebes |
| 2009/0012553 A1 | 1/2009 | Swain et al. |
| 2009/0016504 A1 | 1/2009 | Mantell et al. |
| 2009/0037093 A1 | 2/2009 | Kurihara et al. |
| 2009/0063041 A1 | 3/2009 | Hirose et al. |
| 2009/0063048 A1 | 3/2009 | Tsuji |
| 2009/0100037 A1 | 4/2009 | Scheibe |
| 2009/0143977 A1 | 6/2009 | Beletski et al. |
| 2009/0157294 A1 | 6/2009 | Geelen et al. |
| 2009/0157615 A1 | 6/2009 | Ross et al. |
| 2009/0164110 A1 | 6/2009 | Basir |
| 2009/0177215 A1 | 7/2009 | Stack et al. |
| 2009/0182497 A1 | 7/2009 | Hagiwara |
| 2009/0192702 A1 | 7/2009 | Bourne et al. |
| 2009/0216434 A1 | 8/2009 | Panganiban et al. |
| 2009/0254273 A1 | 10/2009 | Gill et al. |
| 2009/0284476 A1 | 11/2009 | Bull et al. |
| 2009/0326803 A1 | 12/2009 | Neef et al. |
| 2010/0045704 A1 | 2/2010 | Kim |
| 2010/0070253 A1 | 3/2010 | Hirata et al. |
| 2010/0088631 A1 | 4/2010 | Schiller |
| 2010/0100310 A1 | 4/2010 | Eich et al. |
| 2010/0153010 A1 | 6/2010 | Huang |
| 2010/0174790 A1 | 7/2010 | Dubs et al. |
| 2010/0185382 A1 | 7/2010 | Barker et al. |
| 2010/0186244 A1 | 7/2010 | Schwindt |
| 2010/0220250 A1 | 9/2010 | Vanderwall et al. |
| 2010/0287024 A1 | 11/2010 | Ward et al. |
| 2010/0293462 A1 | 11/2010 | Bull et al. |
| 2010/0309147 A1 | 12/2010 | Fleizach et al. |
| 2010/0309149 A1 | 12/2010 | Blumenberg et al. |
| 2010/0312466 A1 | 12/2010 | Katzer et al. |
| 2010/0324816 A1 | 12/2010 | Highstrom et al. |
| 2010/0328100 A1 | 12/2010 | Fujiwara et al. |
| 2011/0029237 A1 | 2/2011 | Kamalski |
| 2011/0039584 A1 | 2/2011 | Merrett |
| 2011/0077850 A1 | 3/2011 | Ushida |
| 2011/0082620 A1 | 4/2011 | Small et al. |
| 2011/0082627 A1 | 4/2011 | Small et al. |
| 2011/0098918 A1 | 4/2011 | Siliski et al. |
| 2011/0106592 A1 | 5/2011 | Stehle et al. |
| 2011/0112750 A1 | 5/2011 | Lukassen |
| 2011/0137834 A1 | 6/2011 | Ide et al. |
| 2011/0143726 A1 | 6/2011 | De Silva |
| 2011/0145863 A1 | 6/2011 | Alsina et al. |
| 2011/0153186 A1 | 6/2011 | Jakobson |
| 2011/0161001 A1 | 6/2011 | Fink |
| 2011/0167058 A1 | 7/2011 | Van Os |
| 2011/0170682 A1 | 7/2011 | Kale et al. |
| 2011/0183627 A1 | 7/2011 | Ueda et al. |
| 2011/0185390 A1 | 7/2011 | Faenger et al. |
| 2011/0191516 A1 | 8/2011 | Xiong et al. |
| 2011/0194028 A1 | 8/2011 | Dove et al. |
| 2011/0210922 A1 | 9/2011 | Griffin |
| 2011/0213785 A1 | 9/2011 | Kristiansson et al. |
| 2011/0227843 A1 | 9/2011 | Wang |
| 2011/0230178 A1 | 9/2011 | Jones et al. |
| 2011/0238289 A1 | 9/2011 | Lehmann et al. |
| 2011/0238297 A1 | 9/2011 | Severson |
| 2011/0246891 A1 | 10/2011 | Schubert et al. |
| 2011/0264234 A1 | 10/2011 | Baker et al. |
| 2011/0265003 A1 | 10/2011 | Schubert et al. |
| 2011/0270517 A1 | 11/2011 | Benedetti |
| 2011/0282576 A1 | 11/2011 | Cabral et al. |
| 2011/0285717 A1 | 11/2011 | Schmidt et al. |
| 2011/0291860 A1 | 12/2011 | Ozaki et al. |
| 2011/0291863 A1 | 12/2011 | Ozaki et al. |
| 2011/0298724 A1 | 12/2011 | Ameling et al. |
| 2011/0307455 A1 | 12/2011 | Gupta et al. |
| 2012/0016554 A1 | 1/2012 | Huang |
| 2012/0035924 A1 | 2/2012 | Jitkoff et al. |
| 2012/0041674 A1 | 2/2012 | Katzer |
| 2012/0059812 A1 | 3/2012 | Bliss et al. |
| 2012/0095675 A1 | 4/2012 | Tom et al. |
| 2012/0143503 A1 | 6/2012 | Hirai et al. |
| 2012/0143504 A1 | 6/2012 | Kalai et al. |
| 2012/0155800 A1 | 6/2012 | Cottrell et al. |
| 2012/0179361 A1 | 7/2012 | Mineta et al. |
| 2012/0179365 A1 | 7/2012 | Miyahara et al. |
| 2012/0191343 A1 | 7/2012 | Haleem |
| 2012/0208559 A1 | 8/2012 | Svendsen et al. |
| 2012/0253659 A1 | 10/2012 | Pu et al. |
| 2012/0254804 A1 | 10/2012 | Sheha et al. |
| 2012/0260188 A1 | 10/2012 | Park et al. |
| 2012/0265433 A1 | 10/2012 | Viola et al. |
| 2012/0303263 A1 | 11/2012 | Alam et al. |
| 2012/0303268 A1 | 11/2012 | Su et al. |
| 2012/0310882 A1 | 12/2012 | Werner et al. |
| 2012/0322458 A1 | 12/2012 | Shklarski et al. |
| 2013/0006520 A1 | 1/2013 | Dhanani et al. |
| 2013/0035853 A1 | 2/2013 | Stout et al. |
| 2013/0110343 A1 | 5/2013 | Ichikawa et al. |
| 2013/0110842 A1 | 5/2013 | Donneau-Golencer et al. |
| 2013/0158855 A1 | 6/2013 | Weir et al. |
| 2013/0166096 A1 | 6/2013 | Jotanovic |
| 2013/0190978 A1 | 7/2013 | Kato et al. |
| 2013/0191020 A1 | 7/2013 | Emani et al. |
| 2013/0191790 A1 | 7/2013 | Kawalkar |
| 2013/0238241 A1 | 9/2013 | Chelotti et al. |
| 2013/0275899 A1 | 10/2013 | Schubert et al. |
| 2013/0321178 A1* | 12/2013 | Jameel .................. H04W 4/029 340/989 |
| 2013/0322665 A1 | 12/2013 | Bennett et al. |
| 2013/0325332 A1 | 12/2013 | Rhee et al. |
| 2013/0325856 A1 | 12/2013 | Soto et al. |
| 2013/0326384 A1 | 12/2013 | Moore et al. |
| 2013/0345961 A1 | 12/2013 | Leader et al. |
| 2013/0345975 A1 | 12/2013 | Vulcano et al. |
| 2014/0093100 A1 | 4/2014 | Jeong et al. |
| 2014/0095066 A1 | 4/2014 | Bouillet et al. |
| 2014/0122605 A1 | 5/2014 | Merom et al. |
| 2014/0123062 A1 | 5/2014 | Nguyen |
| 2014/0137219 A1* | 5/2014 | Castro .................... H04L 67/02 726/6 |
| 2014/0156262 A1 | 6/2014 | Yuen et al. |
| 2014/0277937 A1 | 9/2014 | Scholz et al. |
| 2014/0278051 A1 | 9/2014 | Mcgavran et al. |
| 2014/0278070 A1 | 9/2014 | Mcgavran et al. |
| 2014/0279723 A1 | 9/2014 | Mcgavran et al. |
| 2014/0281955 A1 | 9/2014 | Sprenger |
| 2014/0309914 A1 | 10/2014 | Scofield et al. |
| 2014/0317086 A1 | 10/2014 | James |
| 2014/0344420 A1 | 11/2014 | Rjeili et al. |
| 2014/0358437 A1* | 12/2014 | Fletcher ............. G01C 21/3617 701/533 |
| 2014/0358438 A1 | 12/2014 | Cerny et al. |
| 2014/0364149 A1 | 12/2014 | Marti et al. |
| 2014/0364150 A1 | 12/2014 | Marti et al. |
| 2014/0365113 A1 | 12/2014 | Mcgavran et al. |
| 2014/0365120 A1 | 12/2014 | Vulcano et al. |
| 2014/0365124 A1 | 12/2014 | Vulcano et al. |
| 2014/0365125 A1 | 12/2014 | Vulcano et al. |
| 2014/0365126 A1 | 12/2014 | Vulcano et al. |
| 2014/0365459 A1 | 12/2014 | Clark et al. |
| 2014/0365505 A1 | 12/2014 | Clark et al. |
| 2015/0032366 A1 | 1/2015 | Man et al. |
| 2015/0066360 A1 | 3/2015 | Kirsch |
| 2015/0139407 A1 | 5/2015 | Maguire et al. |
| 2015/0161267 A1* | 6/2015 | Sugawara ........... G06F 16/9535 707/722 |
| 2015/0177017 A1 | 6/2015 | Jones |
| 2015/0282230 A1 | 10/2015 | Kim |
| 2016/0212229 A1 | 7/2016 | Mcgavran et al. |
| 2017/0132713 A1 | 5/2017 | Bowne et al. |
| 2017/0176208 A1 | 6/2017 | Chung et al. |
| 2017/0205243 A1 | 7/2017 | Moore et al. |
| 2017/0205246 A1 | 7/2017 | Koenig et al. |

(56) References Cited

U.S. PATENT DOCUMENTS

| | | |
|---|---|---|
| 2017/0350703 A1 | 12/2017 | Mcgavran et al. |
| 2017/0358033 A1 | 12/2017 | Montoya et al. |
| 2019/0025070 A1 | 1/2019 | Moore et al. |
| 2019/0063940 A1 | 2/2019 | Moore et al. |

FOREIGN PATENT DOCUMENTS

| | | |
|---|---|---|
| CN | 1900657 A | 1/2007 |
| CN | 101438133 A | 5/2009 |
| CN | 101641568 A | 2/2010 |
| CN | 102567440 A | 7/2012 |
| CN | 102607570 A | 7/2012 |
| CN | 102840866 A | 12/2012 |
| DE | 112013002794 T5 | 4/2015 |
| EP | 1063494 A1 | 12/2000 |
| EP | 1102037 A1 | 5/2001 |
| EP | 1995564 A1 | 11/2008 |
| EP | 2355467 A2 | 8/2011 |
| EP | 2369299 A1 | 9/2011 |
| EP | 2479538 A2 | 7/2012 |
| EP | 2617604 A1 | 7/2013 |
| EP | 2672225 A2 | 12/2013 |
| EP | 2672226 A2 | 12/2013 |
| EP | 2698968 A1 | 2/2014 |
| EP | 2778614 A1 | 9/2014 |
| EP | 2778615 A2 | 9/2014 |
| EP | 2946172 A1 | 11/2015 |
| EP | 2712152 B1 | 9/2016 |
| EP | 3101392 A1 | 12/2016 |
| JP | 2010-261803 A | 11/2010 |
| TW | 200811422 A | 3/2008 |
| TW | 200949281 A | 12/2009 |
| TW | 201017110 A | 5/2010 |
| TW | M389063 U | 9/2010 |
| TW | 201202079 A | 1/2012 |
| TW | 201216667 A | 4/2012 |
| WO | 2005/015425 A1 | 2/2005 |
| WO | 2005/094257 A2 | 10/2005 |
| WO | 2008/079891 A2 | 7/2008 |
| WO | 2008/101048 A2 | 8/2008 |
| WO | 2009/073806 A2 | 6/2009 |
| WO | 2009/143876 A1 | 12/2009 |
| WO | 2010/040405 A1 | 4/2010 |
| WO | 2011/076989 A1 | 6/2011 |
| WO | 2011/146141 A1 | 11/2011 |
| WO | 2012/034581 A1 | 3/2012 |
| WO | 2012/036279 A1 | 3/2012 |
| WO | 2012/141294 A1 | 10/2012 |
| WO | 2013/184348 A2 | 12/2013 |
| WO | 2013/184444 A2 | 12/2013 |
| WO | 2013/184449 A2 | 12/2013 |
| WO | 2014/145127 A2 | 9/2014 |
| WO | 2014/145134 A1 | 9/2014 |
| WO | 2014/145145 A2 | 9/2014 |
| WO | 2014/151151 A1 | 9/2014 |
| WO | 2014/151152 A2 | 9/2014 |
| WO | 2014/151153 A2 | 9/2014 |
| WO | 2014/151155 A1 | 9/2014 |
| WO | 2014/197115 A2 | 12/2014 |
| WO | 2014/197155 A1 | 12/2014 |

OTHER PUBLICATIONS

Ruhs, Chris, "My Favorite Android Apps: Maps," Jun. 24, 2011, 1 page, available at http://www.youtube.com/watch?v=v2aRkLkLT3s.

Ridhawi, I. Al, et al., "A Location-Aware User Tracking and Prediction System," 2009 Global Information Infrastructure Symposium, Jun. 23-26, 2009, pp. 1-8, IEEE, Hammamet, Tunisia.

Prabhala, Bhaskar, et al., "Next Place Predictions Based on User Mobility Traces," 2015 IEEE Conference on Computer Communications Workshops (INFOCOM WKSHPS), Apr. 26-May 1, 2015, pp. 93-94, IEEE, Hana Kana, China.

Moren ("Google unveils free turn-by-turn directions for Android devices," Macworld, http://www.macworld.eom/article/1143547/android_turnbyturn.htmll7/8/2016 9:58:56 AM], Oct. 28, 2009).

Lawrence, Steve, "Review: Sygic Mobile Maps 2009," Jul. 23, 2009, 4 pages, available at http://www.iphonewzealand.co.nz/2009/all/review-sygic-mobile-maps-2009/.

Human Motion Prediction for Indoor Mobile Relay Networks Archibald, C.; Ying Zhang; Juan Liu High Performance Computing and Communications (HPCC), 2011 IEEE 13th International Conference on Year: 2011 pp. 989-994, DOI: 10.1109/HPCC.2011.145 Referenced in: IEEE Conference Publications.

Dube, Ryan, "Use Google Maps Navigation For Turn-By-Turn GPS [Android]", available at http://www.makeuseof.com/tag/google-maps-navigation-turnbyturn-gps-android/, Jun. 24, 2010, 7 Pages.

Diewald, Stefan, et al., "Mobile Device Integration and Interaction in the Automotive Domain", Autonui:Automotive Natural User Interfaces Workshop at the 3rd International Conference on Automotive User Interfaces and Interactive Vehicular Applications (AutomotiveUI '11), Nov. 29-Dec. 2, 2011, 4 pages, XP002732023, Salzburg,Austria.

Author Unknown, "Touch & Go' Owner's Manual," Jul. 2011, 218 pages, Toyota, United Kingdom.

Author Unknown, "Mazda: Navigation System—Owner's Manual", available at http://download.tomtom.com/open/manuals/mazda/nva-sd8110/Full_Manual_EN.pdf, Jan. 1, 2009, 159 pages.

Author Unknown, "Magellan Maestro 3100 User Manual," Month Unknown 2007, 4 pages, Magellan Navigation, Inc., San Dimas, USA.

Author Unknown, "Magellan (Registered) Road Mate (Registered): 2010 North America Application User Manual," Month Unknown, 2009, 24 pages, MiTAC Digital Corporation, CA, USA.

Author Unknown, "Magellan (Registered) Road Mate (Registered) GPS Receiver: 9020/9055 user Manual," Month Unknown, 2010, 48 pages, MiTAC International Corporation, CA, USA.

Author Unknown, "iPhone Integration on Mercedes Head Unit," Dec. 3, 2011, 1 page, Motuslab, available at http://www.youtube.com/watch?v=rXy6lpQAtDo.

Author Unknown, "Introducing Mimics—Control your iPhone from a Touch Screen," May 13, 2011, 3 pages, mp3Car.com, available at http://www.youtube.com/watch?v=YcggnNVTNwl.

Author Unknown, "Hands-on with Sony Mirrorlink head units," Jan. 13, 2012, 1 page, uudethuong, available at http://www.youtube.com/watch?v=UMkF478_Ax0.

Author Unknown, "Google Maps Voice Navigation in Singapore," software2tech, Jul. 20, 2011, 1 page, available at http://www.youtube.com/watch?v=7B9JN7BkvME.

Author Unknown, "Garmin. nuvi 1100/1200/1300/1400 series owner's manual," Jan. 2011, 72 pages, Garmin Corporation, No. 68, Jangshu 2nd Road, Sijhih, Taipei County, Taiwan.

Author Unknown, "Blaupunkt chooses NNG navigation software for new aftermarket product," May 24, 2011, 2 pages, available at http://telematicsnews.info/2011/05/24/blaupunktchooses-nnq-naviqation-software-for-new-aftermarket-product my224 1 /.

Author Unknown, "Android 2.3.4 User's Guide", May 20, 2011, pp. 1-384, Google, Inc.

A blind navigation system using RFID for indoor environments Chumkamon, S.; Tuvaphanthaphiphat, P.; Keeratiwintakom, P. Electrical Engineering/Electronics, Computer, Telecommunications and Information Technology, 2008. ECTI-CON 2008. 5th International Conference on Year: 2008, vol. 2 pp. 765-768, DOI: 10.1109/ECTICON.2008.4600543.

Mohan et al., "Adapting Multimedia Internet Content For Universal Access," IEEE Transactions on Multimedia, Mar. 1999, pp. 104-114.

* cited by examiner

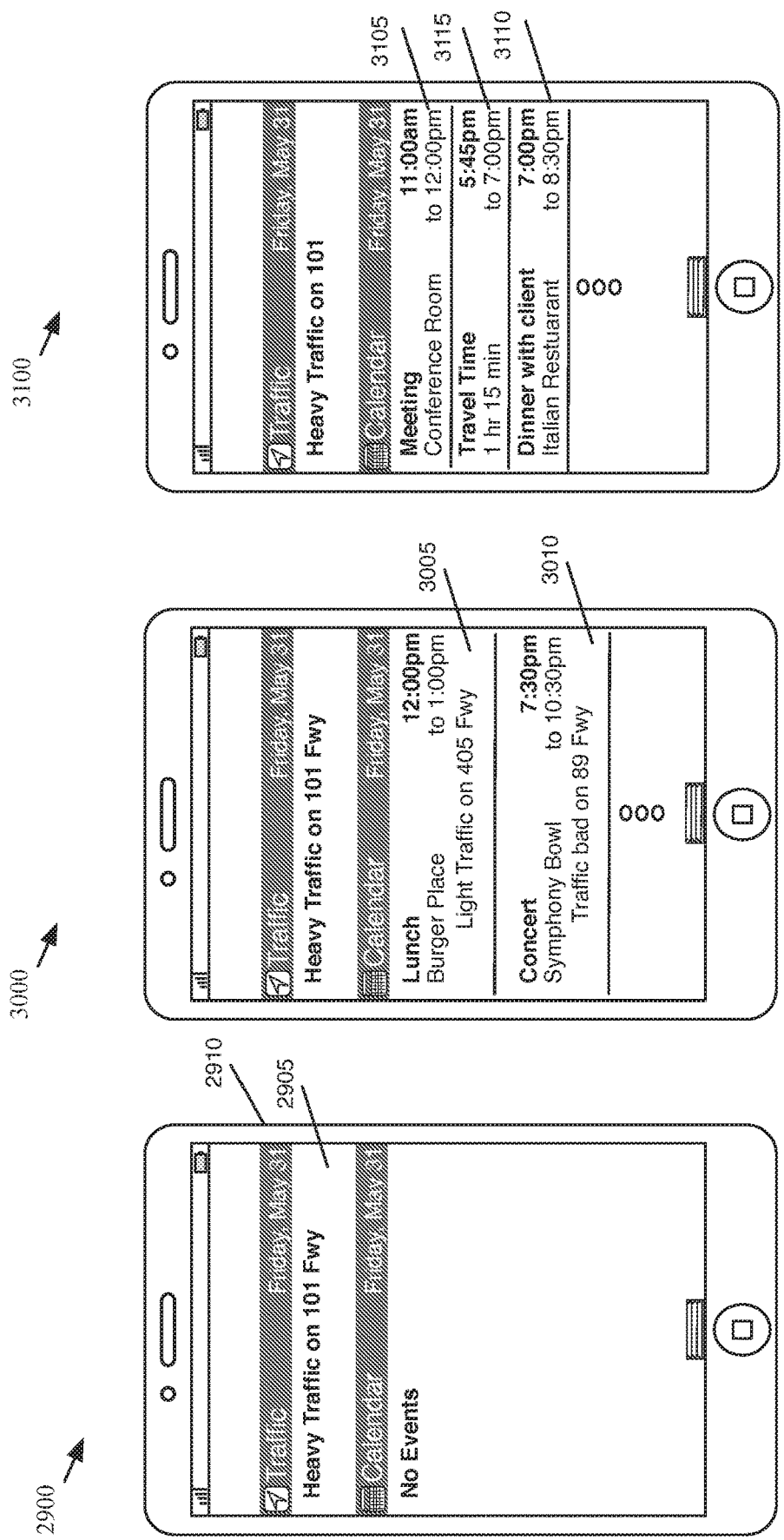

HARVESTING ADDRESSES

INCORPORATION BY REFERENCE DISCLAIMER

Each of the following applications are hereby incorporated by reference: application Ser. No. 14/081,850 filed on Nov. 15, 2013; application No. 61/832,850 filed Jun. 8, 2013. The applicant hereby rescinds any disclaimer of claim scope in the parent application(s) or the prosecution history thereof and advises the USPTO that the claims in this application may be broader than any claim in the parent application(s).

BACKGROUND

With advents in technology, traveling from one location to another location has never been easier. A person no longer has to take out a paper map and try to figure out how to get from point A to point B. Instead, the person can just use an electronic map operating on his mobile device to obtain directions between two addresses. Although it is easy to use such maps, people still have to input different addresses. Inputting address might seem easy, but it can be a chore onto itself when one considers the disparate variety of sources from which one has to retrieve an address. As an example, to find an address in an email, a person has to open an email application and sort through the email to find the one with the address. The address is usually in the body of the email. Therefore, most likely, the person has to find the email, open it, and then glance over it to find the address. Then, after all of this, the address has to be copied from the email to another application, such as a map application or a web browser. If the person didn't remember the address, the next time the person need this address, he or she has to then repeat the same procedures mentioned above.

BRIEF SUMMARY

Some embodiments of the invention provide an address harvester that harvests addresses from one or more applications executing on a device. Some embodiments use the harvested addresses to facilitate the operation of one or more applications executing on the device. Alternatively, or conjunctively, some embodiments use the harvested addresses to facilitate the operation of one or more applications executing on another device than the one used for harvesting the addresses.

For instance, in some embodiments, a prediction system uses the harvested addresses to formulate predictions, which it then provides to the same set of applications from which it harvested the addresses in some embodiments. In other embodiments, the prediction system provides the predictions to a different set of applications that may or may not overlap with the set of applications used for the harvesting.

The harvested addresses are different in different embodiments. In some embodiments, they include telecommunication (telecom) addresses that are used for telecommunication messages. Examples of such addresses include telephone numbers that are used for phone calls and/or text messages (e.g., text messages sent along the SMS or iMessage text service, etc.), and electronic mail (email) addresses that are used for email messages or text messages.

Some embodiments harvest both telephone numbers and emails, while other embodiments only harvest one of these types of telecom addresses. Also, in some embodiments, the harvested telecom addresses include several telecom addresses (e.g., several email addresses and/or telephone numbers) that are used to send an email message and/or text message to several recipients at once.

Some embodiments use harvested telecom addresses to predict and display candidate recipient or recipients for a telecom message as a user is inputting the recipient or recipient list for the message. Alternatively, or conjunctively, the harvested telecom addresses can be used to augment the recipient data storage (e.g., database) that a voice recognition application uses to prepare telecom message or initiate a telecom session (e.g., a phone call or video conference) in response to voice instructions.

In addition to harvesting telecom messages, or instead of this harvesting, the harvesting system of some embodiments harvests addresses in the physical world. Examples of such harvested addresses include physical addresses that are harvested from email message, text message, calendared events, electronic tickets, etc. Alternatively, or conjunctively, these harvested addresses include physical addresses that a user of the device browses in a web browser or a map application that executes on the device. Such browsing entails searching for the addresses, viewing the addresses, and/or using the addresses to specify a route to view or navigate.

Some embodiments use the harvested physical addresses to formulate predictions about future destinations of the device's user, and then provide information to the user based on these predictions. To formulate these predictions, some embodiments employ one or more machine-learning engines to generate additional physical addresses to augment the set of physical addresses that they use to base their predictions.

Different embodiments provide different information to the user based on the prediction. Examples of such information include routes to predicted future destinations, traffic data regarding routes to possible future destination, prioritized display of predicted future destinations over other destinations in a list of possible destinations or search queries, etc. One of ordinary skill will realize that the harvested physical addresses are not used for all of these purposes in some embodiments. One of ordinary skill will also realize that the harvested physical addresses are used for other predictions and other uses in other embodiments.

Some embodiments employ a ranking engine to compute a ranking score for each harvested address (e.g., each telecom address and each physical address) or each harvested address of a certain type (e.g., physical addresses). In addition to the ranking engine, some embodiments use a decay engine to decay the computed ranking score for a harvested address over time.

As mentioned above, some embodiments use the harvested addresses to facilitate the operation of one or more applications executing on another device than the one used for harvesting the addresses. In some embodiments, this other device communicatively connects with the harvested device through a network, and it receives the harvested addresses through this connection. For instance, in some embodiments, the two devices are associated with each other (e.g., are associated with the same account) through a cloud server infrastructure that temporarily stores harvested addresses from one device before relaying it to the other device.

In this manner, the cloud infrastructure relieves the two devices from having to establish a real time communication session in order to download harvested addresses from one device to the other. In other words, this infrastructure simplifies the process of creating duplicate, distributed data storages (e.g., databases) on different devices to store addresses that are harvested on different devices. This robust distributed data storage synchronization across multiple devices, combined with the harvesting of address data from multiple applications on each device, makes the address harvesting architecture of some embodiments very powerful as it can quickly build a very rich address storage that resides on multiple devices and that can augment the operation of multiple applications on each device.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 29-31 illustrate several example of how some embodiments present traffic notification based on a harvested or machine generated physical address.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide an address harvester that harvests addresses from one or more applications executing on a device. Some embodiments use the harvested addresses to facilitate the operation of one or more applications executing on the device. Alternatively, or conjunctively, some embodiments use the harvested addresses to facilitate the operation of one or more applications executing on another device than the one used for harvesting the addresses.

Figure 1:
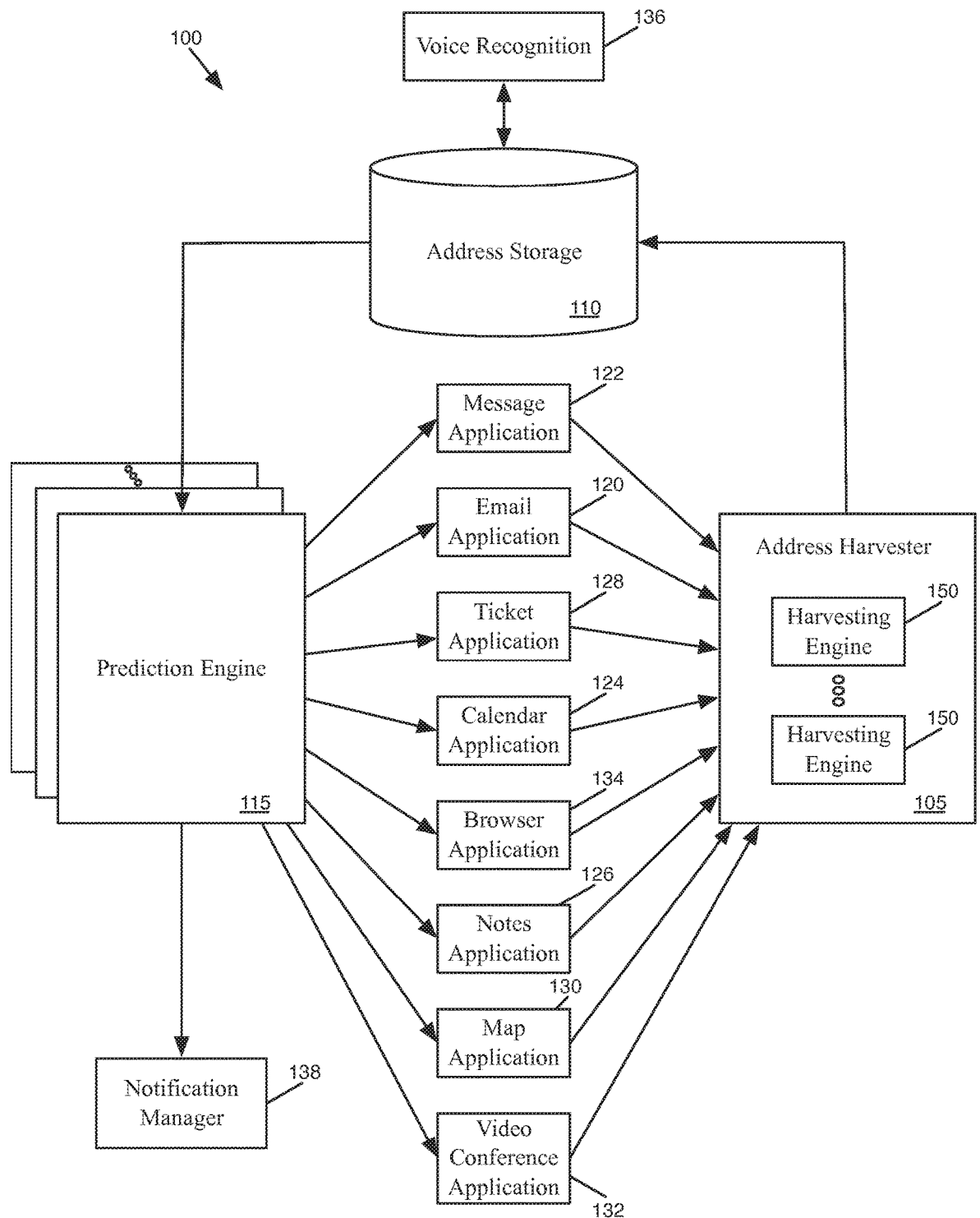
FIG. 1 illustrates an address harvesting architecture of a device of some embodiments of the invention.

FIG. 1 illustrates a novel address harvesting architecture 100 of a device of some embodiments of the invention. In this architecture, multiple applications that execute on the device are both sources and consumers of harvested addresses captured by this architecture. As shown in FIG. 1, the harvesting architecture 100 includes an address harvester 105, a harvested address data storage 110, several prediction engines 115, and several applications 120-138.

As further described below, the harvested address storage 110 stores addresses that the address harvester 105 harvests from some of the applications. The harvested addresses are different in different embodiments. For the embodiments illustrated in FIG. 1, they include telecommunication (telecom) addresses for telecommunication messages and physical addresses of locations in the physical world.

Examples of harvested telecom addresses include (1) telephone numbers that are harvested from phone calls and/or text messages (e.g., text messages sent along the SMS or iMessage text service, etc.), and (2) electronic mail (email) addresses that are used for email messages or text messages. Also, in some embodiments, the harvested telecom addresses include several telecom addresses (e.g., several email addresses or telephone numbers) that were used to send an email message or text message to several recipients at once.

Examples of harvested physical addresses include physical addresses that are harvested from email message, text message, calendared events, electronic tickets, etc. In the embodiments illustrated in FIG. 1, these harvested addresses include physical addresses that a user of the device uses in a web browser or a map application that executes on the device. Such use entails searching for the addresses, viewing the addresses, using the addresses to specify a route to view or navigate, etc.

The applications 120-134 are contributors to and consumers of the harvested addresses in the harvested address data storage 110, and consumers of the predictions provided by the prediction engines 115. Specifically, in FIG. 1 the applications include an email application 120, a text messaging application 122, a calendar application 124, a notes application 126, a ticket application 128, a maps application 130, a video conferencing application 132, a browser application 134, a voice recognition application 136, and notification application 138. Other than the voice recognition application 136 and the notification application 138, the rest of the applications in the embodiments illustrated in FIG. 1 are contributors of the harvested addresses in the harvested address data storage 110. As further described below, the voice recognition application 136 is only a consumer of the harvested data in the harvested address data storage 110, while the notification application 138 is only a consumer of predictions that the prediction engines 115 generate off the harvested data.

The address harvester 105 includes several address harvesting engines 150. One set of address harvesting engines 150 harvests and stores the telecom addresses that the applications use to send telecom messages. For instance, each time one of the applications (e.g., the email application 120, messaging application 122, video conference application 132, calendar application 124) uses an email address or several email addresses to send an email or an invite (e.g., to a video conference or a calendared event), the application provides the email address or addresses to one of the harvesting engines 150, which, in turn, stores the received address(es) in the harvested address data storage 110. Similarly, each time one of the applications (e.g., the messaging application 122, video conference application 132, etc.) uses a telephone number or several telephone numbers to send a text message or an invite (e.g., to a video conference), the application provides the telephone number(s) to a harvesting engine 150, which, in turn, stores the received telephone number(s) in the harvested address data storage 110. Accordingly, to store telecom addresses, one or more harvesting engines serve as a processor for receiving email addresses and telephone numbers, and storing the received email addresses and telephone numbers in the harvested address data storage 110.

Another set of address harvesting engines 150 harvests and stores the physical addresses from (1) email messages sent and/or received by the email application 120, (2) text messages sent and/or received by the messaging application 122, (3) events calendared by the calendar application 124, (4) electronic tickets stored by the ticket application 128, and (5) notes prepared by the notes application 126. The harvesting engines 150 also harvest physical addresses that web browser 134 or a map application 130 search, view, and/or use to compute routes.

In some embodiments, the harvesting engines 150 that are used to detect physical addresses use a data detecting process that recognizes formatted data (e.g., physical addresses) within a document. One such process is the Data Detector service that is used by the operating systems of devices sold by Apple Inc. The data detector service is described in U.S. Pat. No. 5,946,647.

In some embodiments, each time an application receives a particular electronic document or event (e.g., email, text message, calendar event, or note), the application supplies one of the harvesting engines 150 with the received document or event. The harvesting engine 150 then performs data detection, or uses the data detecting service of the device to perform data detection, on the received document or event to determine whether it contains a physical address. If so, the harvesting engine 150 returns data regarding the recognized physical address to the application, and stores a copy of the recognized physical address in the harvested address data storage 110.

Also, as an application creates a particular electronic document or event (e.g., creates an email, text message, calendar event, or note), the application in some embodiments interacts with one of the harvesting engines 150 to supply this engine with its content after it is created or as it is being created. The harvesting engine 150, in turn, performs data detection, or uses the data detecting service of the device to perform data detection, on the received content to determine whether it contains a physical address. If so, the harvesting engine 150 returns data regarding the recognized physical address to the application, and stores a copy of the recognized physical address in the harvested address data storage 110.

In addition to using the data detector, the address harvester 105 uses one or more of its address harvesting engines 150 as parsers to parse physical addresses stored by one or more applications. For example, in some embodiments, a harvesting engine 150 can parse a location (if any) that is specified for an event calendared by the calendar application, while another harvesting engine 150 can parse a location of an event for which the ticket application stores a ticket. These engines 150 store in the harvested address data storage 110 any physical address that they obtain through such parsing.

In addition to such parsed and harvested physical addresses, the address harvester 105 of some embodiments also harvests addresses that a user searched, viewed, and/or used to compute routes in the web browser 134 or the map application 130. In some embodiments, the browser 134 or map application 130 uses an application data storage (e.g., database) to store such physical addresses in order to facilitate some of their operations, e.g., to provide a list of recent locations that were searched or viewed by the application. Accordingly, in some of these embodiments, a harvesting engine 150 retrieves the physical addresses from application data storage of the browser 134 or the map application 130, and stores the retrieved addresses in the harvested address data storage 10.

The prediction engines 115 use the harvested addresses stored in the harvested address data storage 110 to formulate different types of predictions for different applications. For example, in some embodiments, one or more prediction engines 115 use harvested telecom addresses to predict and display candidate recipient or candidate group of recipients for a telecom message as a user is inputting the recipient or recipient group for the message.

Accordingly, each time a user is typing an email address for an email or invite that will be sent by the email application 120, messaging application 122, video conference application 132, or calendar application 124, a prediction engine 115 will try to match the user's input to one or more email addresses and/or address groups in the harvested address data storage 110, and will present any matching email address or address group it finds to the user. Assuming that one of the presented candidates is what the user intended to input, the user can then select a candidate email address or address group to expedite entering the email address or addresses.

Similarly, each time a user is typing a telephone number for a message or invite that will be sent by the messaging application 122 or video conference application 132, a prediction engine 115 will try to match the user's input to one or more telephone numbers and/or telephone number groups in the harvested address data storage 110, and will present any matching candidate number or number group it finds to the user. In some embodiments, one or more matched candidate group of telephone numbers may include email addresses as the messaging application 122 sends text messages to email addresses. Assuming that one of the presented candidates is what the user intended to input, the user can then select a candidate number or number group to expedite entering the number or numbers.

Also, in some embodiments, one or more prediction engines 115 use the harvested physical addresses to formulate predictions about future destinations of the device's user, and then provide information to the user based on these predictions. To formulate these predictions, some embodiments employ one or more machine-learning engines to generate additional physical addresses to augment the set of physical addresses that they use to base their predictions.

Different embodiments provide different formulated predictions or related information to the user. As further described below, examples of such formulated predictions or related information include predicted future destinations, predicted routes to predicted future destinations, traffic data regarding predicted routes to predicted future destination, calculated initial travel times for calendared events, adjusted travel times for calendared events, prioritized display of predicted future destinations over other destinations in a list of possible destinations or search queries, etc. In some embodiments, the prediction engines 115 formulate all of these prediction examples. However, one of ordinary skill will realize that the harvested physical addresses are not used for formulating all such predictions in other embodiments. In addition, one of ordinary skill will also realize that the harvested physical addresses are used for other predictions in other embodiments.

As shown in FIG. 1, the prediction engines 115 supply their formulated predictions or associated information to the applications 120-138. For example, in some embodiments, a prediction engine 115 supplies predicted future destinations, and/or predicted routes to predicted future destinations, to the map application 130. Based on such predictions, the map application 130 displays the predicted routes to predicted future destinations as selectable navigation options, as described in concurrently filed U.S. Patent Application entitled "Warning for Frequently Traveled Trips Based on Traffic," U.S. Provisional Patent Application No. 61/832,928 filed Jun. 9, 2013, which are both incorporated herein by reference. The map application 130 can also use the predicted future destinations to generate and display a prioritized display of predicted future destinations in a list of possible destinations or search queries. Alternatively, the map application 130 can get this prioritized display of predicted future destinations from a prediction engine 115.

In addition to receiving predicted routes for predicted future destinations, a prediction engine 115 can provide traffic along each predicted route that is presented to the user, or along a predicted route that is selected by the user. To identify such traffic, the prediction engine 115 uses traffic servers that communicatively connect to the device through a network (e.g., cellular network or the Internet) in some embodiments. The prediction engine 115 also uses external servers to identify routes between locations in some embodiments, while it uses a routing engine executing on the device to identify routes in other embodiments.

In some embodiments, a prediction engine 115 computes or adjusts travel times to a calendared event based on the location of the event and the selection of a predicted route to a predicted destination. For example, a user has a lunch appointment at 1 pm in San Francisco. At 11 am, the user is in San Jose, and the mapping application 130 presents the user with a list of predicted destinations and/or predicted routes to the predicted destinations. From this list, the user selects Cupertino as the navigation destination or picks a predicted navigation route to Cupertino.

Based on this selection, the map application 130 provides navigation instructions to Cupertino, while a prediction engine 115 computes the travel time from Cupertino to San Francisco, and directs the calendar application 124 to specify this travel time in the list of calendared events for that day. Several manners for specifying travel time for a calendared event are described in concurrently filed U.S. Patent Application entitled "Specifying Travel Times for Calendared Events," U.S. Provisional Patent Application No. 61/832,848 filed Jun. 8, 2013, which are both incorporated herein by reference. In some embodiments, the prediction engine 115 computes the travel time from Cupertino to San Francisco based on predicted route information and based on traffic along the predicted route information.

If the travel time was already specified for the lunch appointment in San Francisco, the prediction engine 115 determines whether the travel time for this event should be adjusted based on a variety of factors, such as the selected route to Cupertino, the predicted route to San Francisco and the traffic along one or both of these routes. When the travel time has to be adjusted, the prediction engine 115 directs the calendar application 124 to adjust the event time. Also, before computing or adjusting the travel time, the prediction engine 115 in some embodiments first ensures that there is sufficient time to travel from San Jose to Cupertino and then from Cupertino to San Francisco, and still meet the 1 pm event time in San Francisco. When there is not sufficient time, then the prediction engine 115 directs the map application 130, the calendar application 124, or the notification manager 138 to provide a notification to the user that there might not be sufficient time to make the 1 pm lunch in San Francisco.

As shown in FIG. 1, not all applications both contribute to the address harvesting and consume the predictions that are formulated from the address harvesting. For instance, some embodiments use the notes application 126 to harvest addresses but do not provide to this application formulated predictions based on the harvested addresses. Also, in some embodiments, the voice recognition application 136 does not contribute to the address harvesting, but it benefits from this harvesting. Specifically, in these embodiments, the harvested telecom addresses can be used to augment the recipient data storage (e.g., database) that the voice recognition application 136 uses to prepare a telecom message or initiate a telecom session (e.g., a phone call or video conference) in response to voice instructions. Even though not all of the applications contribute to the address harvesting, the address harvesting architecture of FIG. 1 can quickly build a harvested address data storage 110 because multiple applications do contribute to this data storage. This architecture also robustly augments the functionality of many of these applications as it provides a rich collection of harvested data and predictions that can be formulated off of this data.

Figure 2:
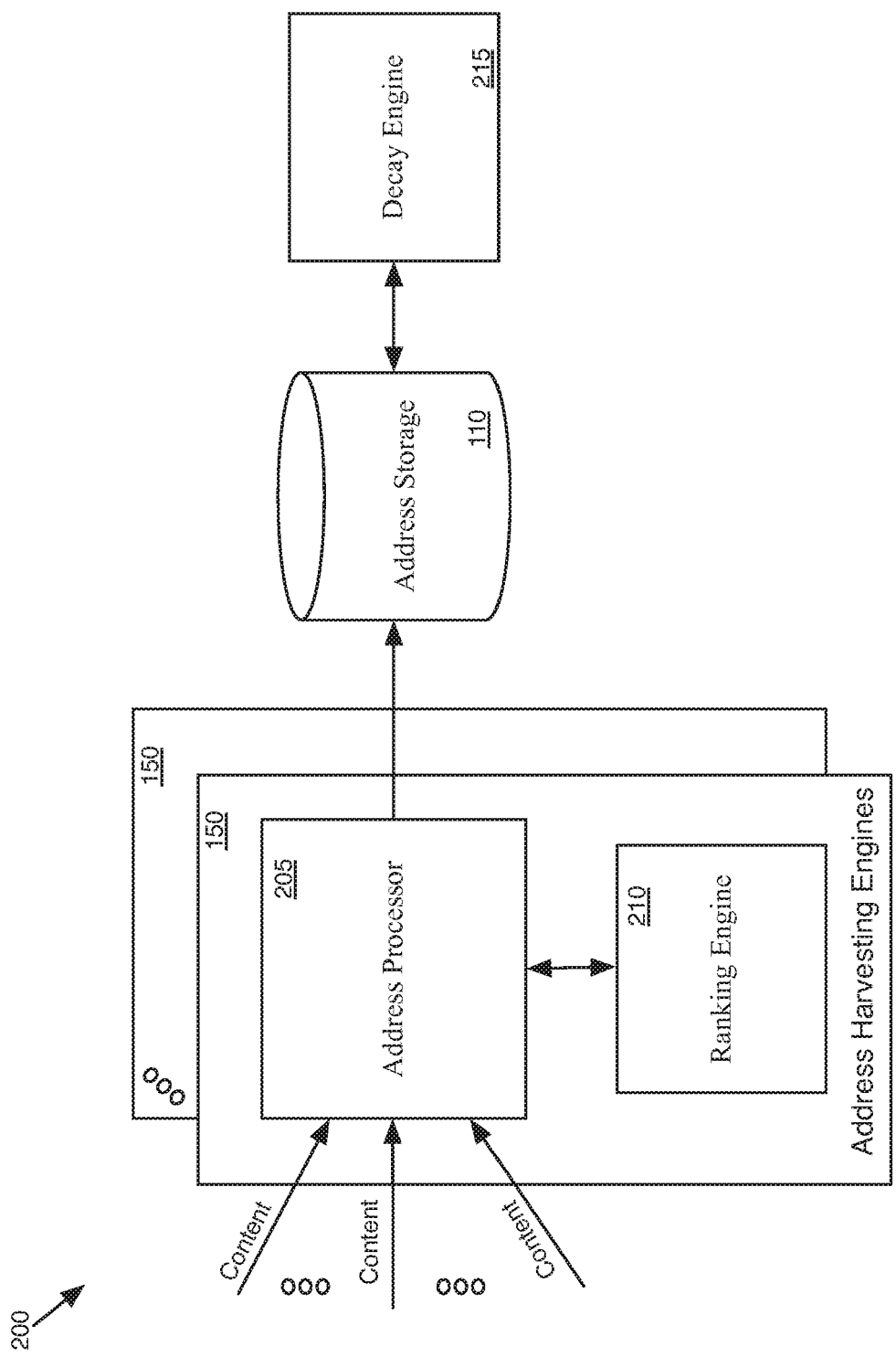
FIG. 2 illustrates examples of ranking and decay engines that some embodiments use to prioritize the storing of the harvested addresses.

To prioritize the storing of the harvested addresses, and to maintain this priority, some embodiments employ ranking engines to compute ranking scores for the harvested addresses and decay engines to decay the computed ranking scores of the harvested addresses over time. FIG. 2 illustrates examples of such ranking and decay engines. Specifically, this figure illustrates an address harvesting architecture 200 of a device. This architecture includes several address harvesting engines 150, a harvested address data storage 110, and a decay engine 215.

The architecture 200 uses different address harvesting engines 150 to handle the harvesting of different types of addresses. In this architecture, each address harvesting engine 150 in some embodiments is used to harvest only one type of addresses (e.g., email addresses or telephone numbers), while in other embodiments, one address harvesting engine 150 can harvest more than one type of addresses (e.g., email addresses and telephone numbers). In other harvesting architectures of other embodiments, one address harvesting engine 150 is used to harvest all types of addresses (e.g., all telecom addresses and physical addresses).

As shown in FIG. 2, an address harvesting engine 150 includes an address processor 205 and a ranking engine 210. The address processor 205 receives content to harvest for addresses from one source in some embodiments, or multiple sources in other embodiments. In some embodiments, some or all of the content received by the address processor 205 are the harvested addresses that it needs to store in the harvested address data storage 110. In these or other embodiments, the address processor 205 needs to harvest (e.g., parse and analyze) some or all of the content that it receives to extract the address that it needs to store in the harvested address data storage 110. For instance, the address processor 205 receives email addresses and telephone numbers from the email and messaging applications when these applications use such telecom addresses to send message. Alternatively, this processor 205 or another processor receives emails and text messages from the email and messaging applications, for example, when such messages are prepared or received, which it then harvests to extract physical addresses from these messages.

For each harvested address, the address processor 205 determines whether the address is already stored in the harvested address data storage 110. If so, the address processor 205 may update the record previously stored to account for the repeated harvesting of the address. Otherwise, the address processor 205 formulates a record for storing the address in the harvested address data storage 110. Some embodiments create different types of records for different types of harvested addresses, while other embodiments create the same type of records for all types of harvested addresses. Examples of such records are further described below.

In creating or updating addresses records for the harvested address data storage 110, the address processor 205 uses the ranking engine 210 to compute new or updated ranking scores for the address records. In some embodiments, the ranking score for an address of a particular type is simply a count related to the number of times that the address has been harvested, while the ranking score for another address of another type is based on a set of factors. In other embodiments, all ranking scores for all types of addresses are counts related to the number of times that the addresses have been harvested, while in other embodiments, all ranking scores for all types of addresses are based on a variety of factors, which may be the same or different for different types of addresses.

Different factors are used to compute the ranking score in different embodiments. One factor is the identity of the application that provided the content for harvesting to the address processor 205. Certain applications (e.g., messaging applications) result in a higher ranking score for their harvested addresses than other applications (e.g., email applications). For telecom messages, another factor in some embodiments is the identity of the person who sent the message that is being harvested. For instance, addresses harvested from telecom messages from individuals in the device's address book or list of favorites are ranked higher than addresses harvested from messages from individuals not in the address books or list of favorites. Another factor in some embodiments is whether the message (e.g., email) that is being harvested has been viewed. If so, the address that is harvested from this message (this email) will have a higher ranking than the address that is harvested from a message (e.g., another email) that has not been viewed.

The decay engine 215 continuously or periodically reviews the ranking scores of some or all of the harvested addresses in the harvested address data storage 110. Whenever necessary, it reduces the ranking score of a harvested address in the harvested address data storage 110. In some embodiments, the decay engine 215 reduces the ranking score of a harvested address each time that it reviews this address' record(s).

For instance, in some embodiments, the decay engine 215 applies a linear decay function to the ranking scores of some or all of the harvested addresses. In some embodiments, the decay engine 215 does not adjust the ranking score of some of the harvested addresses. In other words, the decay engine 215 does not examine some of the harvested addresses to adjust their ranking scores in some embodiments. For instance, in some embodiments, the ranking scores of some harvested addresses are simply the number of times that the addresses have been harvested. In some of these embodiments, the decay engine 215 does not adjust the ranking score.

Some embodiments use the addresses that are harvested on one device to facilitate the operation of one or more applications executing on another device. To do this, some embodiments create duplicate, distributed data storages (e.g., databases) on different devices to store addresses that are harvested on different devices.

Figure 3:
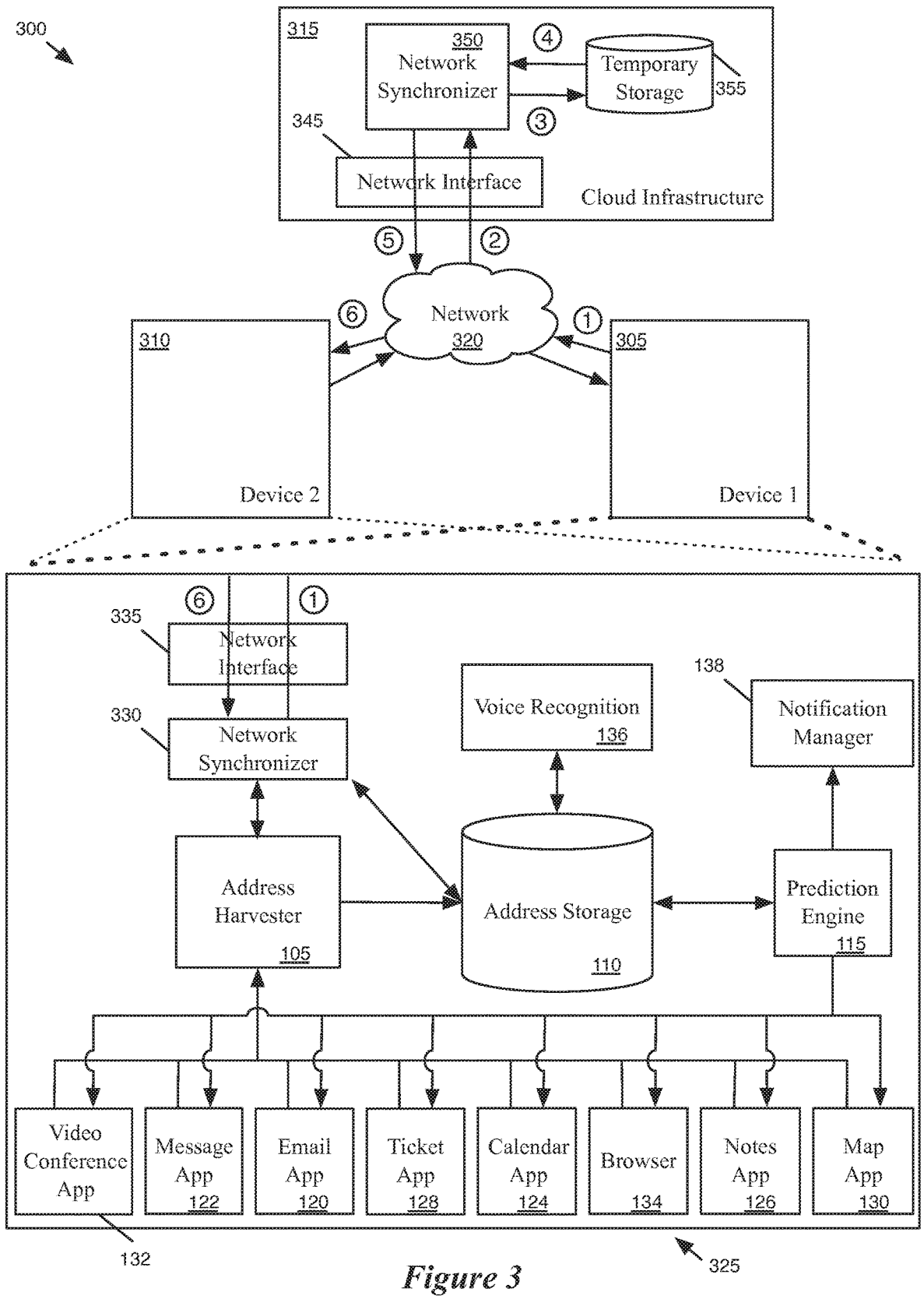
FIG. 3 illustrates an example of a harvesting architecture that can use the addresses that are harvested on one device to facilitate the operation of one or more applications executing on another device.

FIG. 3 illustrates an example of a harvesting architecture 300 that can use the addresses that are harvested on one device to facilitate the operation of one or more applications executing on another device. Specifically, it illustrates two devices 305 and 310 that are associated with each other (e.g., are associated or registered with the same account) through a cloud server infrastructure 315 that temporarily stores harvested addresses from one device before relaying it to the other device. The devices 305 and 310 and the server infrastructure 315 communicatively couple with each other through a network 320, such as the Internet or other network.

As mentioned above, the devices 305 and 310 have an association that allows them to share harvested address data. In some embodiments, this association is established because the two devices are associated with one account of the cloud server infrastructure (e.g., one iCloud account offered by Apple Inc.) or with two associated accounts. In some embodiments, this association is automatically created when the devices are designated as being commonly owned by one user.

In some embodiments, each device 305 or 310 can be one of many different types of devices, such as desktop computer, laptop computer, smartphone, tablet computer, or any other electronic device. In the example illustrated in FIG. 3, each device employs an address harvesting architecture 325 that is similar to the harvesting architecture 100 of FIG. 1, as further described below.

Accordingly, each device 305 or 310 harvests telecom and physical addresses from multiple applications 120-134 that execute on the device. Each time a device harvests a new address, it routes this address to the cloud server infrastructure 315, which, in turn, routes this new address to other associated devices. In the example illustrated in FIG. 3, an address harvested by the device 305 is routed to the device 310 through the cloud server infrastructure 315.

To detect new harvested addresses and to route such addresses to the server infrastructure 315, each device 305 or 310 has a network synchronizer 330. Other than this synchronizer 330, each device's address harvesting architecture is identical to the architecture 100 of FIG. 1. In some embodiments, each device also has ranking and decay engines like those described above by reference to FIG. 2.

Each time a new address is added to a device's address storage 110, the device's network synchronizer 330 detects the new harvested address and relays information about this new address to the server infrastructure 315 through the device's network interface 335. Also, in some embodiments, each time an address harvesting engine 105 of a device harvests an address that was previously harvested and updates a previously created record of a previously harvested address, the network synchronizer 330 detects the update to the previously created record and relays information about this update to the server infrastructure 315. When a device's decay engine adjusts the ranking score of a harvested address, the network synchronizer 330 of some embodiments relays the updated score to the server infrastructure 315 for distribution to the other devices. In other embodiments, however, such updated ranking scores are not relayed through the server infrastructure 315 between devices because each device has its own decay engine that is responsible for performing these adjustments.

In the example illustrated in FIG. 3, the routing of the harvested address from device 305 to the device 310 is shown in six stages. In the first stage, the network synchronizer 330 detects the addition of the harvested address, and sends to the server infrastructure 315 one or more packets to relay a data tuple that includes all the synchronized fields of data of the harvested address' record.

In the second stage, a network synchronizer 350 of the server infrastructure 315 receives the packet(s) from the device 305 through the network interface 345. The server infrastructure 315 includes one or more servers. In some embodiments, this infrastructure includes one or more web servers for processing network packets and routing these packets to application servers. In some embodiments, the network interface 345 includes the web servers, and the network synchronizer 350 is an application server that is responsible for managing the distribution of the harvested address data (e.g., new records and record updates) across a set of associated devices. In some embodiments, the network synchronizers 330 and 350 of the devices 305 or 310 and the server infrastructure use the ubiquitous key value storage mechanism of Apple Inc. in order to synchronize harvested address data across a set of associated devices. This key value storage mechanism is further described below.

As shown in FIG. 3, the network synchronizer 350 of the server infrastructure 315 stores in a temporary data storage 355 any newly received harvested address data. It stores this data until it determines that device 310 is available for receiving the harvested address data that it received from device 305. In this manner, the cloud infrastructure relieves the two devices 305 or 310 from having to establish a real time communication session in order to download harvested addresses from one device to the other. By relieving the need to establish real time communication between the two devices, the infrastructure simplifies the process of creating duplicate, distributed data storages (e.g., databases) on different devices to store addresses that are harvested on different devices.

Once the network synchronizer 350 determines that the device 310 is available to receive the harvested address data, it (1) in the fourth stage, retrieves this data from the temporary storage 355 (5) and in the fifth stage, sends one or more packets to relay the data tuple that includes all the synchronized fields of received harvested address data to the device 310. In the sixth stage, the network synchronizer 335 of the device 310 receives the packet(s) and stores the data tuple in the harvested address data storage 110.

By so distributing the harvested address data, the harvesting architecture 300 of FIG. 3 creates duplicated, distributed data storages (e.g., databases) on different devices to store addresses that are harvested on different devices. This robust distributed data storage synchronization across multiple devices, combined with the harvesting of address data from multiple applications on each device, makes the address harvesting architecture of some embodiments very powerful as it can quickly build a very rich address storage that resides on multiple devices and that can augment the operation of multiple applications on each device.

While the architectures described above by reference to FIGS. 1-3 harvest a variety of different address (e.g., different types of telecom messages and physical address) from a variety of different applications, one of ordinary skill will realize that some embodiments might not harvest all these different addresses from all of these various different applications. Also, some embodiments perform their address harvesting on other types of documents, such as word processing documents, etc.

I. Telecom Messages

A. Harvesting Telecom Addresses

As mentioned above, the address harvester of some embodiments harvests and stores telecom addresses (e.g., email addresses and telephone numbers) that are used to send telecom message (such as emails and text messages). Examples of such addresses include individual email addresses or group email addresses that are used to send individual email messages, group email messages, individual invites (e.g., invites to an audio or video conference or a calendared event), and/or group invites. Other examples of such addresses include individual telephone numbers and group telephone numbers that are used to send individual text messages, group text messages, individual invites (e.g., invites to a video conference), and/or group invites.

Figure 4:
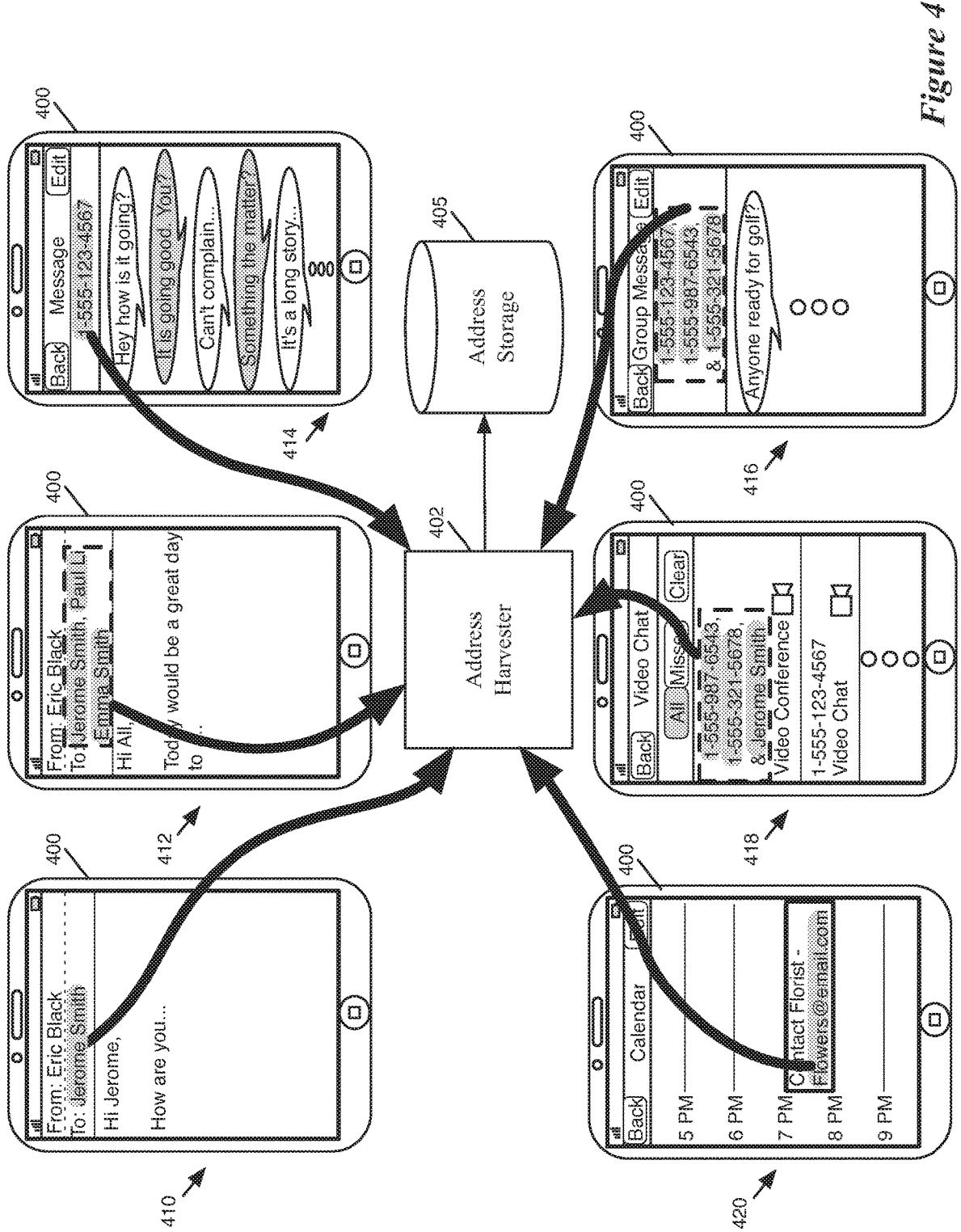
FIG. 4 presents an example that illustrates various telecom addresses being harvested on a device.

FIG. 4 presents an example that illustrates various telecom addresses being harvested on a device 400. For the embodiments illustrated in this example, the device is a smartphone, but it could be any other device in other embodiments. This example illustrates six different harvesting operations 410-420 that capture six different types of telecom addresses and that store the harvested addresses in a harvested address data storage 405.

In the first harvesting operation 410, an address harvester 402 of the device 400 receives a single email address for Jerome Smith that was used for an email message. The address harvester 402 in this operation stores the received email address in the harvested address data storage 405. In the second harvesting operation 412, the address harvester 402 receives three email addresses (for Jerome Smith, Paul Li, and Emma Smith) that are used for another email message. The email addresses for Paul Li and Emma Smith are new and get stored as new email addresses. The email address for Jerome, however, was previously captured in the first harvesting operation 410. Accordingly, it does not need to be individually stored again as it is already stored in the harvested address data storage 405.

However, the harvested address data storage 405 has not yet created a group email association for the group involving the email addresses of Jerome, Paul, and Emma. Thus, even though Jerome's email was previously stored, the address harvester 402 creates and stores in the harvested address data storage 405 an association to identify the emails for Jerome, Paul, and Emma as an associated group of emails. Different embodiments specify groups differently in the harvested address data storage 405. Also, different embodiments specify group associations between several emails at different times (e.g., some create a group the first time a group of emails are used for a telecom message, while other embodiments create a group the nth time (e.g., the $2^{nd}$ time) that the group of emails are detected. The creation of groups of associated emails is further described below.

In the third harvesting operation 414, the address harvester 402 receives a single telephone number (555-123-4567) that was used for a text message. The address harvester 402 in this operation stores the received telephone number in the harvested address data storage 405. In the fourth harvesting operation 416, the address harvester 402 receives three telephone numbers that are used for another text message. Two of the telephone numbers (555-987-6543 and 555-321-5678) are new and get stored as new telephone numbers. One telephone number (555-123-4567), however, was previously captured in the third harvesting operation 414. Accordingly, it does not need to be individually stored again as it is already stored in the harvested address data storage 405.

However, the harvested address data storage 405 has not yet created a group number association for the group involving the three numbers captured in the fourth harvesting session. Thus, even though one number was previously stored, the address harvester 402 creates and stores in the harvested address data storage 405 an association to identify the three telephone numbers captured in the fourth stage as an associated group of numbers. Different embodiments specify groups differently in the address storage 405 and recognize groups based on different criteria. The creation of groups of associated telephone numbers is further described below.

In the fifth harvesting operation 418, the address harvester 402 receives two telephone numbers and an email address that are used for sending a video conference invite to three individuals. Both the phone numbers (555-987-6543 and 555-321-5678) and the email address (Jerome Smith) were previously harvested and stored in the harvested address data storage 405 in the fourth and first harvesting operations 416 and 410, respectively. However, the harvested address data storage 405 has not yet created a group association for the group involving these two telephone numbers and the email address. Thus, the address harvester 402 creates and stores in the harvested address data storage 405 an association to identify the two telephone numbers and the email address as an associated group of email address and numbers.

Lastly, in the sixth harvesting operation 420, the address harvester 402 captures a new email address that was used to send a calendar event invite to another person. In particular, the address harvester 402 extracts the email address and its associated data (e.g., the name (if any) associated with the email address) and stores them in the harvested address data storage 405. As will be described below in the next example, the address may be stored with other information, such as ranking, references to other associated addresses for an address grouping, etc.

Figure 5:
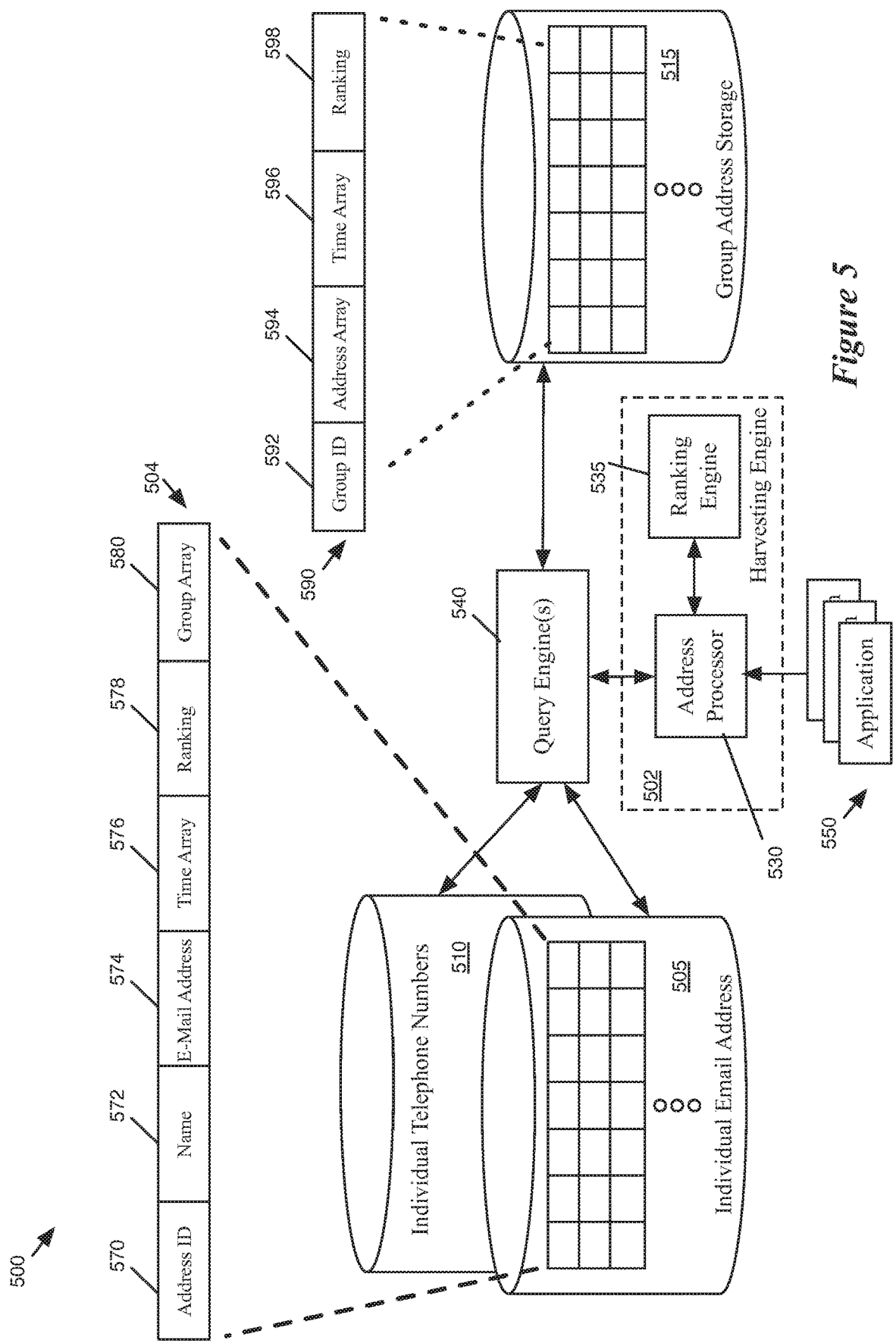
FIG. 5 illustrates an architecture for harvesting telecom addresses and storing these addresses in address storages.

FIG. 5 illustrates the architecture 500 for harvesting telecom addresses and storing these addresses in three address storages. In this architecture, a telecom address harvester 502 stores received individual or group telecom addresses in three address storages, which are an individual email address storage 505, an individual telephone number storage 510, and a group address storage 515. The harvesting engine 502 includes an (1) address processor 530 for processing addresses from applications 550 and (2) a ranking engine 535 for computing ranking scores for the addresses.

Figure 6:
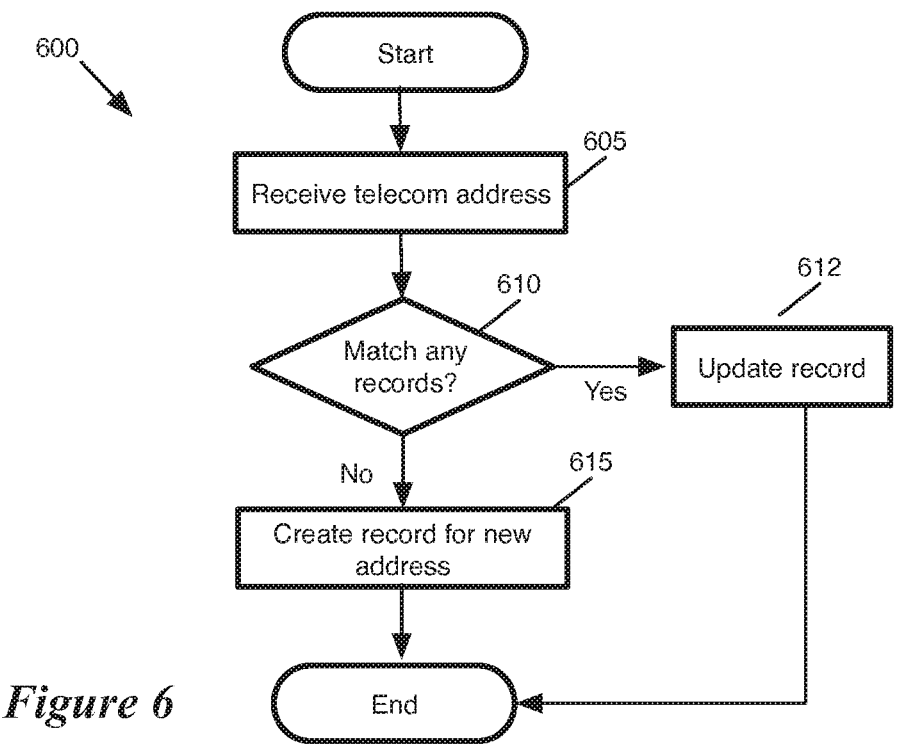
FIGS. 6 and 7 illustrate two processes that the address harvester of some embodiments performs.

The operation of the harvesting engine 502 will be described by reference to FIGS. 6 and 7, which illustrates two processes 600 and 700 that the address harvester performs in some embodiments in conjunction with a set of one or more query engines 540 (referred to below as the query engine) of the data storages 505, 510, and 515.

The harvesting engine 502 performs the process 600 for each telecom address that it receives. The process 600 starts (at 605) when the address processor 530 receives a telecom address from an application 550. In some embodiments, each time an application 550 sends an email message or a text message, it provides each email address or telephone number that it used to the address processor 530. When the email or text message was sent to multiple recipients, the address processor 530 receives multiple such email addresses or telephone numbers in one batch or successively, and performs the process 600 once for each individual address.

The address processor 530 then uses (at 610) the query engine 540 to determine whether the received address is stored in either of the individual storages 505 or 510. If not, it directs (at 615) the query engine 540 to create a new record for the received address in either the email address data storage 505 when the address is an email address, or in the telephone number data storage 510 when the address is a telephone number.

At 615, the address processor 530 in some embodiments uses the ranking engine 535 to compute a ranking score for the address. As mentioned further below, the ranking scores of the individual and group address records are used in creating a prioritized list of addresses for display when later matching these addresses to user input to provide the user with suggestions for completing the recipient list for a message.

Different embodiments use different techniques to create a ranking score. For instance, some embodiments base this ranking score on the frequency of use of the group of addresses. Instead of using ranking scores, other embodiments evaluate the values in the time array in real time to determine a value that determines the order of address records in a prioritized list. After 615, the process 600 ends.

FIG. 5 illustrates one example of a record 504 in the email address storage 505. As shown in this example, this records 504 contains an Address ID 570 to identify the record, a Name 572 to identify the name of recipient (if available), an email address 574, a time array 576, a ranking score 578, and a group array 580. The time array 576 includes up to N (e.g., up to five) time values for up to N most recent previous instances in which the email address was used to send an email message. The group array 580 includes the group ID of each group in which the email address was part of several email addresses and/or telephone numbers that were used to send an email or text message to a group of individuals. In some embodiments, the record for a telephone number record in the telephone number storage 510 contains the same fields as the email address record 568, while in other embodiments the telephone number record is slightly different (e.g., does not have a name field 572).

When the query engine 540 determines (at 610) that one of the individual address storages 505 or 510 already contained a record for the received address, the address processor 530 (at 612) directs the query manager to update the addresses previous created record in its data storage in order to reflect that it has again been received. In some embodiments, this updating involves updating the address record's time array to reflect the time for the current reception of the individual address. Also, for this update, the address processor 530 in some embodiments (1) uses the ranking engine 535 in some embodiments to compute a new ranking score based on the repeated reception of this address, and (2) directs the query engine 540 to use this new score to update the ranking score of this address in the previously specified record. After 612, the process 600 ends.

Figure 7:
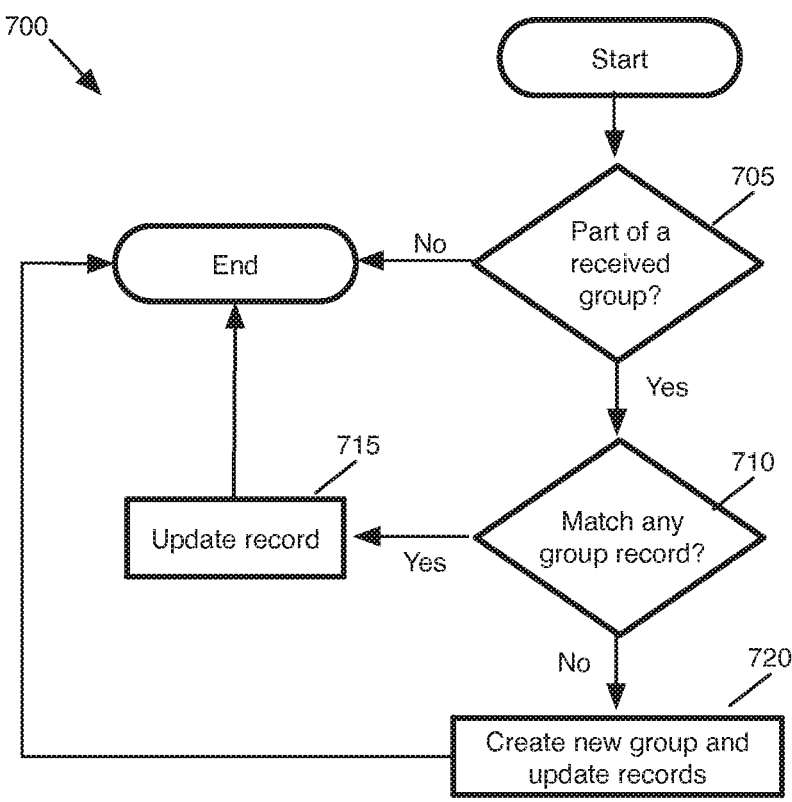

The address processor 530 performs the process 700 of FIG. 7 to maintain the group address data storage 515. For each address that it receives, the address processor 530 performs this process, but in some embodiments, it performs process 700 simultaneously for all addresses in a group. Initially, the address processor 530 determines (at 705) whether the received address was part of a group of addresses that were sent in an email or text message. In some embodiments, the address processor 530 simply determines whether it received other addresses along with the current address from the application that sent along this address. In some embodiments, the address processor 530 does this by examining a batch file in which the current address was sent. In other embodiments, the process makes this determination by comparing the timestamps of the received addresses in the message that the application used to call the processor, or by comparing the last timestamp of the received address' newly updated record in the address storage, with the timestamps of other newly received addresses or newly updated address records. When two or more addresses have identical timestamps or timestamps that are very close, the address processor 530 recognizes that the addresses were part of one group message.

When the address processor 530 determines (at 705) that the address was not part of a group message, it ends. Otherwise, it uses (at 710) the query engine 540 to determine whether this group was previously received for another message. For this task, the query engine 540 determines whether the intersection of all the group IDs of all the addresses in the group identified at 705 is an empty set or is a set with one group ID. When the intersection is an empty set, then the query engine ascertains that the group was not previously specified. Otherwise, when the intersection is a single group ID, then the query engine determines that the group was previously specified.

When the group previously did not exist, the address processor 530 directs (at 720) the query engine 540 to create a new record for the group in the group address data storage 515, and then ends. One example of a group record is illustrated in FIG. 5. As shown in this figure, a record 590 of a group includes a group ID 592 to identify the group, an address array 594 to identify the address ID of each address in the group (where the address ID specifies the address' record in an individual address storage 505 and 510), a time array 594 to specify up to M time values for up to M most recent time instances that the group was received, and a ranking score 596 for the group.

In creating this group, the address processor 530 in some embodiments uses the ranking engine 535 to compute a ranking score for the group. Different embodiments use different techniques to create a ranking score. For instance, some embodiments base this ranking score on the frequency of use of the group of addresses. As mentioned further below, the ranking scores of the individual and group address records are used in creating a prioritized list of addresses for display when later matching these addresses to user input to provide the user with suggestions for completing the recipient list for a message. Instead of using ranking scores, other embodiments evaluate the values in the time array 596 in real time to determine a value that determines order of address records in a prioritized list. Still other embodiments compute real-time values for only the individual addresses, and move the group addresses up on the list in the prioritized list when their individual addresses move up on the list; to prioritize between different group addresses for the same individual address, some embodiment use the last time values of the groups.

When the process 700 determines (at 710) that the group already exists in the group address data storage 515, the process 700 directs (at 715) the query engine 540 to update this groups record to indicate that it has been received again. In some embodiments, this updating involves updating the group's time array to reflect the time for the current reception of the group message. Also, in some embodiments, this updating involves updating the group's ranking score.

To update this score, the address processor 530 uses the ranking engine 535 in some embodiments. After 715, the process 700 ends.

B. Using Harvested Telecom Addresses

FIGS. 8-11 provide four examples of how the harvested addresses can be used to provide predicted recipients for telecom messages. In each of these examples, addresses are harvested on one device and relayed through the server infrastructure to another device. Also, each of these examples shows the use of the harvested telecom addresses to provide suggestion on the device that harvested the address, and on another device that received the harvested address through the server infrastructure. In these examples, the harvested addresses are the addresses that were captured in the examples illustrated in FIG. 4.

FIGS. 8-11 show the address harvester 402 capturing several telecom addresses (several emails, several telephone numbers, groups of emails, and groups of telephone numbers) on the device 400 and storing the captured telecom addresses in the harvested address data storage 405 before time A. Also, each of these figures shows the device 400 having a matching engine 805 and an input processor 810.

The input processor 810 receives the user's input of a telecom address, and relays this input to the matching engine 805. The user's input can be received through a standalone keyboard or an onscreen keyboard, through voice recognition interface, or through other input interface. In some embodiments, the matching engine 805 is part of the query engine of the data storages, and the input processor 810 is a prediction engine that receives user input and uses the matching engine 805 to formulate a list of stored telecom addresses that match the user input to present to the user. In some embodiments, the input processor 810, the matching engine 805 (which is the query engines of the data storages in some embodiments), and/or the data storages 405 are part of one addressing harvesting module that is used to harvest and store addresses, and it is used to match stored addresses with user input as the user prepares the recipient list for a telecom message. However, these modules are separately drawn in FIGS. 8-11 (as well as other figures like FIG. 12) in order to highlight their separate functionality.

The input processor 810 relays the user input even when the user input is incomplete. For instance, in the examples illustrated in FIGS. 8-11, the user has entered a portion of an email address (e.g., the letter J) or a portion of a number (e.g., 55). The input processor 810 relays this input to the matching engine 805. In turn, the matching engine 805 tries to find one or more individual telecom addresses or one or more group telecom addresses that match the portion of the input relayed by the input processor. As further described below, this matching becomes more and more refined with each additional character or address that the user provides while he is specifying the recipient(s) for an email or text message, because as the input processor 810 gets more user input, it relays the input to the matching engine 805.

In the examples illustrated in FIGS. 8-11, each device 850, 950, 1050 or 1150 that receives harvested addresses from the device 400 also has a matching engine 825 and an input processor 820, which perform operations similar to those of the matching engine 805 and input processor 810. Each of these other devices 850, 950, 1050 and 1150 has an address storage 855, 955, 1055 or 1155 that receives and stores harvested addresses from the address storage 405 through the server infrastructure. Specifically, in these examples, the devices 850, 950, 1050 and 1150 receive the harvested telecom addresses from the address storage 405 and store these addresses in their address storages 855, 955, 1055 and 1155 before time B.

Figure 8:
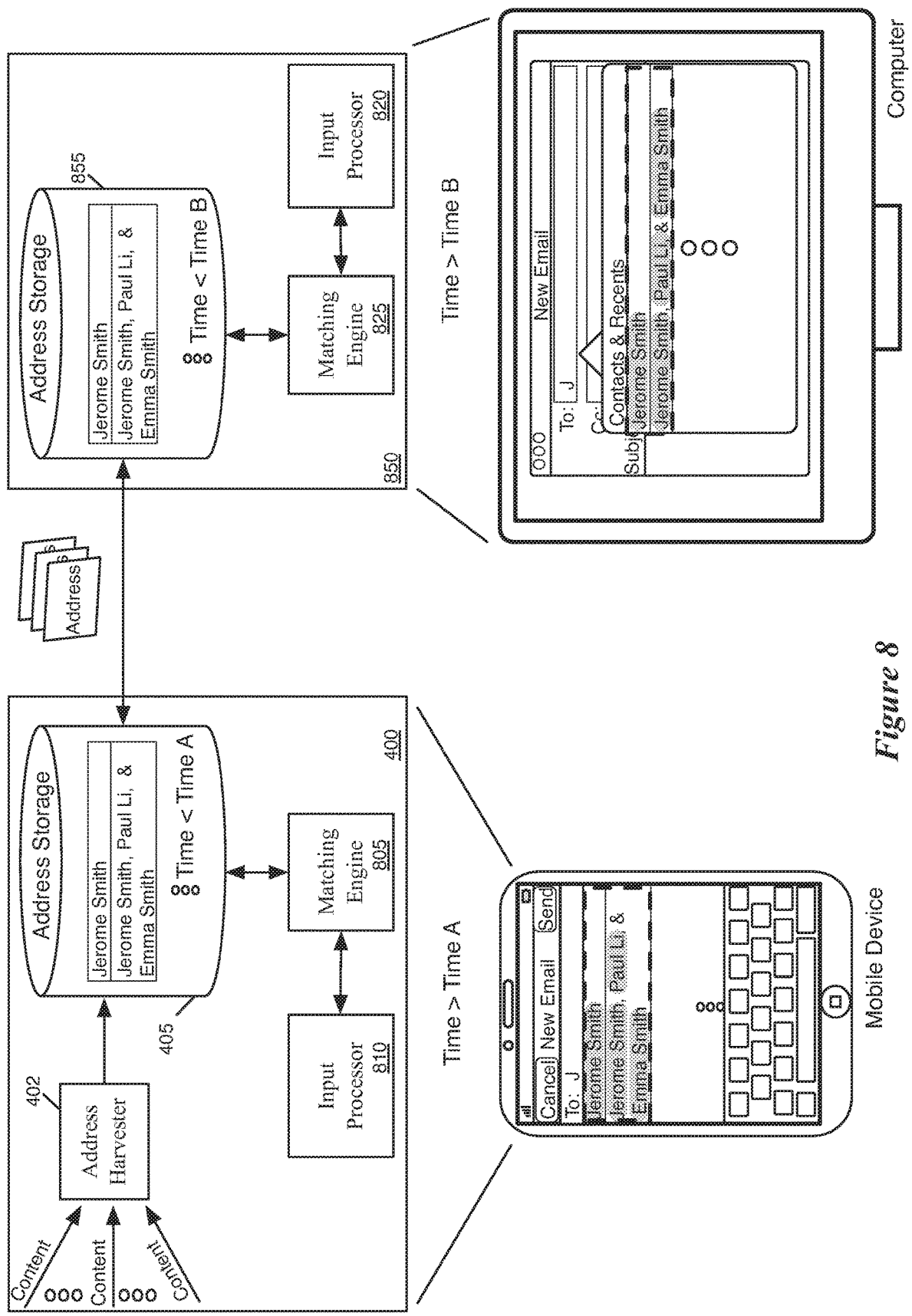
FIGS. 8-11 provide four examples of how the harvested addresses can be used to provide predicted recipients for telecom messages.

In the example illustrated in FIG. 8, the user of the device 400 at some time after time A, inputs "J" as the recipient of an email message. In response to this input, the input processor 810 relays "J" to the matching engine 805, which then matches it to the individual email for Jerome Smith, as well as the email group Jerome Smith, Paul Li, and Emma Smith. Accordingly, the matching engine 805 directs the input processor 810 to present simultaneously two selectable candidate recipient sets to the user. One recipient set includes only Jerome Smith's email, while the other includes the emails of Jerome Smith, Paul Li, and Emma Smith.

At some time after time B, the user of computer 850 in FIG. 8 similarly inputs "J" as the recipient of an email message. In response to this input, the input processor 820 relays "J" to the matching engine 825, which then matches it to the individual email for Jerome Smith, as well as the email group Jerome Smith, Paul Li, and Emma Smith. Accordingly, the matching engine 825 directs the input processor 820 to present simultaneously two selectable candidate recipient sets, one that includes only Jerome Smith's email, and another that includes the emails of Jerome Smith, Paul Li, and Emma Smith.

Figure 9:
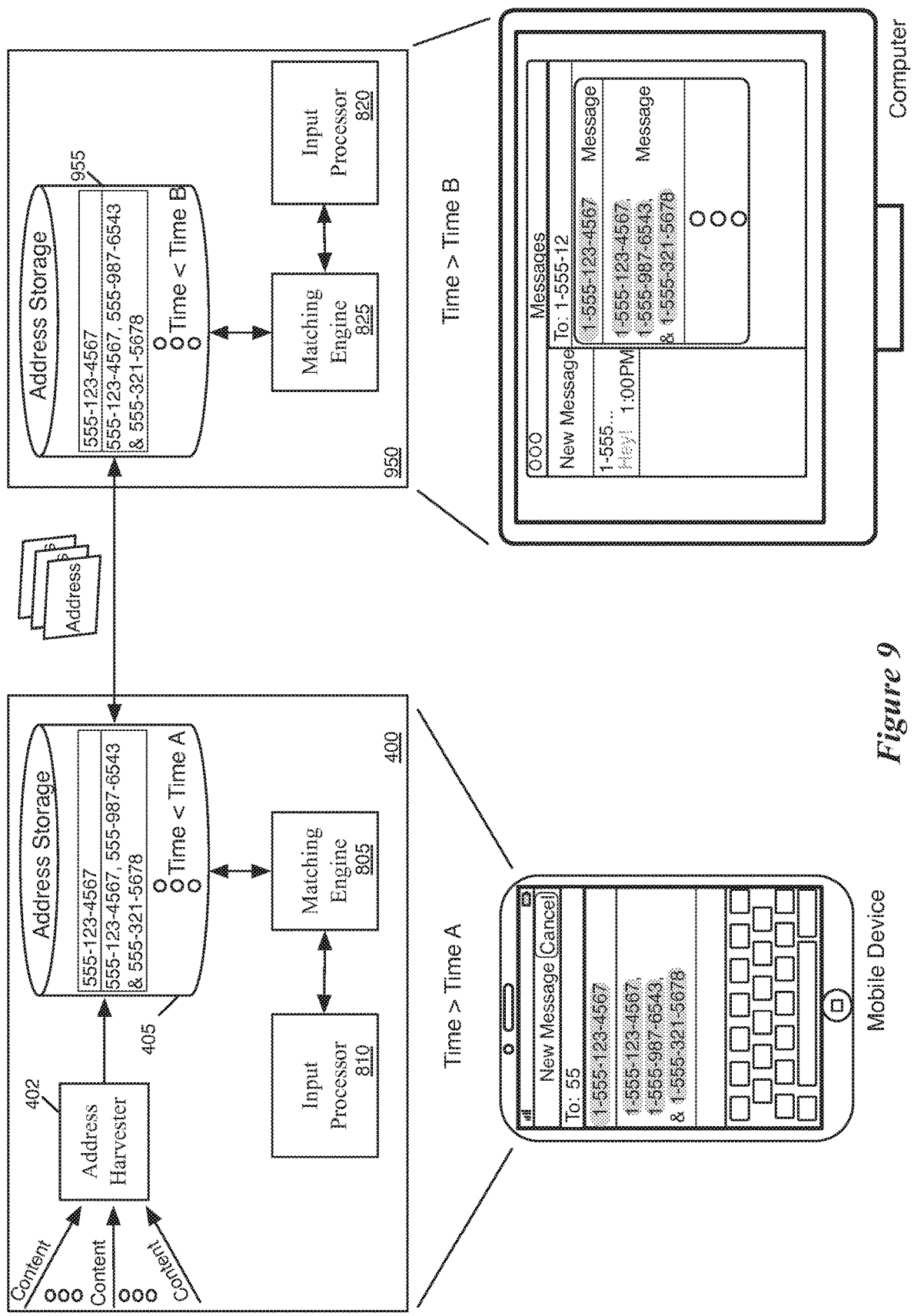

In the example illustrated in FIG. 9, the user of the device 400 at some time after time A, inputs "55" as the recipient of a text message. In response to this input, the input processor 810 relays "55" to the matching engine 805, which then matches it to the individual telephone number 555-123-4567, as well as the telephone number group that includes this number along with 555-987-6543 and 555-321-5678. Accordingly, the matching engine 805 directs the input processor 810 to present simultaneously two selectable candidate recipient sets to the user. One recipient set includes only 555-123-4567, while the other includes 555-123-4567, 555-987-6543, and 555-321-5678.

At some time after time B, the user of computer 950 in FIG. 9 similarly inputs "55" as the recipient of a text message. In response to this input, the input processor 820 relays "55" to the matching engine 825, which then matches it to the individual telephone number 555-123-4567, as well as the telephone number group that includes this number along with 555-987-6543 and 555-321-5678. Accordingly, the matching engine 825 directs the input processor 820 to present simultaneously two selectable candidate recipient sets, one that includes only 555-123-4567, and another that includes 555-123-4567, 555-987-6543 and 555-321-5678.

Figure 10:
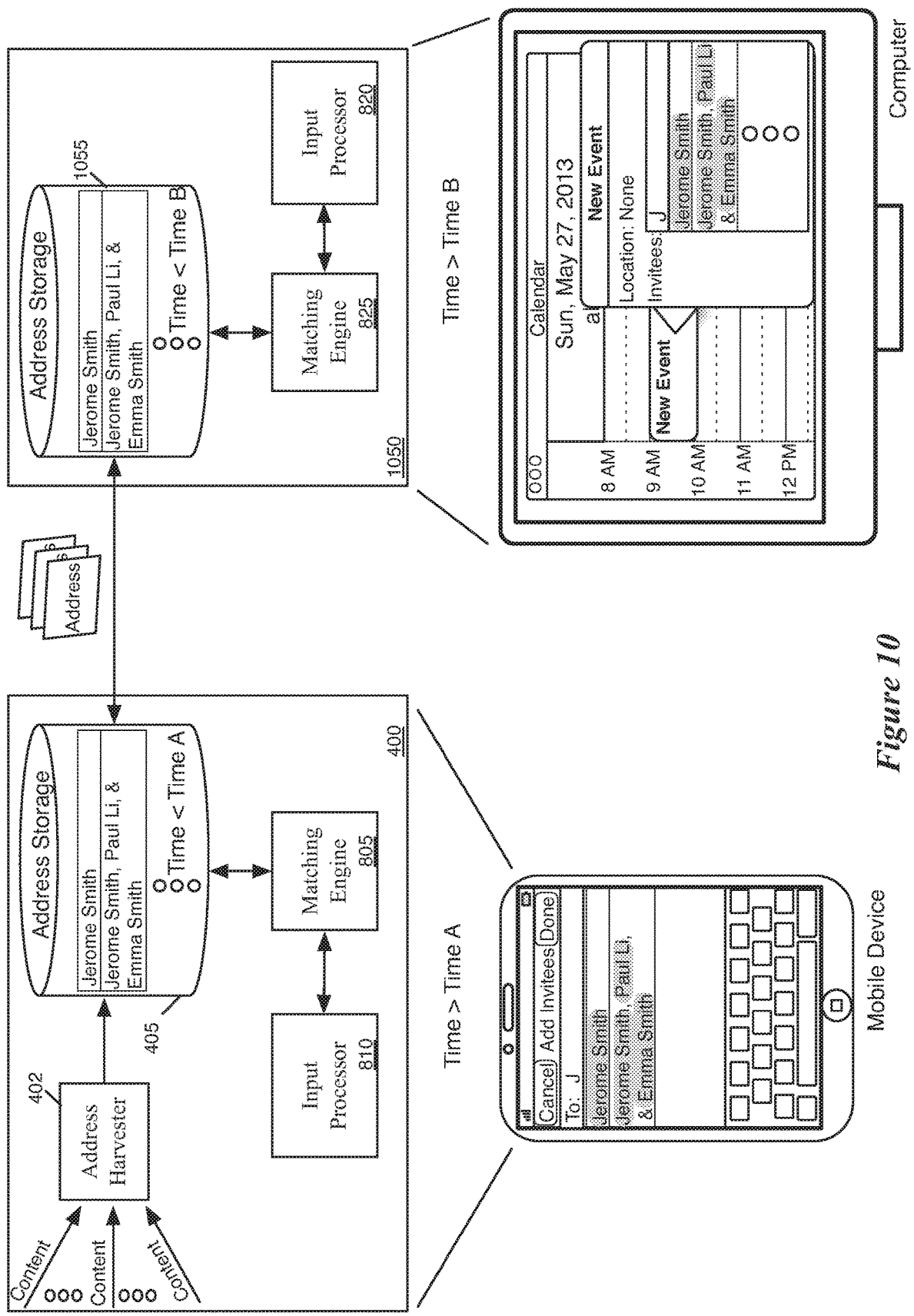

In the example illustrated in FIG. 10, the user of the device 400 at some time after time A, inputs "J" as the recipient of a calendar invite. In response to this input, the input processor 810 uses the matching engine 805 again to match the user's input to two different recipient sets (one that includes only Jerome Smith's email and another that includes the emails of Jerome Smith, Paul Li, and Emma Smith) that it presents simultaneously as two selectable candidate recipient sets to the user.

At some time after time B, the user of computer 1050 in FIG. 10 similarly inputs "J" as the recipient of another calendar invite. Again, in response to this input, the input processor 820 uses the matching engine 825 to match the user's input to two different recipient sets (one that includes only Jerome Smith's email and another that includes the emails of Jerome Smith, Paul Li, and Emma Smith) that it presents simultaneously as two selectable candidate recipient sets to the user.

Figure 11:
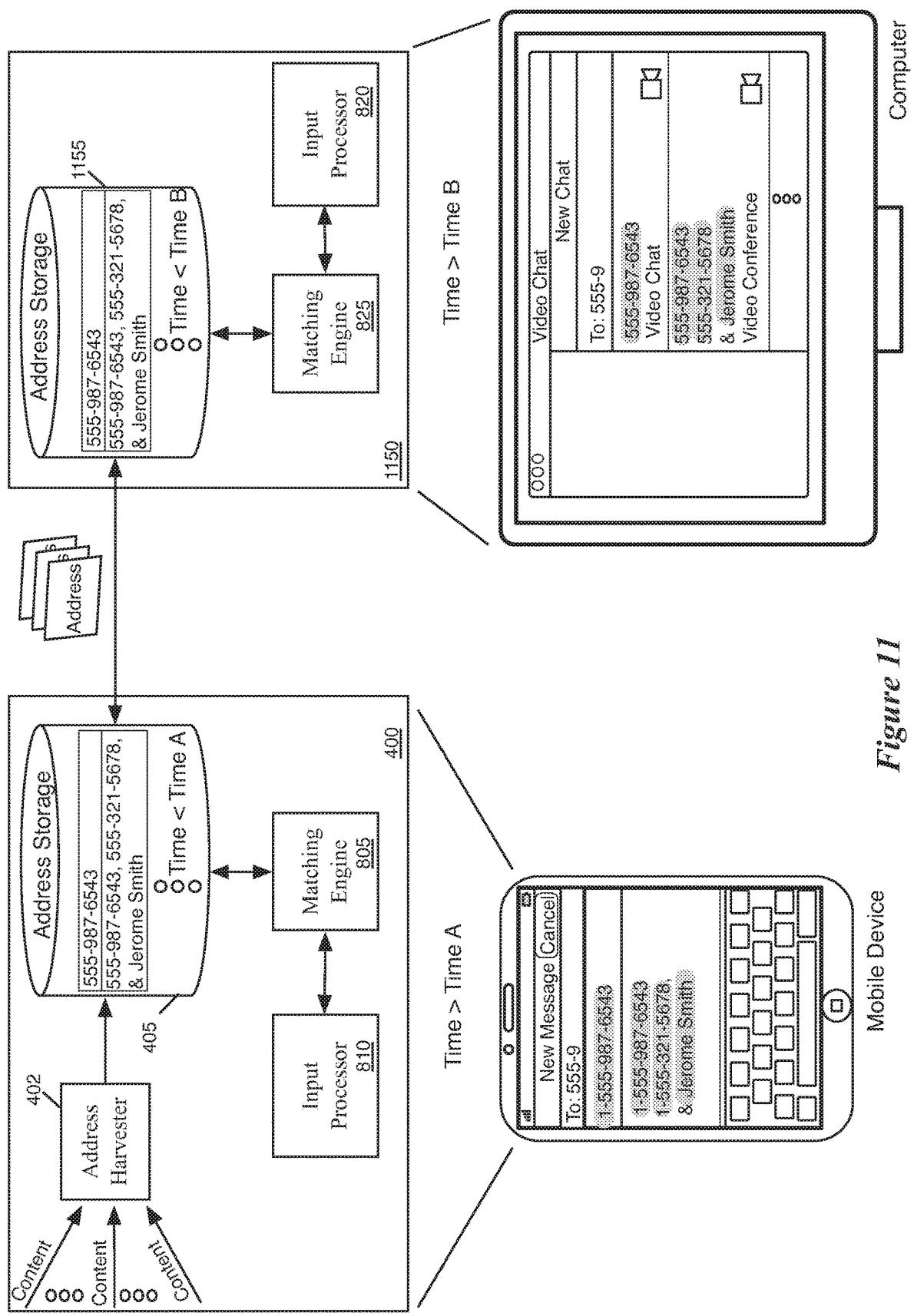

In the example illustrated in FIG. 11, the user of the device 400 at some time after time A, inputs "555-9" as the recipient of a text message. In response to this input, the input processor 810 relays "555-9" to the matching engine 805, which then matches it to the individual telephone number 555-987-6543, as well as the address group that includes this number along with 555-321-5678 and the email of Jerome Smith. Accordingly, the matching engine 805 directs the input processor 810 to present simultaneously two selectable candidate recipient sets to the user. One recipient set includes only 555-987-6543, and the other includes 555-987-6543, 555-321-5678, and the email address of Jerome Smith.

At some time after time B, the user of computer 1150 in FIG. 11 similarly inputs "555-9" in an invite list for a video conference. In response to this input, the input processor 820 uses the matching engine 825 to match the input to two different invitee sets (one that includes only 555-987-6543, and another that includes 555-987-6543, 555-321-5678 and the email address of Jerome Smith) that it presents simultaneously as two selectable candidate invitee sets to the user.

In the above-described examples, the individual telecom addresses or group telecom addresses that are harvested from one application's use of the addresses are made available to another application during the address matching. Also, a group of telecom addresses can include both telephone numbers and email addresses. However, other embodiments might not create groups that include telephone numbers and email addresses. Also, other embodiments might restrict the presentation of matching candidate telecom addresses to applications that match, or that have been designated as being within the same category of applications, as the application from which the matching candidate addresses were harvested.

Figure 12:
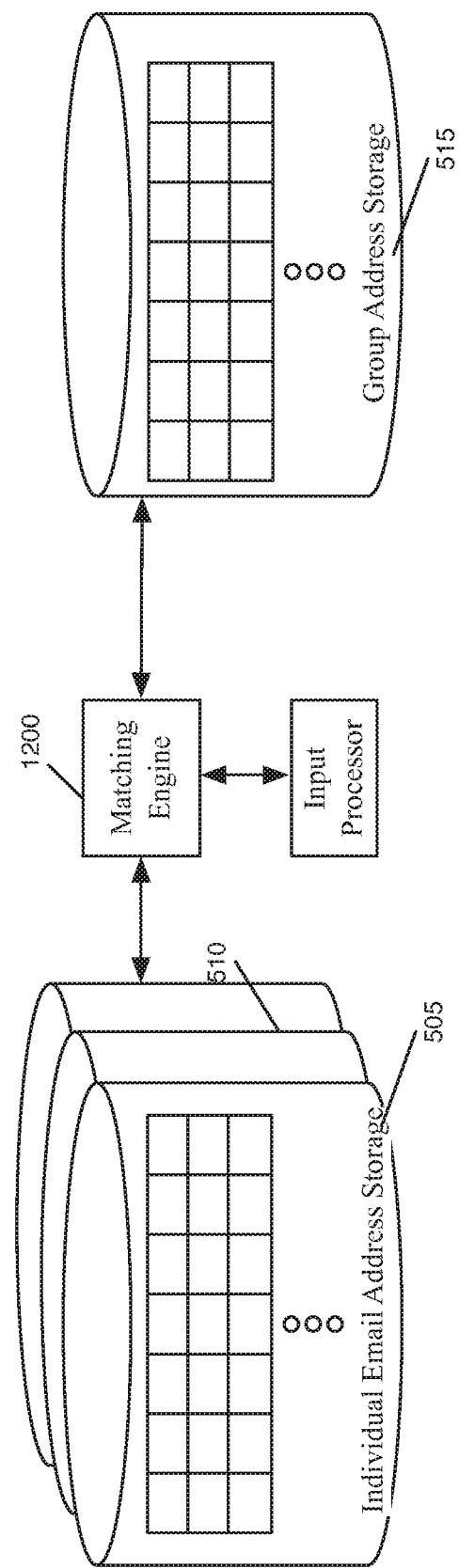
FIGS. 12 and 13 illustrate a matching engine of the device of some embodiments and the process performed by this engine to match user input to telecom addresses stored in the address storage.
Figure 13:
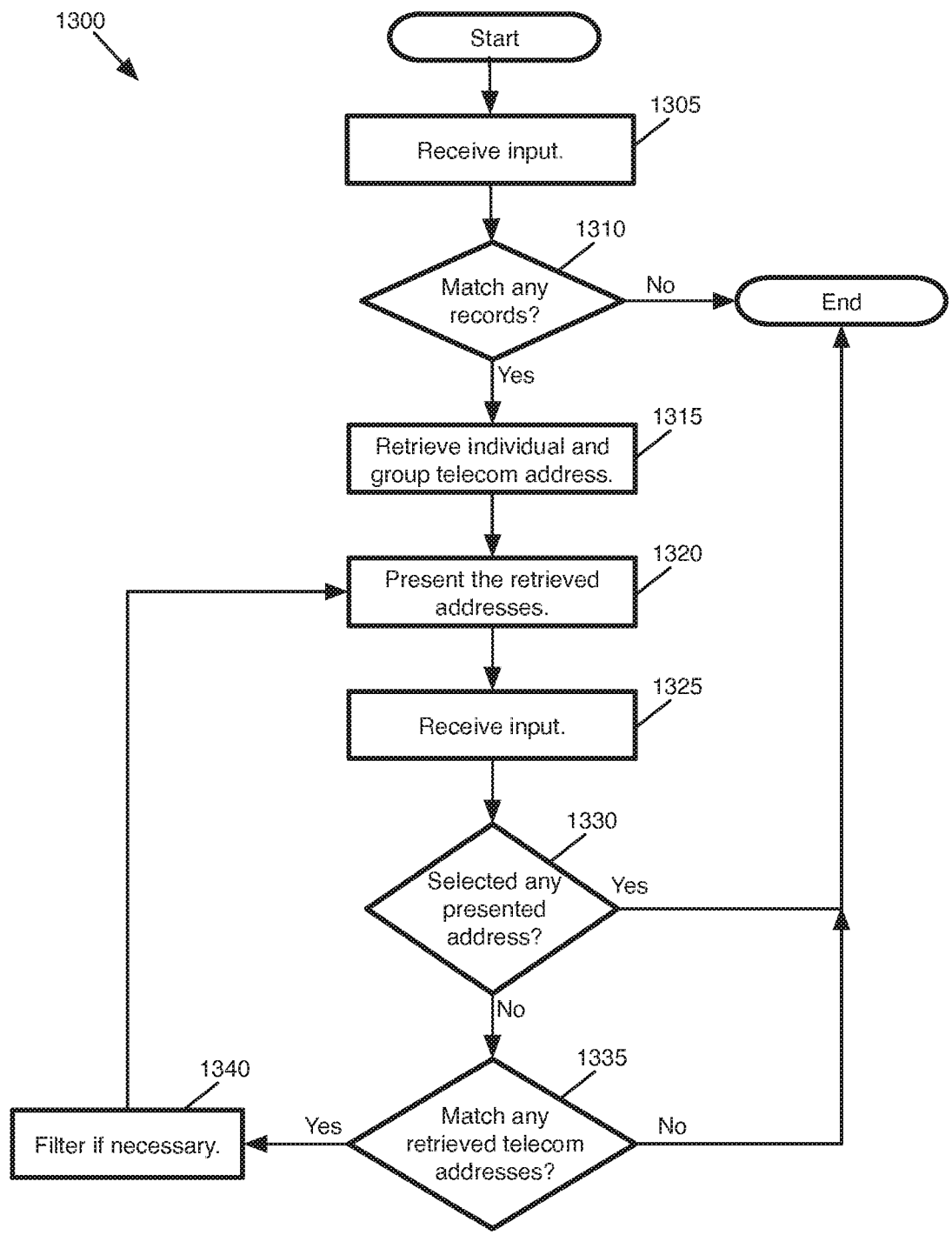

FIG. 13 conceptually illustrates a process 1300 that the matching engine of some embodiments uses to match user input to telecom addresses stored in the address storage. As shown in FIG. 12, a matching engine 1200 of the device of some embodiments performs this process by examining the three address storages 505, 510, and 515 described above by reference to FIG. 5.

As shown FIG. 13, the process initially receives (at 1305) input. In the examples described above, the input processor relays user input to the matching engine 1200. The process 1300 then tries (at 1310) to match this input to one or more records in the address storage. As mentioned above, the matching records can be individual telecom addresses or group telecom addresses.

If the process 1300 cannot find (at 1310) any matching record, it ends. Otherwise, it aggregates (at 1315) any matching individual telecom address or group telecom address. It then directs (at 1320) the input processor to present the aggregated set of matching telecom addresses to the application that supplied the input, so that the application can present this set to the user. As mentioned above, some embodiments present the set of matching telecom addresses to the user with each matching telecom address as a selectable option in a list. Also, some embodiments present the matching telecom addresses in the set based on a particular sorted order. Several manners for presenting matching telecom addresses according to sorted orders will be described further below.

At 1325, the process 1300 receives another input from the input processor. It determines (at 1330) whether this input was a selection of one of the matching telecom addresses in the set provided at 1320. If so, the process ends. Otherwise, the process determines (at 1335) whether the combination of the new and old user input specifies an address that still matches one or more records in the address storage. If not, the process ends. Otherwise, the process filters (at 1340) the previously aggregated set of matching telecom addresses to only keep the set of telecom addresses that match the new address or addresses specified by the user input. The filtered set of matching telecom addresses becomes the next aggregated set of matching telecom addresses. The process then returns to 1320 where it directs the input processor to present this new aggregated set of matching telecom addresses to the application that supplied the input, so that the application can present this set to the user.

One of ordinary skill will realize that other embodiments implement the matching process 1300 differently. For instance, the process 1300 maintains a current aggregated set of matched addresses and filters this set based on additional user input. In other embodiments, however, the process 1300 does not maintain such a set and does not need to determine (at 1330) if the user selected one of the candidates. Instead, in some of these embodiments, the process terminates after 1320, and resumes from the start each time the user inputs a new character or a new address. In some of these embodiments, an overall matching process maintains the addresses retrieved in each iteration to remove any record that is no longer applicable, as it no longer matches the current overall search query.

C. Sorted Presentation of Retrieved Harvested Telecom Addresses

When a user inputs a portion of a list of recipients for an email or a text message, the prediction engine (e.g., the input processor of FIGS. 8-11) of some embodiments identifies the stored individual and group telecom addresses that match the user input. It then puts these matching addresses in a sorted order and presents these addresses according to this order, so that the user can select one of them to complete the input of the recipient list.

As mentioned above, some embodiments compute ranking scores for individual and group telecom addresses and use this ranking score to create the sorted order (e.g., a sorted list) of the matching telecom addresses for the user. Different embodiments use different techniques to create a ranking score. For instance, some embodiments base this ranking score on the frequency of use of the individual or group addresses. Others base the ranking score for each telecom address record based on this record's timestamps that shows how recently this record was updated. Still other embodiments compute the ranking score for a telecom address record based on both the frequency of use of the telecom address in sent messages, and its record's timestamps that specify how often the telecom address was used recently. In some embodiments, the ranking engine 535 periodically examines the telecom address records in the email address, telephone number and/or group address tables and updates the ranking score of each record.

Instead of using ranking scores, other embodiments evaluate the timestamp values of the address records in real time, in order to determine the order of address records in a prioritized list. Still other embodiments compute real-time values for only the individual addresses, and move the group addresses up on the list in the prioritized list when their individual addresses move up on the list; to prioritize between different group addresses for the same individual address, some embodiment use the last time values of the groups.

More specifically, for individual telecom addresses, some embodiments use these timestamps to make decisions regarding the sorted order, while other embodiments use the timestamps to compute real-time scores that they then use to determine the order. In some embodiments, the timestamps are used to not only quantify how frequently an individual address has been used, but also to quantify how recently the address has been used. The combination of these two factors is referred to as Frecency in the discussion below. For the retrieved telecom address records, some embodiments use the two factors to compute Frecency scores, which are then used to sort the address records for display. Other embodiments, however, use these two factors (i.e., use the Frecency of the address records) to make decisions regarding the sorted order.

For example, in some embodiments, the address harvester stores up to 5 timestamps for each individual telecom address that indicate the 5 most recent instances in time that the address was used. To sort the retrieved telecom addresses, the input processor first presents the addresses that have been received 5 times, then presents the addresses that have been received 4 times, then presents the addresses that have been received 3 times, and so on. Within each group that has been received the same N times, the input processor sorts the addresses that have been received most recently (i.e., that have the latest timestamp) higher on the order. The input processor in these embodiments deviates from these sorting rules only (1) for matching address groups, and (2) for addresses that match the input string exactly. As mentioned above, the input processor in some embodiments moves a matching address group along the sorted order to appear next to the highest ordered individual address in the group.

Figure 14:
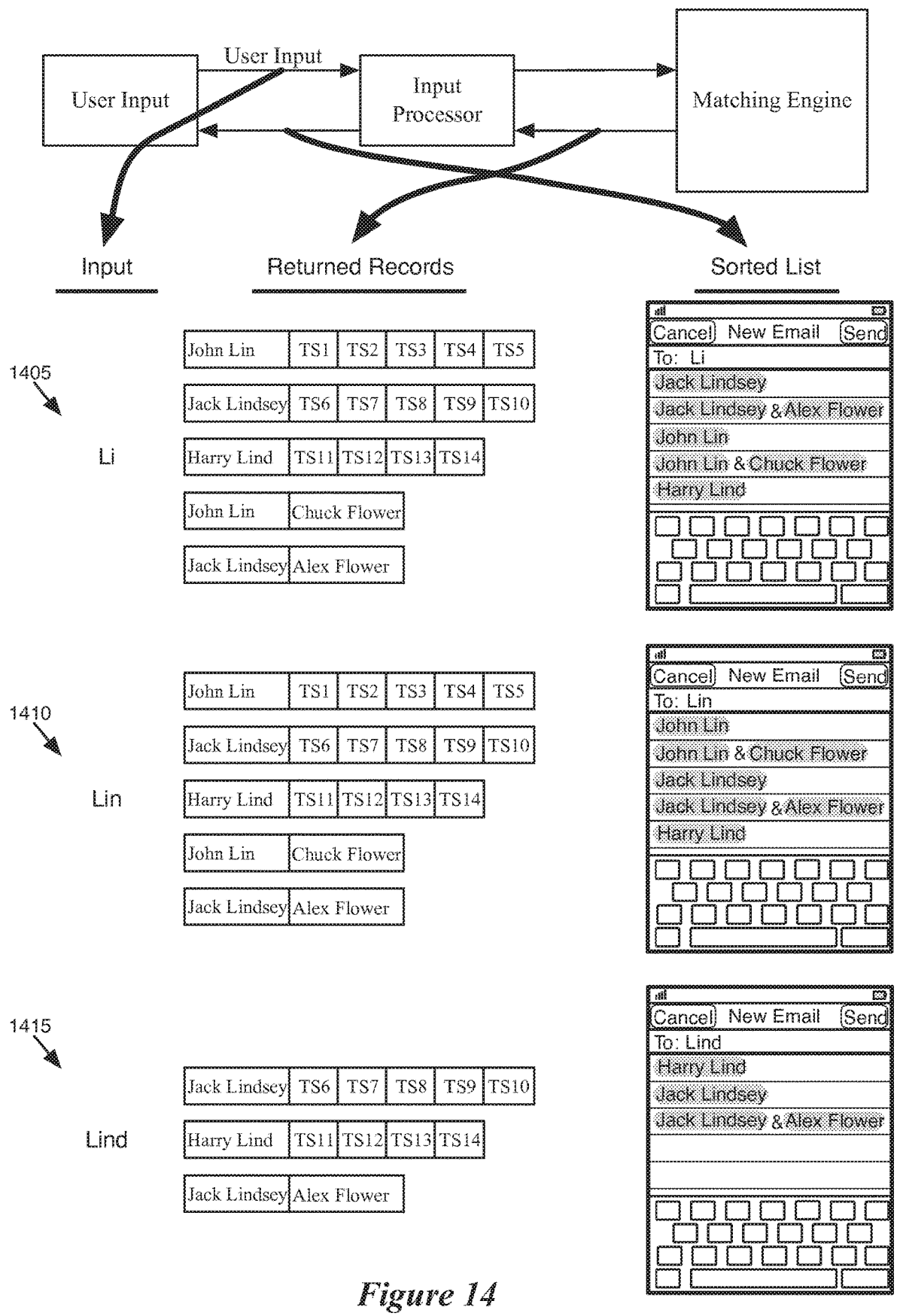
FIG. 14 illustrates different sets of records that are retrieved and presented in a sorted order based on different input strings as a user types a recipient's email address.

FIG. 14 illustrates the above-described approach and the above-mentioned two exceptions. Specifically, in three stages 1405, 1410, and 1415, it illustrates three sets of records that are retrieved and presented in a sorted order based on three different input strings as a user types a recipient's email address. This figure shows that the input processor received each set of records from the matching engine based on an input string supplied by a UI module that receives the user input.

The first stage 1405 shows three individual records and two group records that match the input string "Li." The individual records are the email address for John Lin, Jack Lindsey and Harry Lind, while the group records are a first group involving email addresses for John Lin and Chuck Flower and a second group involving email addresses for Jack Lindsey and Alex Flower. The email addresses for John and Jack have been received five times each, while Harry's email address has only been received four previous times. Also, Jack's email address has the most recent timestamp.

Accordingly, based on the above described rules, Jack Lindsey's individual and group addresses are displayed first, followed by John Lin's individual and group addresses, and then followed by Harry Lind's email address. Harry is at the bottom of the sorted list because his email has been less frequently used (4 times) than the emails of John and Jack (5 times). Jack's email address is higher on the list because Jack's email address has the latest timestamp.

The second stage 1410 shows that for the new search string "Lin," the same three individual records and two group records have been retrieved. However, the sorted order in this stage has been modified to put John's individual and group email addresses higher than Jack's because John's last name is a perfect match for the current input string. This perfect match trumps the more recent use of Jack's email address.

The third stage 1415 shows that the input processor receives a modified set of records for the new search string "Lind." This set of records no longer includes John Lin's records as Lin no longer is a match of the input string Lind. Also, the third stage shows that the sorted order has been modified to put Harry's individual email addresses higher than Jack's because Harry's last name is a perfect match for the current input string. This perfect match trumps the more recent use of Jack's email address and the more frequent use of Jack's email address. One of ordinary skill will realize that other embodiments may present Jack's individual and group email addresses higher than Harry's email address in the sorted list because Jack's email address has a higher frequency of use.

II. Physical Addresses

A. Harvesting Physical Addresses

As mentioned above, the address harvester of some embodiments harvests and stores physical addresses. Examples of such harvested addresses include physical addresses that are harvested from email message, text message, calendared events, electronic tickets, etc. Alternatively, or conjunctively, these harvested addresses include physical addresses that a user of the device browses with a web browser or a map application that executes on the device. Such browsing entails searching for the addresses, viewing the addresses, and/or using the addresses to specify a route to view or navigate.

Figure 15:
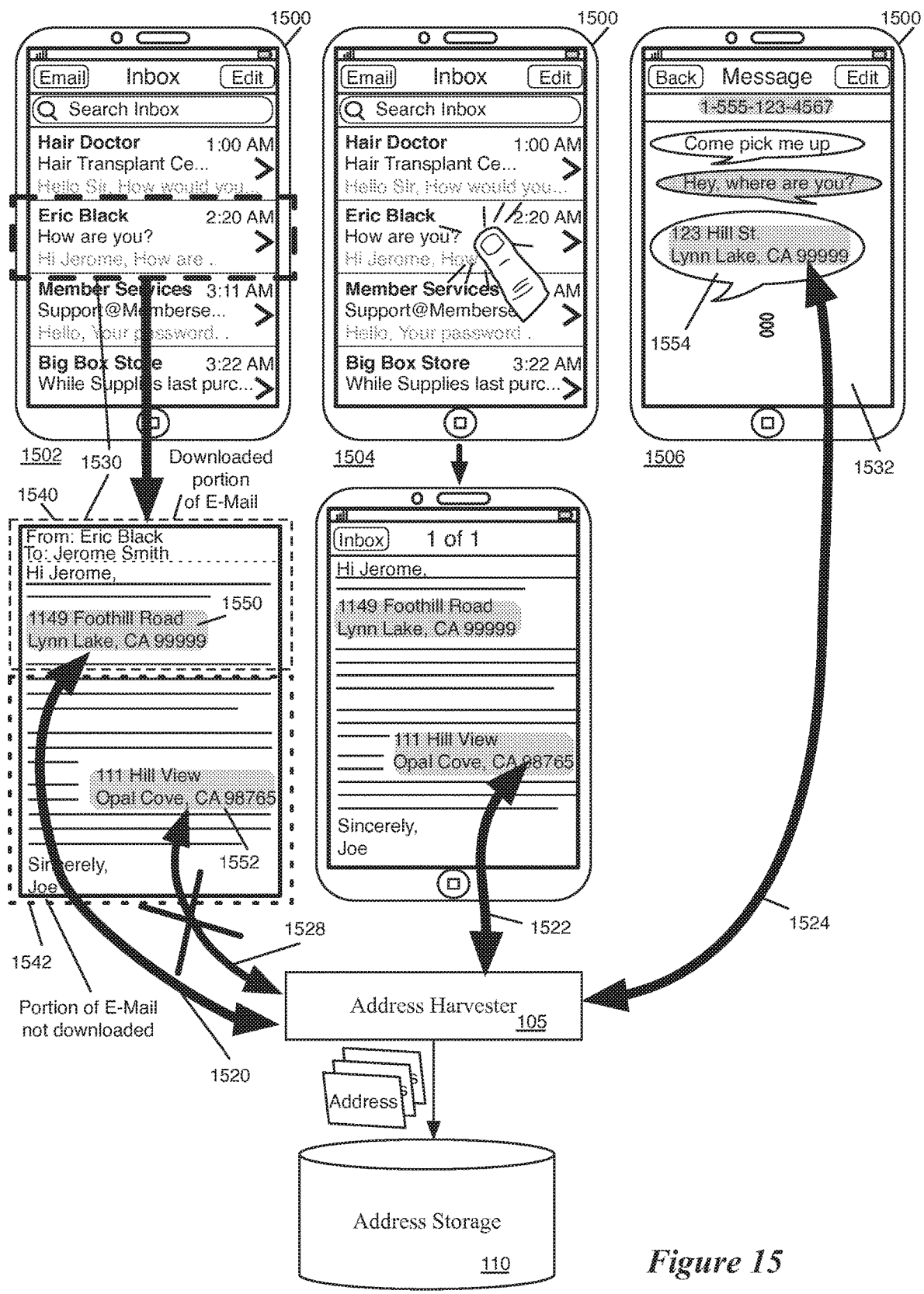
FIGS. 15 and 16 presents several examples of the address harvester capturing physical addresses in emails and text messages.
Figure 16:
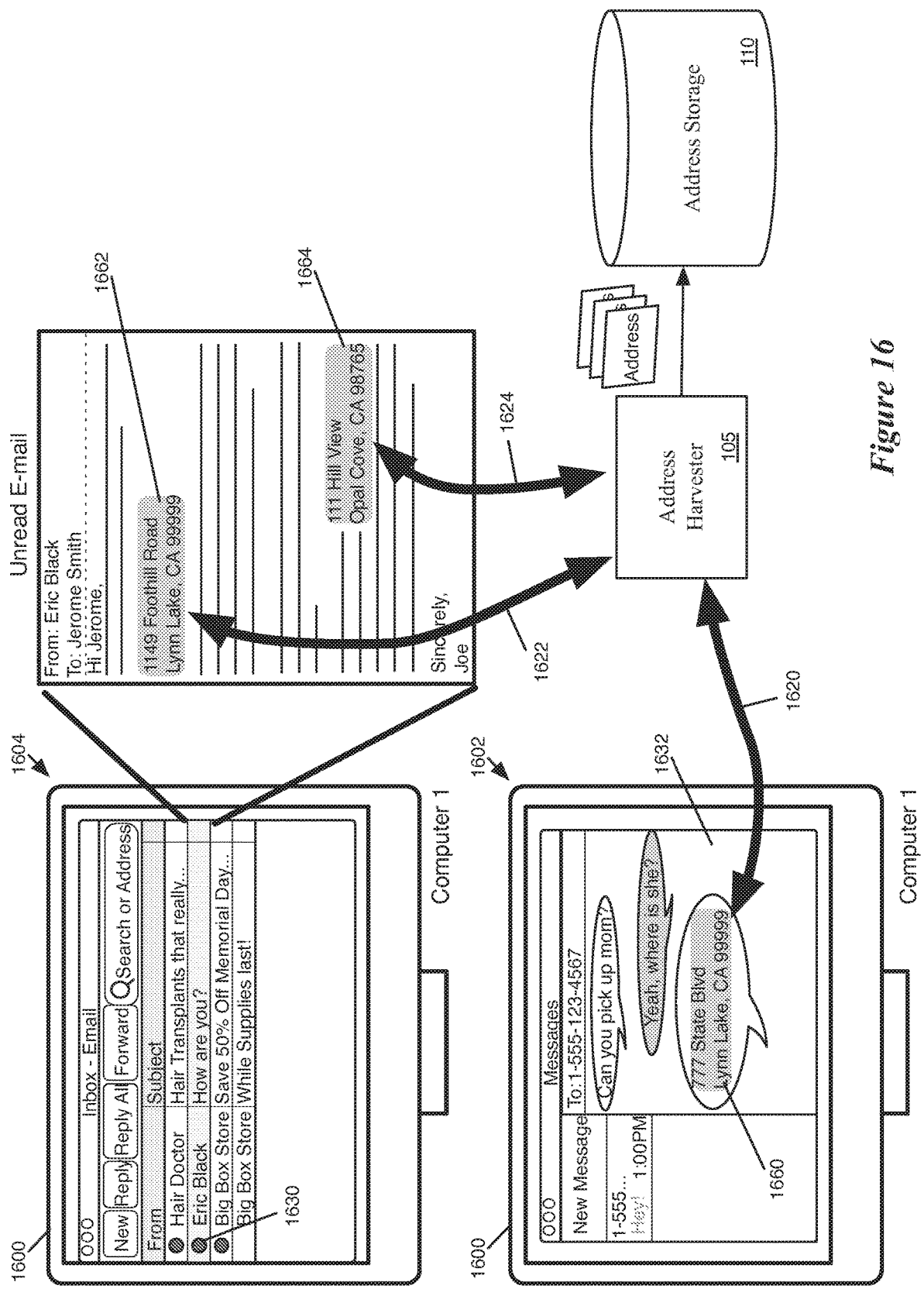

FIGS. 15 and 16 presents several examples of the address harvester 105 capturing physical addresses in emails and text messages. FIG. 15 illustrates an address harvester 105 of a smartphone 1500 capturing several physical addresses in emails and text messages that it receives. Although the addresses are harvested from received messages in FIG. 15, one of ordinary skill will realize that the address harvester 105 harvests physical addresses in sent messages as well in some embodiments. Also, while a smartphone is shown in this figure, the address harvester 105 of a computer, a tablet or any other electronic device performs the same capture operations in some embodiments.

FIG. 15 shows three harvesting operations 1520, 1522, and 1524 that the address harvester 105 performs on a received email 1530 and text message 1532 in three different stages 1502, 1504, and 1506. It also shows one harvesting operation 1528 that it does not perform.

The first stage 1502 shows the address harvester 105 performing the first harvesting operation 1520 on a partially downloaded version of the email 1530. To conserve bandwidth consumption, the email application of some embodiments does not download an email in its entirety until the email is selected for review. Rather, the email application downloads a portion of the email to provide sufficient preview of the emails content.

FIG. 15 illustrates a portion 1540 of the email that is downloaded before the email has been selected for review. Specifically, the portion 1540 includes some of the email heading information and a section of the email's body. The figure also illustrated a portion 1542 of this email (e.g., the remaining section of the body) that is not downloaded before the email is selected for review. As shown in this figure, both portions contain a physical address in this example. As further shown, the address harvester 105 captures the address 1550 in the downloaded portion 1540 and stores this physical address in the address storage 110. The arrow 1520 that represents the first harvesting operation of the harvester illustrates this capture pictorially. As illustrated by the crossed out arrow 1528, the harvester does not capture and store the physical address 1552, as this address is in the portion of the email that the email application does not download.

The second stage 1504 shows the selection of the email 1530 and its subsequent downloading for display on the device 1500. Once this email is downloaded, the address harvester 105 captures the physical address 1552 in the second harvesting operation 1522 and stores this address in the address storage 110. The third stage 1506 shows the address harvester 105 performing the third harvesting operation 1524. In this operation, the harvester captures a physical address 1554 in the text message 1532 and stores this address in the address storage 110.

FIG. 16 illustrates the address harvester 105 of a computer 1600 capturing physical addresses in an email and a text message that it receives. Although the addresses are harvested from received messages in this figure, one of ordinary skill will realize that the address harvester 105 harvests physical addresses in sent messages as well in some embodiments.

FIG. 16 shows three harvesting operations 1620, 1622, and 1624 that the address harvester 105 performs on a received email 1630 and text message 1632 in two different stages 1602 and 1604. The first stage 1602 is similar to the third stage 1506 of FIG. 15, in that during this stage 1602 the harvester captures a physical address 1660 in the text message and stores this address in the harvested address data storage 110.

On the other hand, the second stage 1604 illustrates a difference between the harvesting emails on computers and on mobile devices in some embodiments. Specifically, unlike the harvester 105 of the mobile device 1500 that does not download and search through an unread email to harvest physical addresses, the harvester 105 of the computer 1600 downloads and searches through an unread email to capture any physical address mentioned in the email. Accordingly, the second stage 1604 shows two harvesting operations 1622 and 1624 that the harvester 105 performs on the unread email 1630 to capture two physical addresses 1662 and 1664 and store these addresses in the address storage 110. In some embodiments, the harvester 105 does not review all emails but only reviews certain emails. For instance, the harvester 105 of some embodiments does not review any emails that are marked as junk emails (e.g., in junk email folder) but only reviews other emails (e.g., in the inbox folder, in the sent folder, etc.).

As further described below, some embodiments generate and associate a ranking score to each harvested physical address, in order to differentiate the harvested physical addresses, which can be numerous. Such ranking is based on a variety of criteria. These criteria in some embodiments include the type of message that was the source of the address, the identity of the sender of the text message or email, the user's interaction with the address, etc. These criteria will be further described below.

Figure 17:
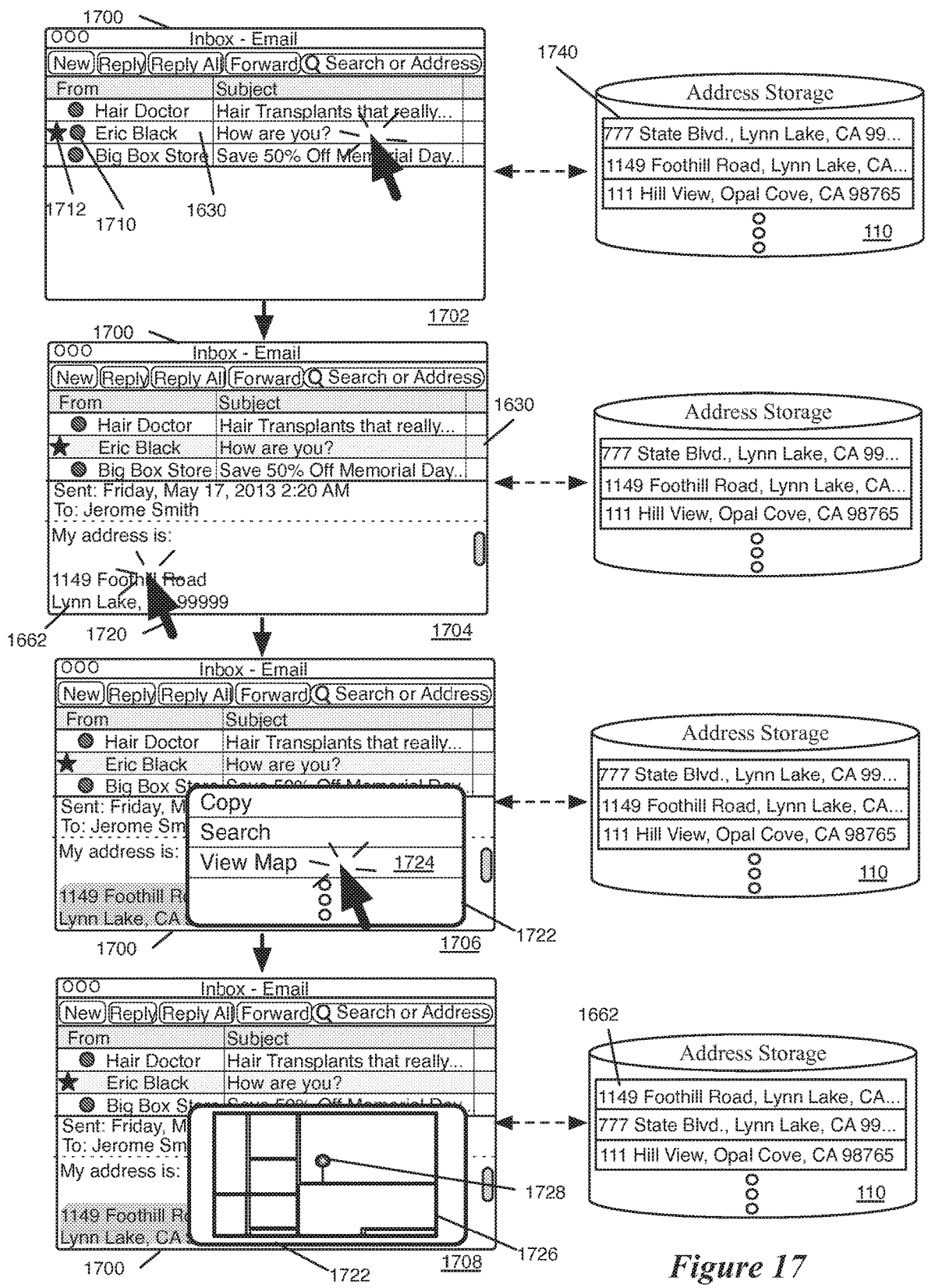
FIG. 17 illustrates adjusting the ranking of a harvested physical address based on the viewing of this address in a map.

Such criteria helps differentiate physical addresses harvested in emails from random individuals on one hand, and physical addresses harvested from emails from friends on the other hand. These criteria also differentiate physical addresses that the user views from physical addresses that user does not view. FIG. 17 presents an example that further explains such criteria. Specifically, it illustrates adjusting the ranking of a harvested physical address based on the viewing of this address in a map.

The example illustrated in FIG. 17 is shown in four stages 1702, 1704, 1706, and 1708. The first stage 1702 shows the email 1630 along with several other emails in an inbox of an email application 1700. As indicated by the symbol 1710, the email 1630 has not yet been read. Also, as indicated by the star symbol 1712, this email is from a person who is in a list of individuals recognized by the email application. In some embodiments, the list of recognized individuals includes people who the user of the application has designated as very important people (VIPs) or favorite people. Instead of, or in addition to, these people, the list of recognized individuals includes people who are in the address book, contact list, or other electronic rolodex of the computer.

The first stage 1702 shows that the address storage 110 includes the physical address 1662, which as mentioned in FIG. 16 was harvested even before the email 1630 is read. Because this email is from a person on the recognized list, it has been ranked with a high rank in the address storage 110. For illustrative purposes, the ranking of each physical address is conceptually shown by its position on the table 1740. The top row of the table representing the highest rank.

The second stage 1704 shows the email 1630 after it has been opened for reading. This stage also shows the selection of the physical address 1662 with a location indicator 1720. In this example, the location indicator is a cursor controlled by a cursor controller, but in other embodiments it can be any location indicator. For instance, it can be a visible or invisible touch indicator of a touch sensitive screen of the device 1700.

The third stage 1706 shows that the selection of the physical address results in the display of a contextual menu 1722. This menu has several options, one of which provides for the viewing of the physical address in a map. The third stage 1706 shows the selection of the view map option 1724 in the menu.

The fourth stage 1708 shows that the selection of the view map option 1724 results in a thumbnail display of the map 1726 in the contextual menu 1722. The displayed map shows the position of the physical address by marking the location with a pin 1728. The fourth stage also shows that the viewing of the physical address in the map results in a higher rank for the harvested physical address in the address storage 110. This higher rank is conceptually shown in the fourth stage with the record for the address 1662 moving to a higher position on the table 1740. In some embodiment, the thumbnail map 1726 can be selected. This selection causes a browser or mapping application to display a much larger version of the map. In some embodiments, the selection of the thumbnail map and the viewing of the larger map further increase the ranking score of the harvested physical address 1662. Examples of viewing a larger version of a map in a mapping application will be provided below.

Viewing physical addresses in emails is not the only mechanism for harvesting a physical address and adding it to the address storage with a ranking score to indicate the user's particular interaction with it. Such address records can be created by publishing physical addresses to the maps application, or by viewing, searching, or routing to such addresses in the maps application.

Figure 18:
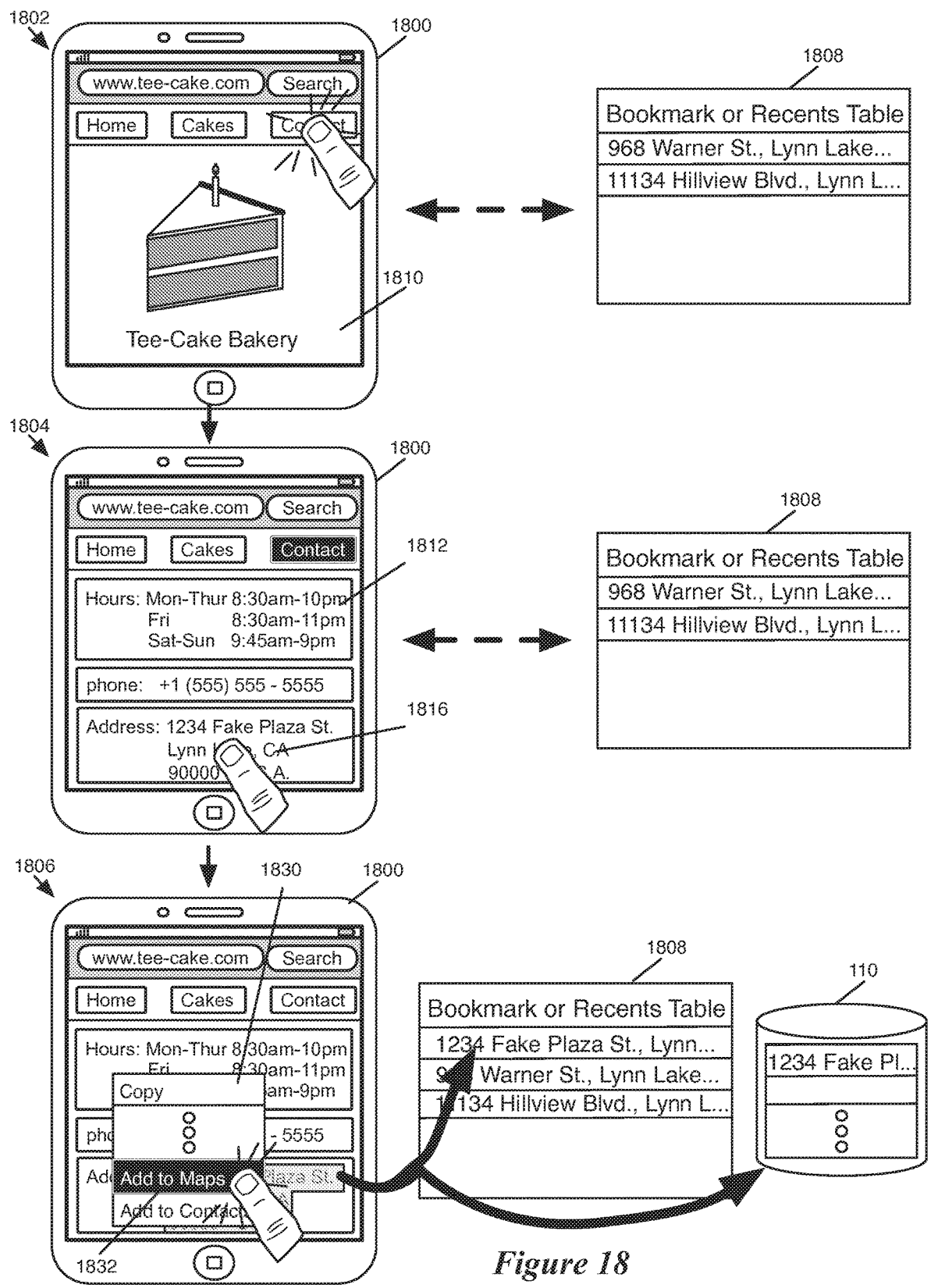
FIG. 18 illustrates an example of publishing a physical address to the map application, and in the process harvesting this physical address for storage in the address storage.

FIG. 18 illustrates an example of publishing a physical address to the map application, and in the process harvesting this physical address for storage in the address storage 110. This example shows the address being published to a Bookmark or Recents table 1808 of a maps application through a selection that is made in a web browser that executes on a mobile device 1800. A Bookmark table is a table that contains a number of locations on a map that are Bookmarked by the application or a user. The Recents table is a table that contains recent locations or routes searched by the map application.

FIG. 18 illustrates its example in three stages 1802, 1804, and 1806 of interactions with the browser 1810. The first stage 1802 presents the browser showing a first webpage 1810 of a website of a Tee-Cake Bakery. This stage also shows the user's touch selection of a contact option on this page through a touch-sensitive screen of the device 1800.

This selection causes the browser to show a second webpage 1812, as shown by the second stage 1804. The second webpage 1812 shows contact information about the bakery. As shown in the second stage 1804, the user touch selects the address 1816 of the bakery. This selection causes the browser to show a contextual menu 1830 that includes an Add to Maps option 1832.

The third stage 1806 shows the user touch-selecting of the Add to Maps option 1832. It also shows that this selection causes the address of the bakery to be stored in the table 1808 of the maps application. In some embodiments, the browser directs the map application to store this address in its table 1808, while in other embodiments it directly stores this address in this table. The table 1808 in some embodiments is the bookmark table of the maps application, while in other embodiments it is the Recents table of the map application.

The third stage 1806 shows that in addition to causing the storage of the bakery's address in the table 1808, the selection of the Add to Maps application option 1832 also causes the address to be harvested and added to a harvested address data storage 110. This address is added to the data storage 110 with a high rank because the user made a conscious choice to add it to the Bookmark or Recents table 1808 of the map application.

In some embodiments, when the browser is directed to send this address to the map application, the browser also sends this address to the address harvester of the device, which then stores this address in the data storage 110. In other embodiments, the address is only stored in the table 1808, but the table 1808 is part of a set of storages (e.g., tables, databases, etc.) that collectively form a harvested address data storage that a set of prediction engines of the device uses to retrieve addresses for formulating prediction. In yet other embodiments, the address is first stored in the table 1808, and from this storage, it is then transferred to the address storage 110.

Figure 19:
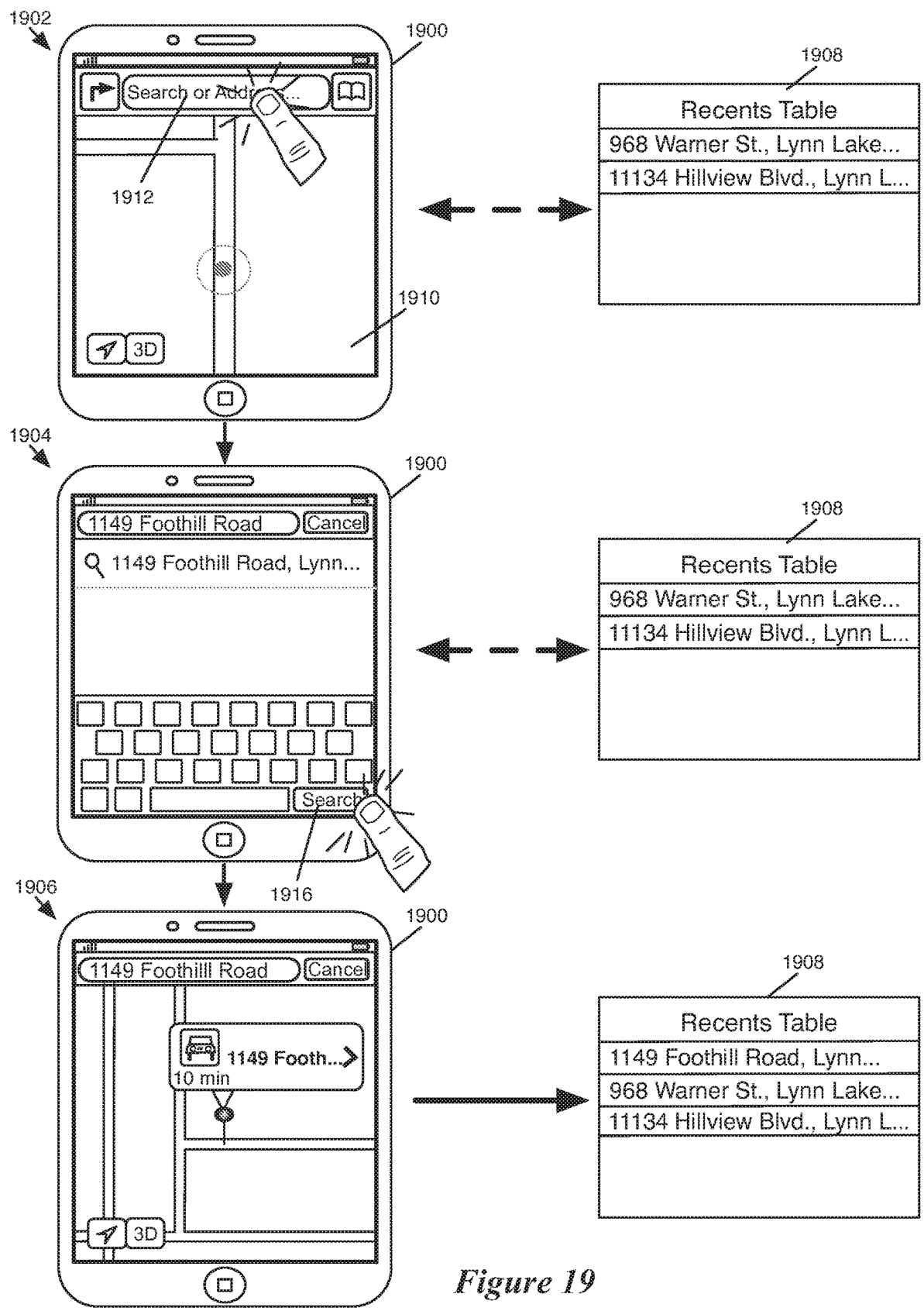
FIG. 19 illustrates an example of harvesting a physical address in response to a user searching for the address in a map application executing on a mobile device.

FIG. 19 illustrates an example of harvesting a physical address in response to a user searching for the address in a map application executing on a mobile device 1900. This example is illustrated in three stages 1902, 1904, and 1906 of interactions with the map application 1910. Each of these stages also shows the state of the Recents table 1908 of the map application.

The first stage 1902 shows the user touch-selecting the search field 1912 of the map application 1910 through a touch-sensitive screen of the device 1900. To simplify the discussion, the first stage 1905 shows that the Recents table 1908 only stores two addresses. That is, the map has been used recently to search for only these two addresses. Here, the user selects the search field 1912 to input a search address.

The second stage 1904 shows the search field 1912 populated with an address "1149 Foothill Road." It also shows the user selecting the search option 1916 to direct the map application to search for the entered address. The second stage 1904 further shows that the Recents table 1908 still only contains the same two addresses that it contained in the first stage.

The third stage 1906 shows the map application after it displays the searched address, 1149 Foothill Road. This stage also shows that the search resulted in the addition of this address to the Recents table 1908 of the map application. In some embodiments, this table is part of a set of storages (e.g., tables, databases, etc.) that collectively form a harvested address data storage or databases. In some embodiments, the set of prediction engines of the device 1900 retrieve harvested address data from the set of storages in order to formulate predictions. However, instead of having the prediction engine(s) use the Recents table 1908, other embodiments copy the addresses in the Recents table 1908 into a harvested address storage, which is accessed by the prediction engine(s). Similar to the previous example, the address may be added to the address storage with a high rank because the user made a conscious choice to search for it with the map application.

Figure 20:
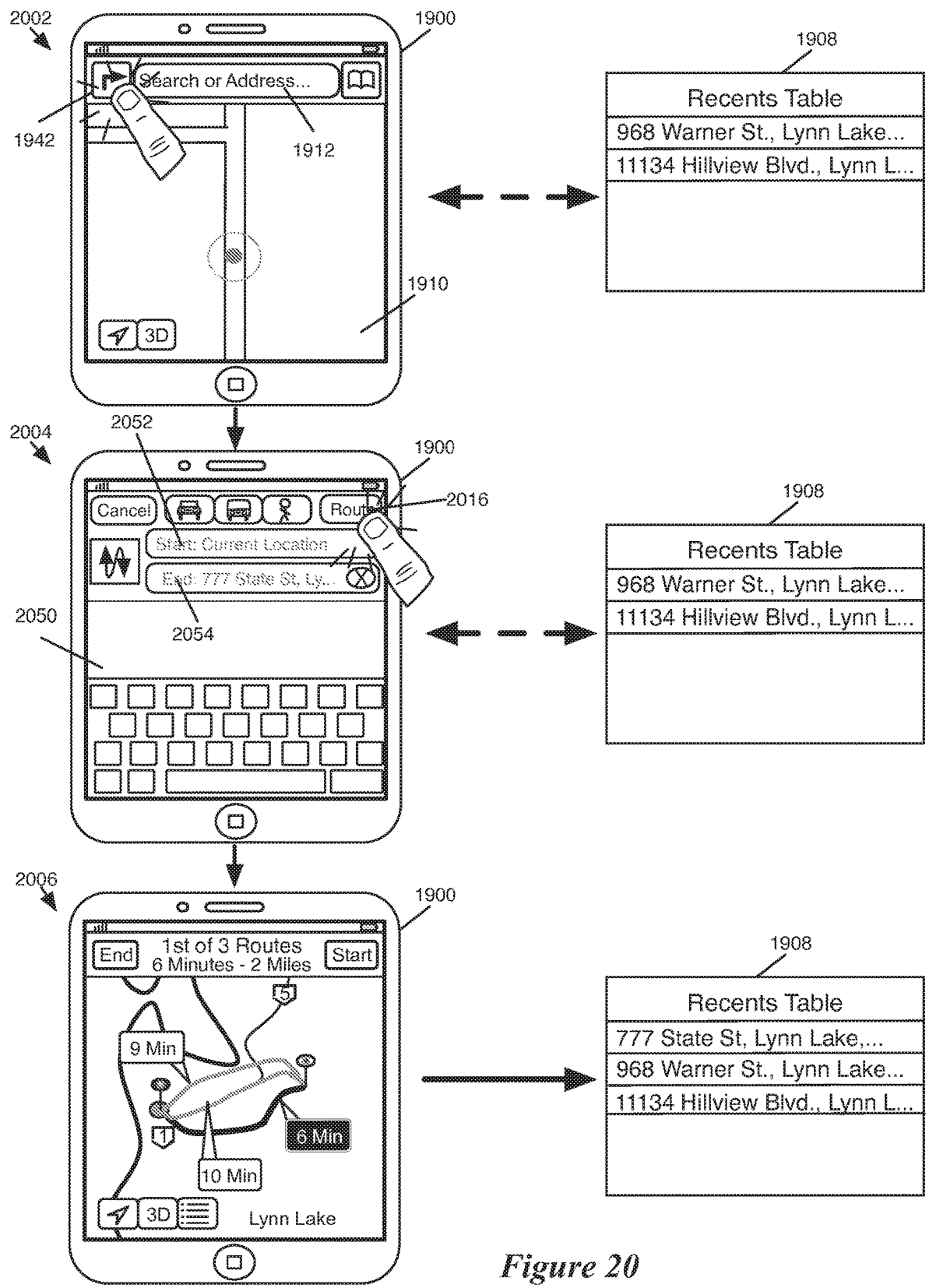
FIG. 20 illustrates an example of harvesting a physical address in response to a user identifying a route with the map application of the mobile device.

FIG. 20 illustrates an example of harvesting a physical address in response to a user identifying a route with the map application 1900 of the mobile device 1900. This example is illustrated in three stages 2002, 2004, and 2006 of interactions with the map application 1910. Each of these stages shows the state of the Recents table 1908 of the map application.

The first stage 2002 shows the user touch-selecting the direction tool 1942 of the map application 1910 through a touch-sensitive screen of the device 1900. Similar to the previous example, the first stage shows that the Recents table 1908 only stores two addresses. To input a route, the user selects a route button 1942 that is next to the search field 1912.

The second stage 2004 shows a page 2050 of the map application. This page contains two fields 2052 and 2054 in which the start and end of the route can be specified. It also allows the mode of transit to be selected. The transit modes include transit by walking, by bus, and by car. The second stage 2004 shows that the start and end of the route have been designated as the current location of the device and 777 State Street, respectively. It also shows the user selecting the route option 2016 to direct the map application to search for the specified route. The second stage 2004 further shows that the Recents table 1908 still only contains the same two addresses that it contained in the first stage 2002.

The third stage 2006 shows the map application after it displays three routes between the specified start and end location. Specifically, the three routes are shown by lines connecting the two pins that represent the start and end locations. This stage 2006 also shows that the destination address has been added to the Recents table 1908 of the map application. As mentioned above, this table in some embodiments is part of a set of storages (e.g., tables, databases, etc.) that collectively form a harvested address storage from which the device's set of prediction engines retrieve addresses to formulate predictions. Other embodiments, however, copy the addresses in the Recents table 1908 into a harvested address storage, which is accessed by the prediction engine(s).

In previous example, the address is extracted from the destination field instead of the start field. One of ordinary skill in the art will understand that an address can be extracted from the start field as well in a similar manner (e.g., if the user has specified a start address). The start or end address may also be added to the address storage with a high rank because the user made a conscious choice to route the address search with the map application.

Figure 21:
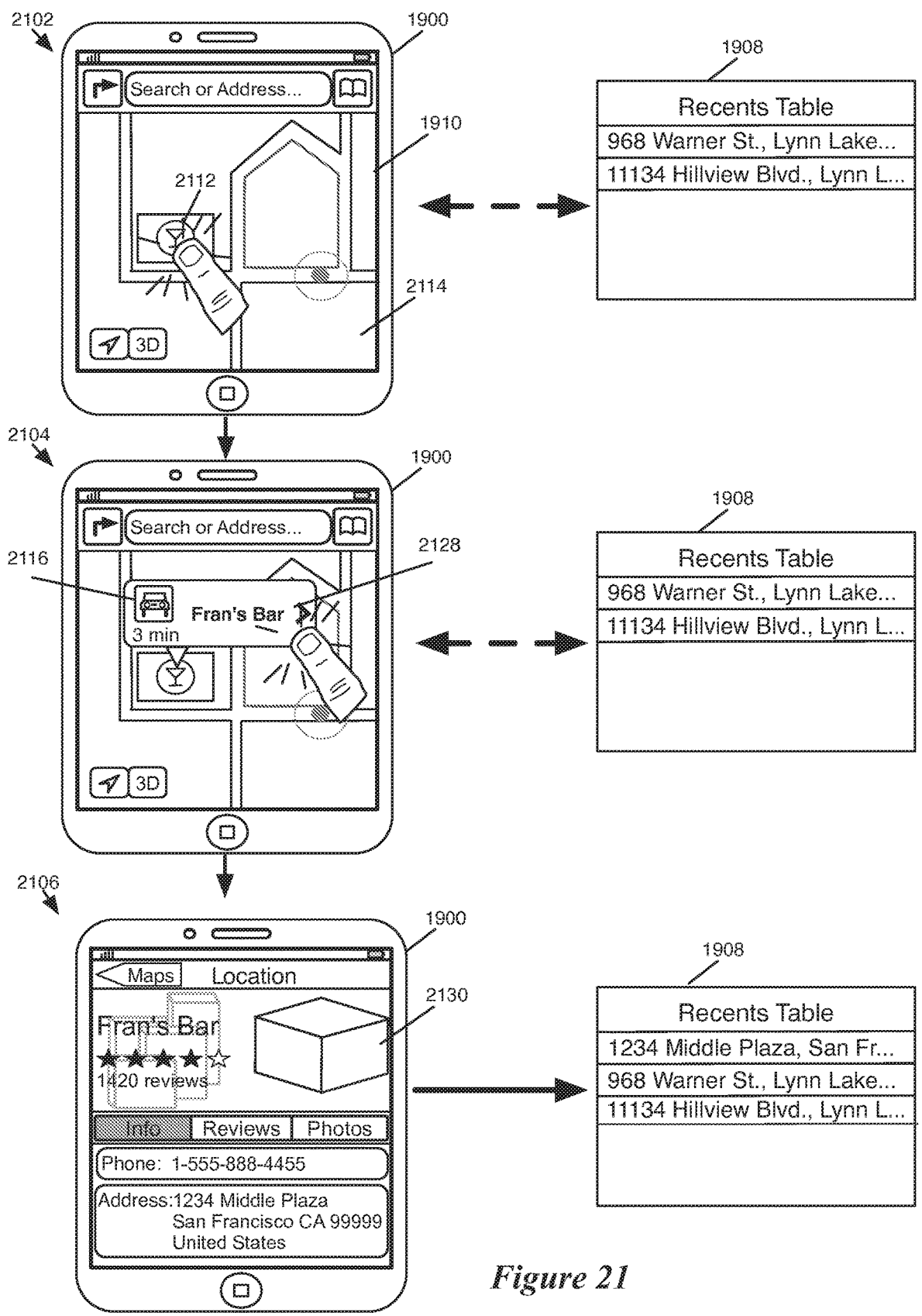
FIG. 21 illustrates an example of harvesting a physical address in response to a selection of a point of interest (POI) on a map presented by the map application of the mobile device.

FIG. 21 illustrates an example of harvesting a physical address in response to a selection of a point of interest (POI) on a map presented by the map application 1900 of the mobile device 1900. This example is illustrated in three stages 2102, 2104 and 2106 of interactions with the map application 1910. Each of these stages also shows the state of the Recents table 1908 of the map application.

The first stage 2102 shows that the map application has been opened to display a map 2114. The mapped location includes a POI 2112. The POI is shown with an icon that provides a visual indication of the type of POI (e.g., a restaurant, a bar). As shown in the first stage 2102, the user touch-selects the POI 2112 on the map 2114 presented by the map application 1910. The first stage 2102 also shows that the Recents table 1908 only stores two addresses at this point.

The second stage 2104 shows a banner 2116 opening above the selected POI to provide some information about the POI. The banner includes the name of the establishment and the estimated time it takes to reach it using a particular mode of transit. On the right-hand side of the banner is an info arrow 2128 that can be selected to display additional information regarding the POI. In this second stage 2104, the user selects the info arrow 2128. The second stage 2104 further shows that the Recents table 1908 still only contains the same two addresses that it contained in the first stage 2102.

The third stage 2106 shows an info page 2130 that the map application presents in order to provide additional information about the selected POI. This stage 2106 also shows that the selection of the info arrow 2128 and the presentation of the info page 2130 has resulted in the addition of the POI's address to the Recents table 1908 of the map application. As mentioned above, this table in some embodiments is part of a set of storages (e.g., tables, databases, etc.) that collectively form a harvested address storage from which the device's set of prediction engines retrieve addresses to formulate predictions. In other embodiments, however, the addresses in the Recents table 1908 are copied into a harvested address storage, which is accessed by the prediction engine(s).

When copying a new address from the Recents table to the harvested address storage (as described above for some embodiments of FIGS. 19-21), some embodiments specify a ranking score that is specified for new addresses that are copied from the Recents table to the harvested address storage. Alternatively, in the embodiments that supply addresses from Recents table directly to the device's set of prediction engines (as described above for other embodiments of FIGS. 19-21), the source of this address (i.e., factor that this address has come from the Recents table of the map application and hence was probably viewed recently by a user) can be factored into the predictions that are formulated based on these addresses. For instance, the relative contributions of these addresses to the predictions can be adjusted by appropriately weighting them in comparison with addresses from other sources.

Figure 22:
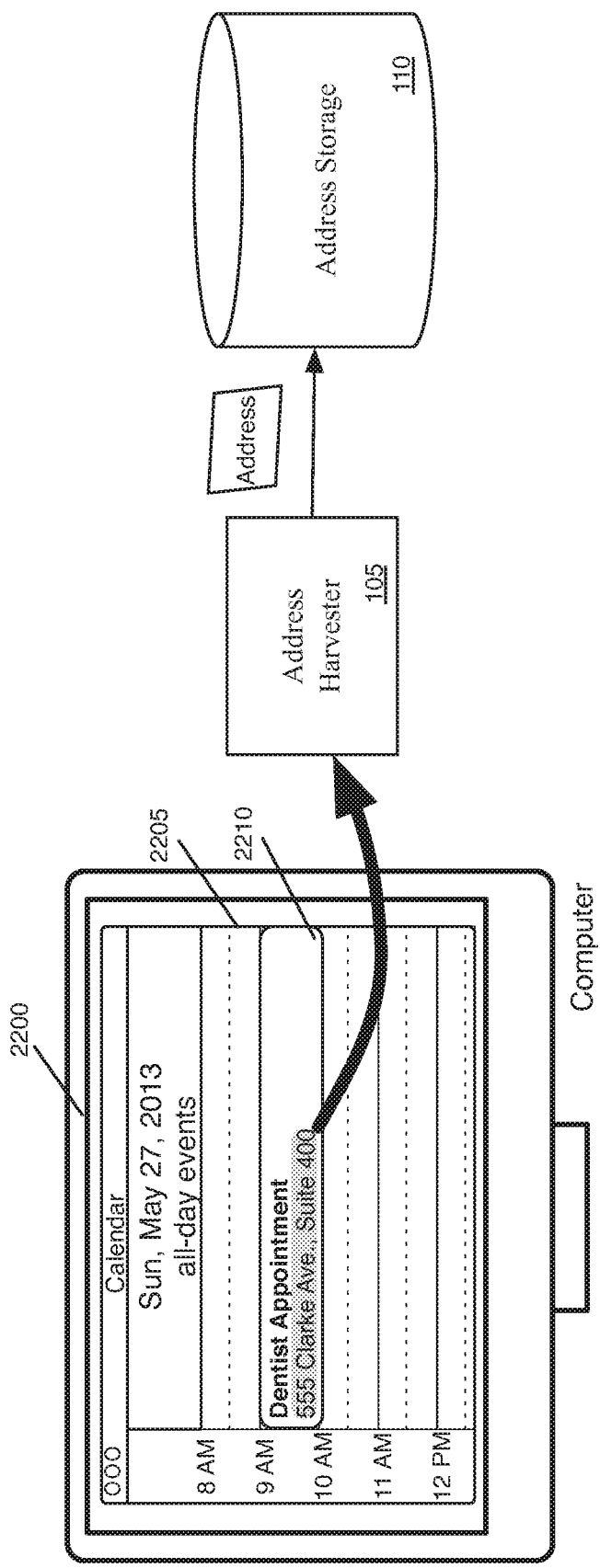
FIG. 22 illustrates an example of harvesting a physical address from a calendar application.

FIG. 22 illustrates an example of harvesting a physical address from a calendar application 2200. As shown, the calendar application has been opened to a day view 2205. Alternatively, the calendar application can be opened to a different view, such as a weekly view, monthly view, etc. The day view 2205 includes a table that list the time on one column and a list of scheduled events in the next column. To simply the description, the view only lists one scheduled event 2210. Specifically, it lists a dentist appointment that is scheduled at 9 am on the day at a particular location. The location is shown in the list with its physical address. Here, the address harvester 105 has extracted and stored the address in the address data storage 110. In some embodiments, the address harvester 105 harvests the address once the event has been scheduled with the calendar application, because it is notified by the calendar application that an event with a particular location has been created. In other embodiments, the address harvester 105 iterates through the calendar application's event list to identify addresses in different scheduled events. The address harvester 105 then adds each new address to the harvested address data storage 110.

Figure 23:
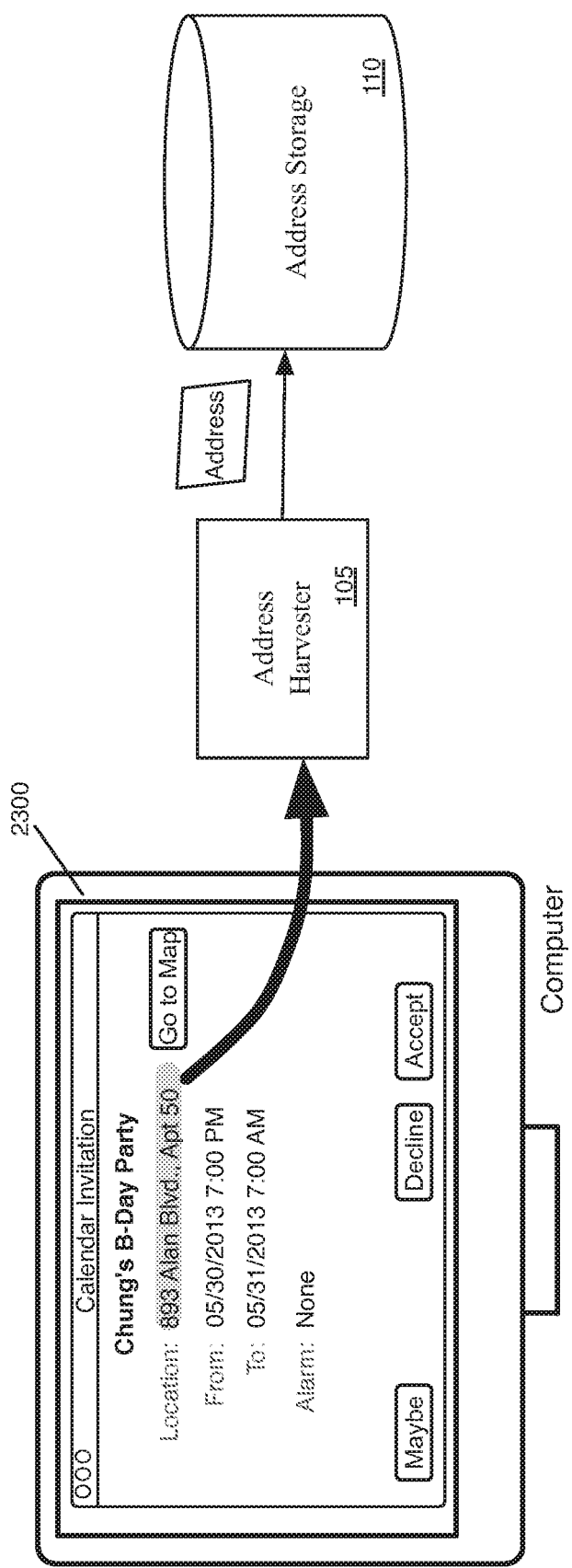
FIG. 23 illustrates an example of harvesting a physical address from a calendar invitation.

In conjunction with the event list, or instead of it, the address harvester 105 of some embodiments harvests addresses from event invitations. FIG. 23 illustrates an example of harvesting a physical address from a calendar invitation 2300. This invitation 2300 might have been opened with the calendar application or an email application (e.g., if the calendar is integrated as part of the email application).

As shown in FIG. 23, the invitation is shown with (1) the name of the event, the (2) location of the event, (3) the event's start time, and (4) the end time. The event includes several options, including showing the map of the location, setting an alarm, accepting the invitation, declining it, etc. Each of the start and end time is shown with a date and time. The location of the event is shown with its physical address in the body of the invitation. In this example, the address harvester 105 has extracted the physical address from the invitation and stored this address in the harvested address data storage 110. For example, the address harvester 105 might have analyzed or parsed the invitation to identify the location field to extract the physical address.

In the previous two examples, each calendared event is associated with time and/or date. As an event approaches, some embodiments increase the ranking score of a physical address that is harvested from the event appointment or from the event invite in the calendar application. This increase in the ranking score will make it more likely that the physical address will be used to provide useful predictions to a user, e.g., used to provide predicted routes, provide relevant traffic information, provide prioritized list of addresses, etc. Once the event passes, some embodiments reduce the ranking score of such a physical address or remove it altogether from the address storage.

B. Computing Ranking Score and Decaying Ranking Score for Addresses

As indicated above, some embodiments store ranking scores with the harvested addresses. These ranking scores may be used, for various operations, to determine which addresses a user is most likely to want (e.g., to which address a user would most likely be traveling). Some embodiments use a decay function to modify these rankings over time. The decay function of some embodiments primarily adjusts a ranking score downward over time, as newer addresses are generally considered more likely to be useful, all else being equal. Eventually, the decay function indicates that an address should be removed from the address history.

Figure 24:
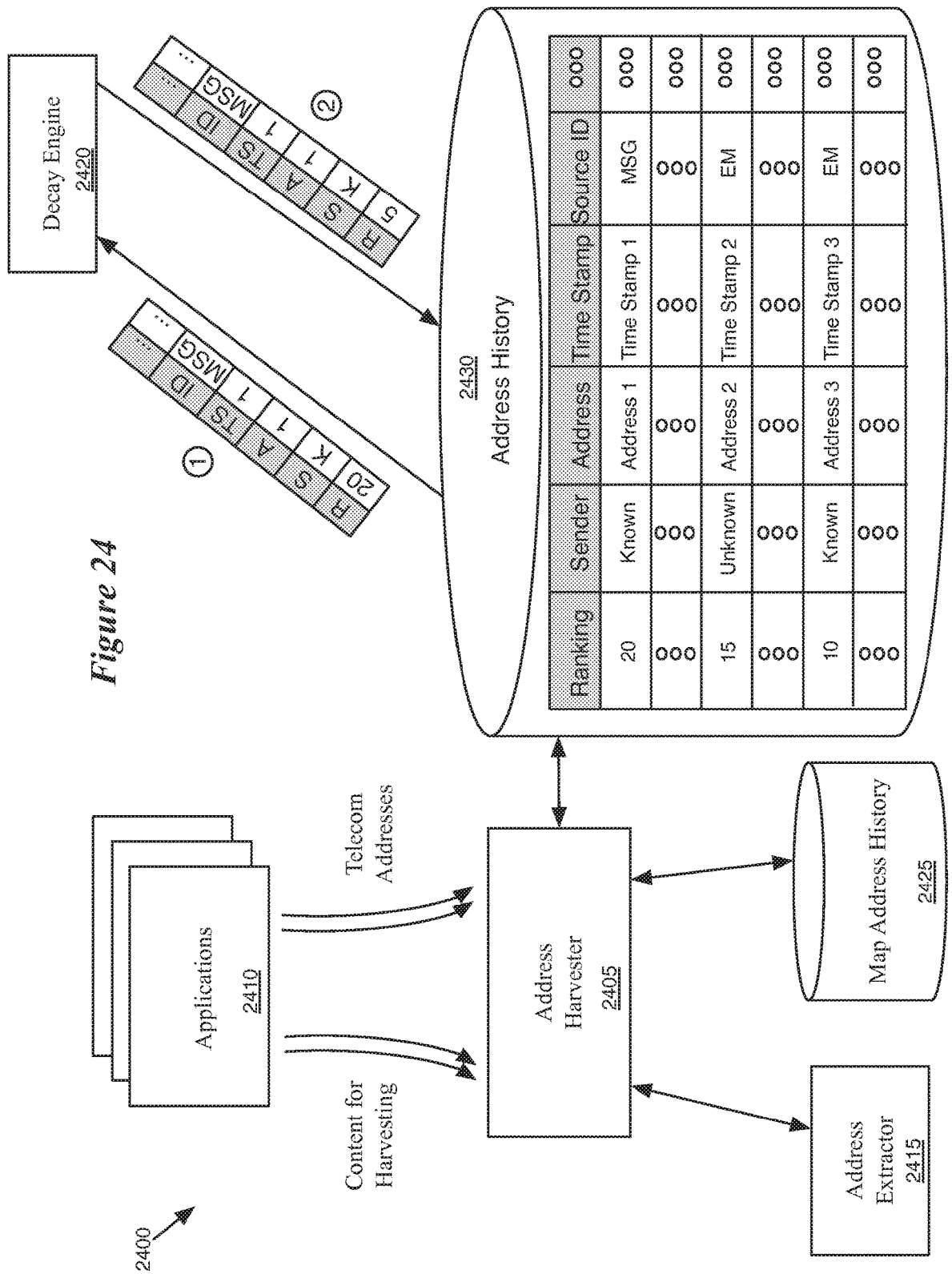
FIG. 24 conceptually illustrates an architecture of some embodiments for storing and decaying addresses.

FIG. 24 conceptually illustrates an architecture 2400 of some embodiments for storing and decaying addresses. In some embodiments, these may be both physical and telecommunications addresses. Other embodiments only rank and perform decaying of one of these types of addresses (e.g., physical addresses) or the other type of addresses. As shown, the architecture 2400 includes an address harvester 2405, a set of applications 2410, an address extractor 2415, and a decay engine 2420. Furthermore, the system includes map address history 2425 and address history 2430.

The address harvester 2405 receives both addresses and content from the applications 2410, in some embodiments, and stores both physical and telecommunications addresses in the address history 2430. For example, from scheduling applications (e.g., a calendar application, an electronic ticketing application, etc.), the address harvester directly receives physical addresses to harvest. Furthermore, from electronic messaging applications (e.g., SMS and e-mail applications), the address harvester receives phone numbers and e-mail addresses from which messages are received and to which messages are sent.

The address harvester 2405 additionally receives content from these electronic messaging applications. Both e-mails and text messages may include physical addresses as part of their content. Thus, the address harvester 2405 uses the address extractor 2415 to identify addresses (e.g., based on their formatting) in content received from the electronic messaging applications. From these and other applications (e.g., map application), the address harvester also receives in some embodiments indications that the user has searched for, routed to, viewed, etc. certain addresses or certain entities at those addresses.

In some embodiments, the address harvester 2405 stores the received and extracted addresses, and received or deduced information about these addresses, in one or more table in data storage 2430. As shown, each address entry in the address history data storage 2430 includes various data about the harvesting of the address. For instance, in the example shown, each address includes a sender value, the address, a time stamp, and a source identifier. These values are used by the address harvester 2405 to compute an initial ranking.

The sender field, in some embodiments indicates, for an address harvested out of an electronic message, whether the sender of the message is known. This field may be more gradated in some embodiments. For example, the sender field could be divided into unknown, regular contacts, and more important contacts (which might be determined by user categorization or frequency of received messages).

The time stamp field stores a time that the address was received by its source application, in some embodiments. For example, addresses received in an e-mail or text message store the time of that text message. Addresses from a web browser store the time that the user selected in the web browser to store the address. The source identifier field stores an indicator of from which of the applications 2410 the address was harvested. In the example, the first listed address is from a text message, while the other two addresses are from e-mails. In some embodiments, additional fields may be stored for at least some types of addresses. For instance, addresses from a calendar event may store the time of the calendar event rather than the time the address was received.

The ranking, in some embodiments, is initially calculated by the address harvester 2405 according to a set of heuristics. These heuristics assign a score to each address based on various factors. As examples, addresses from known senders are scored higher (e.g., assigned a lower number) than addresses from unknown senders. Some embodiments treat addresses from text messages as more important than addresses from e-mail messages. Addresses for a scheduled event may be assigned a low score if the associated event is far off, but a high score if the event is soon upcoming. Some embodiments, rather than storing numerous fields, only store the time stamp and ranking for addresses.

The decay engine 2420 periodically re-scores the addresses stored in the address history data storage 2430 according to one or more decay functions. This example shows the decay engine 2420 retrieving an address that has a ranking score of 20 (a high ranking) and readjusting the address to a score of 5 (a lower ranking). Some embodiments automatically adjust addresses downwards over time until a particular period of time after the time stamp (e.g., one day). Some embodiments have different decay functions for different types of addresses. For example, because text messages are a more immediate form of communication, addresses from text messages might start out with a higher ranking than addresses from e-mail, but decay more quickly. An address for a scheduled event, on the other hand, might start with a very low ranking until shortly before the scheduled event, then be adjusted to a very high ranking for a particular period of time (e.g., 3 hours, 6 hours, 12 hours, 24 hours) before the event, and immediately be removed after the time of the event.

The architecture 2400 additionally includes a map address history 2425. In some embodiments, a mapping application operating on the device stores recently used addresses (e.g., search results, destinations to which a route was generated, etc.). In some such embodiments, the address harvester 2405 retrieves these physical addresses from the map address history 2425 and stores the retrieved addresses in the system-wide address history 2430. Alternatively, the map history 2425 is maintained separately, and it is accessed separately by the prediction engines of some embodiments. This will be further described by referenced to FIG. 36.

C. Formulating Predictions Based on Harvested Physical Addresses

Some embodiments use the harvested physical addresses to formulate predictions about future destinations of the device's user, and then provide information to the user based on these predictions. To formulate these predictions, some embodiments employ one or more machine-learning engines to generate additional physical addresses to augment the set of physical addresses that they use to base their predictions.

Different embodiments provide different information to the user based on the prediction. Examples of such information include routes to predicted future destinations, traffic data regarding routes to possible future destination, prioritized display of predicted future destinations over other destinations in a list of possible destinations or search queries, etc. One of ordinary skill will realize that the harvested physical addresses are not used for all of these purposes in some embodiments. One of ordinary skill will also realize that the harvested physical addresses are used for other predictions and other uses in other embodiments.

Figure 25:
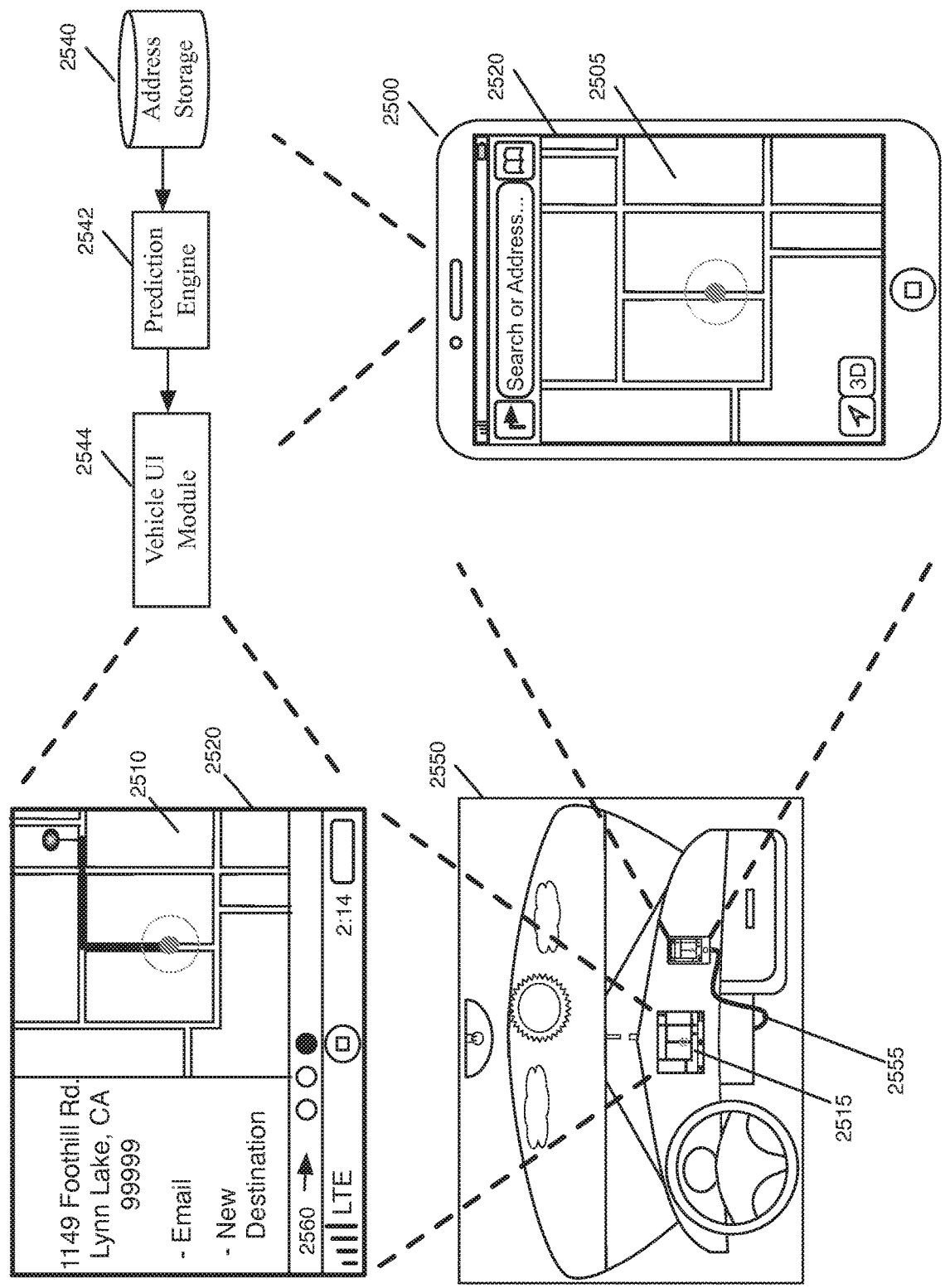
FIG. 25 illustrates an example of a mobile device that uses the harvested physical addresses to predict future routes, which it presents to a user through a vehicle display.

FIG. 25 illustrates an example of a mobile device 2500 that uses the harvested physical addresses to predict future routes, which it presents to a user through a vehicle display. In this example, the mobile device 2500 connects to the interface of the vehicle's electronic information system. A mapping application operates on the mobile device 2500, and outputs both a first user interface display 2505 on the mobile device's display screen 2520 and a second user interface display 2510 on the vehicle's display screen 2515.

The figure illustrates the interior of a vehicle 2550, in which the mobile device 2500 connects via a wired connection 2555 to the vehicle, and outputs a user interface for display on the vehicle screen 2515. While this example illustrates a wired connection 2555, in other embodiments the mobile device connects with the vehicle's electronic information system through a wireless connection (e.g., through a Bluetooth connection). Also, this example and others described below illustrate a single display screen in the vehicle. However, some vehicles include multiple screens, such as a center console dashboard screen and one or more screens in the control cluster in front of the driver. Some embodiments output only a single user interface to the center dashboard screen for such vehicles, while other embodiments output the same user interface to multiple screens, and yet other embodiments output different interfaces to the different screens.

The figure also illustrates a blown-up views of the mobile device 2500 and the dashboard screen 2515. As shown, both views display a map of the same location, but within the context of different user interfaces. FIG. 25 further illustrates a harvested address data storage 2540, a route prediction engine 2542, and a vehicle UI module 2544. The address data storage 2540 stores harvested physical addresses. Based on these harvested physical addresses, the route prediction engine 2542 formulates one or more predicted routes that the device might take at any given time. This engine provides the vehicle UI module with these formulated routes. The vehicle UI module generates the vehicle UI display 2520 and presents this display on the display screen 2515 of the vehicle.

In some embodiments, the prediction engine 2542 is part of a map application that executes on the mobile device 2500. In these or other embodiments, the prediction engine formulates one or more predicted routes that the device can take at any given time based on a variety of factors. These factors include physical addresses that are stored in the harvested address data storage 2540 and that are harvested from a variety of sources. For instance, in some embodiments, these addresses are harvested from sent or received emails, text messages, calendar invites, etc. Also, in some embodiments, these addresses are harvested when they are searched, viewed and/or used to compute routes in web browsers and/or the map applications, or other applications (e.g., email applications). These addresses are also harvested in some embodiments from locations of calendared events. As mentioned above, some embodiments employ one or more machine-learning engines to generate additional physical addresses to augment the set of physical addresses that are used to formulate predicted routes.

When the prediction engine identifies more than one predicted route, the vehicle UI display 2515 provides an indication of multiple predicted routes. In the example illustrated in FIG. 25, the indication of multiple routes is provided by indicators 2560, which in these embodiments indicate multiple view pages that display multiple predicted routes. The scrolling through these routes will be further described below by reference to FIGS. 26 and 27.

As shown in FIG. 25, the vehicle UI display 2515 in some embodiments presents the likely routes with a map view on one portion of the display and information about the route (including estimated arrival time, metadata about the source of the route, etc.) on a second portion of the display. In this example, the route information that is provided in the second portion specifies the source of the data that was used to predict the route's destination as a possible destination of the device and the frequency of travel to this destination.

In some embodiments, the selection (e.g., touch screen selection or keyed selection) of the map view portion of this display causes the mobile device to enter a turn-by-turn navigation mode. In the turn-by-turn navigation mode of some embodiments, the mobile device presents a view along the selected route, while also providing instructions for upcoming maneuvers to perform (e.g., as road signs with both text and graphical instructions). In some embodiments, the navigation mode is initiated through another control that is provided through the vehicle UI display 2515. Also, in some embodiments that have the map application generate and/or present the predicted routes, the map application is the application on the mobile device that is responsible for providing the turn-by-turn navigation (i.e., for providing the navigation mode).

Figure 26:
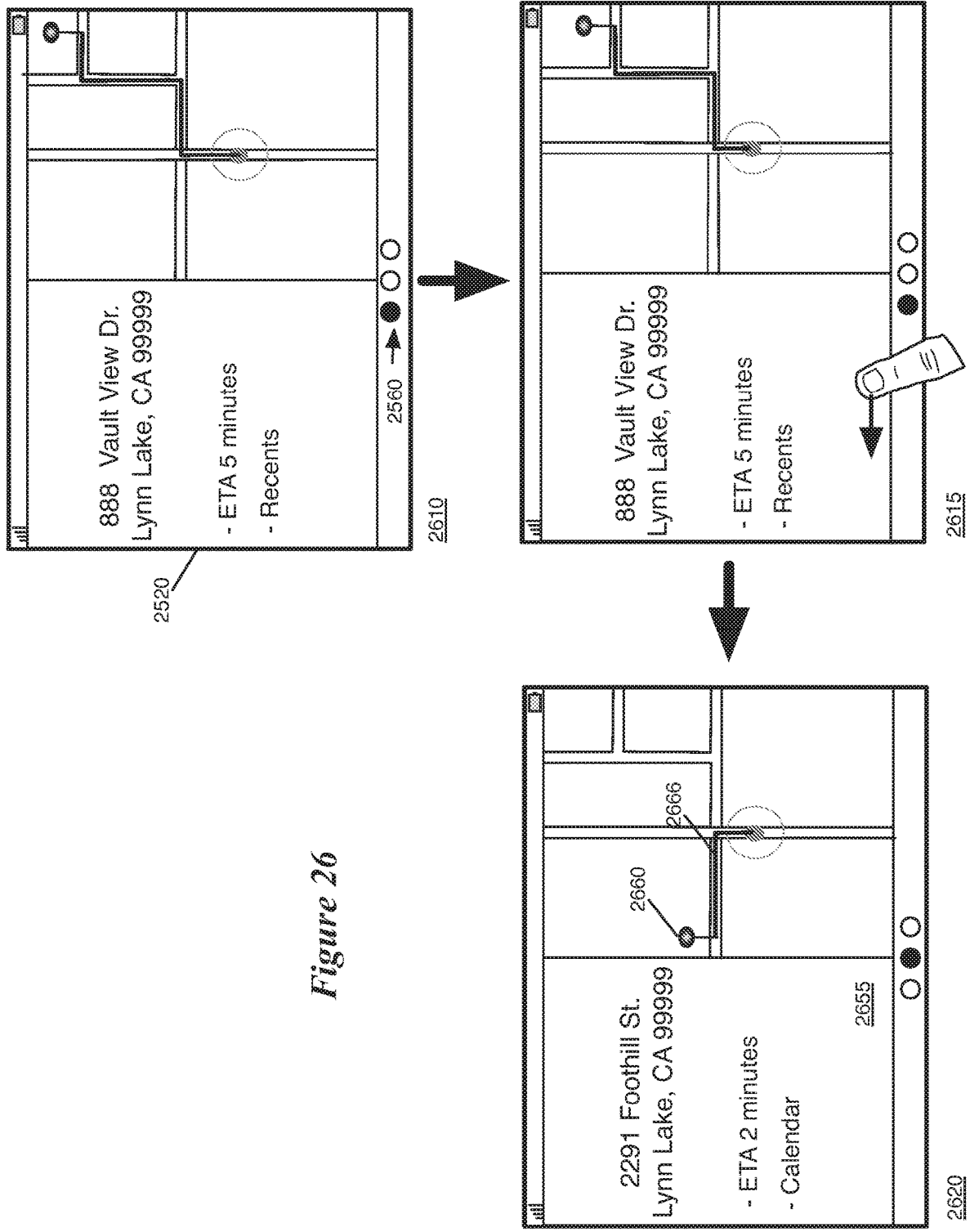
FIG. 26 illustrates an example of the scrolling through multiple predicted routes that are generated based on harvested data.

FIG. 26 illustrates an example of the scrolling through multiple predicted routes that are generated based on harvested data. This example is illustrated in terms of three operational stages 2610-2620. The first stage 2610 shows the vehicle UI display 2520 of FIG. 25. As mentioned above, the indicators 2560 indicate the availability of additional routes. In some embodiments, the number of indicators is indicative of the number of additional routes. In this example, three indicators 2560 in the first stage 2610 are indicative in these embodiments of three predicted routes.

The second stage 2615 shows the user performing a swipe operation on the presentation to navigate to another of the predicted destinations/routes. The user can perform such an action because in this example the vehicle display screen 2520 has a touch sensitive screen. In addition to swipe gestures, the vehicle UI module 2544 of some embodiments accept other gestures, or selection of various affordances (e.g., left and right or up and down navigation arrows) in order to cycle through the different options. Accordingly, when the presentation is shown on a non-touch sensitive screen of a vehicle, the user can navigate to the next predicted destination/route through one of the keys, knobs, or other controls of the vehicle.

Regardless of how the user navigates to the next predicted destination/route, the mobile device 2500 presents the next predicted destination/route upon receiving the user's input. The third stage 3620 of FIG. 26 illustrates the mobile device's presentation 2655, which shows a gym 2660 and a route 2666 to the gym as another predicted destination/route. The map application did not initially show the route to the gym in the third stage because the route prediction engine assigned a lower probability to the gym being the actual destination as compared to the destination shown in the first stage 2610.

Figure 27:
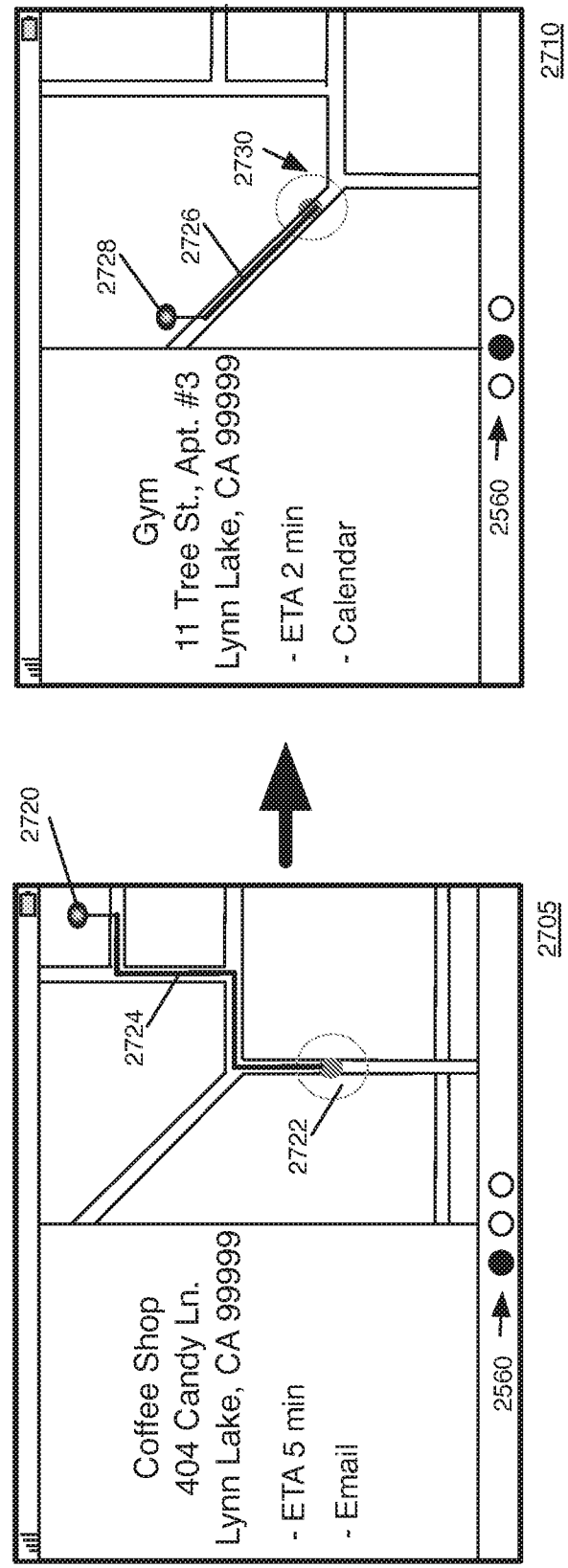
FIG. 27 illustrates an example of the mobile device automatically scrolling through multiple predicted routes as the device travels along a particular path.

FIG. 27 illustrates an example of the mobile device automatically scrolling through multiple predicted routes as the device travels along a particular path. This example is illustrated in terms of two operational stages 2705-2710. The first stage 2705 shows a position 2722 of the device as it travels along a first predicted route 2724 to a first predicted destination 2720. This stage also shows indicators 2560 that specify that the mobile device has identified multiple different predicted routes to multiple different predicted destinations.

The second stage 2710 shows that once a user passes an intersection 2730, the mobile device reformulates the predicted route and presents a new predicted route 2726 to a new destination 2728. In some embodiments, the predicted route 2726 might have been one of the routes previously predicted by the mobile device and represented by the indicators 2560. Alternatively, once the user passed the intersection 2730, the mobile device in some embodiments might have reformulated its predictions and identified the destination 2728 as a new possible destination.

Figure 28:
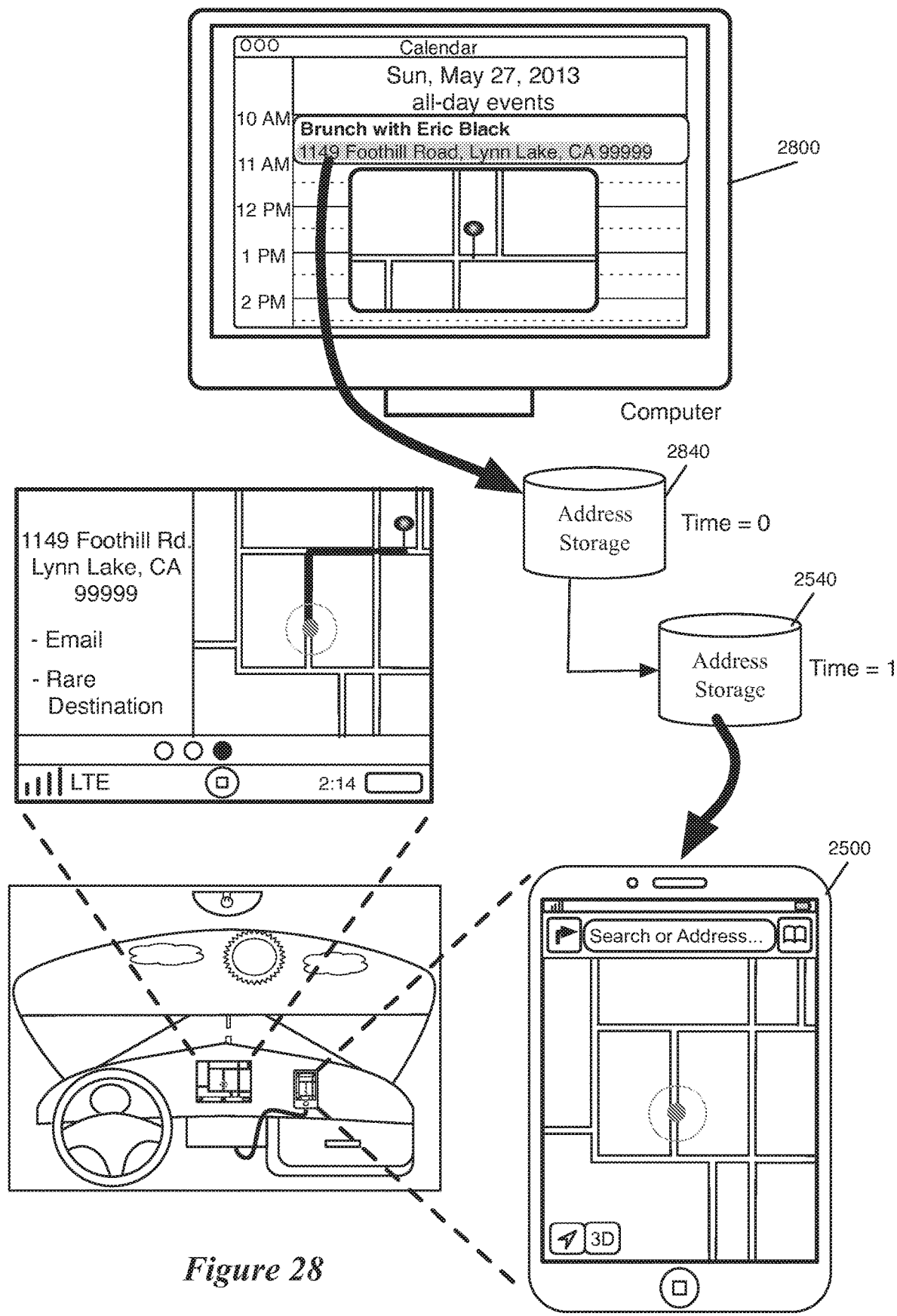
FIG. 28 illustrates an example where a mobile device bases its predictions on an address that is harvested on another device.

In some embodiments, the mobile device in some cases bases its predictions on an address that is harvested on another device. FIG. 28 illustrates such an example. This example is identical to the example illustrated in FIG. 25, except that the harvested address, 1149 Foothill Road, in FIG. 28 was initially captured on a computer 2800 and stored in the address data storage 2840 of this computer. This address then was relayed to the harvested address data storage 2540 of the mobile device 2500 through the server infrastructure. Once relayed to the mobile device 2500, the prediction engine of this device uses this address to identify it as a possible destination for the device.

This synchronizing of physical addresses across multiple devices is highly useful. For instance, a user can fully explore a location on a map application of a desktop computer. Given that some embodiments in real time or quickly synchronize addresses across devices, the prediction engine of the mobile device of the user can use this address the next time that the user is traveling in his car to provide automatically a route to the explored location.

III. Other Uses for Harvested Addresses

FIGS. 29-31 illustrates several additional examples of using the harvested physical address. In these examples, the harvested addresses are used to provide travel times and traffic data based on harvested physical addresses or machine-generated physical address. As mentioned above, some embodiments employ one or more machine-learning engines to generate additional physical addresses to augment the set of physical addresses that are used to be the basis for the predictions.

FIG. 29 illustrates how some embodiments present a traffic notification based on a harvested or machine generated physical address. To present such a notification, some embodiments focus only on harvested or machine-generated locations that are very likely to be relevant to the user of a device. This is partly because the space for such notifications is often limited on the mobile devices. It is also partly because too many machine-generated notifications can be distracting to a user as the user might not find them always to be of interest.

As shown in FIG. 29, the mobile device of some embodiments displays the traffic notification 2905 in a notification center's window 2910 that includes various notifications (such as calendar event reminders) for a user. The traffic notification in this example specifies that traffic along highway 101 is heavier than usual. The mobile device reports traffic along this highway based on a prediction that the device will travel along this highway soon. This prediction can be based on a predicted destination of the device. The predicted destination in some embodiments is generated by a machine learning process that identifies typical locations of the device at different intervals of time. In some embodiments, the predicted destination may alternatively be a harvested physical address, such as the location of a calendared event.

Once a location is predicted as a destination, the mobile device of some embodiments identifies a route to that location along with the traffic congestion along that route. In some embodiments, the traffic data specifies that the traffic is better than usual, worse than usual, or as usual. Based on this traffic data, the mobile device of some embodiments provides the traffic notification 2905 of FIG. 29.

FIG. 30 illustrates another scenario for the harvested physical addresses. The calendar application lists several events 3005 and 3010. The location addresses of these events have been harvested and stored in the address storage. Based on the harvested addresses and the current location, the calendar application presents each event with a traffic condition that indicates a route to take or avoid. To identify such traffic conditions, the mobile device of some embodiments identifies predicted routes between the device's current or future destinations and the location of the calendared event. The predicted routes in some embodiments are accompanied with traffic data. Based on this data, the mobile device display the traffic conditions for each calendared event as illustrated in FIG. 30. In some embodiments, the mobile device also computes and displays the travel time for event based on this data.

FIG. 31 illustrates yet another use case scenario for the harvested physical addresses. The calendar application lists several events 3105 and 3110. The location addresses of these events have been harvested and stored in the address storage. Based on the harvested address, the calendar application has created a new event 3115 to account for the travel time between the events 3105 and 3110. For example, the travel time event 3115 is listed in the calendar with the estimated time it would take to go from the location of the event 3105 to the location of the event 3110.

Another use for harvested physical addresses involved their use in augment voice recognition operations. As mentioned above, a voice recognition application of some embodiments uses harvested telecommunications addresses to identify intended recipients of electronic messages. For example, users may utilize voice commands to send e-mails or text messages from a mobile device with such voice recognition capability. Unless replying to a previous message, the user will need to specify one or more recipients for these messages. To help recognize the recipients dictated by the user, the voice recognition application of some embodiments uses the harvested addresses.

Figure 32:
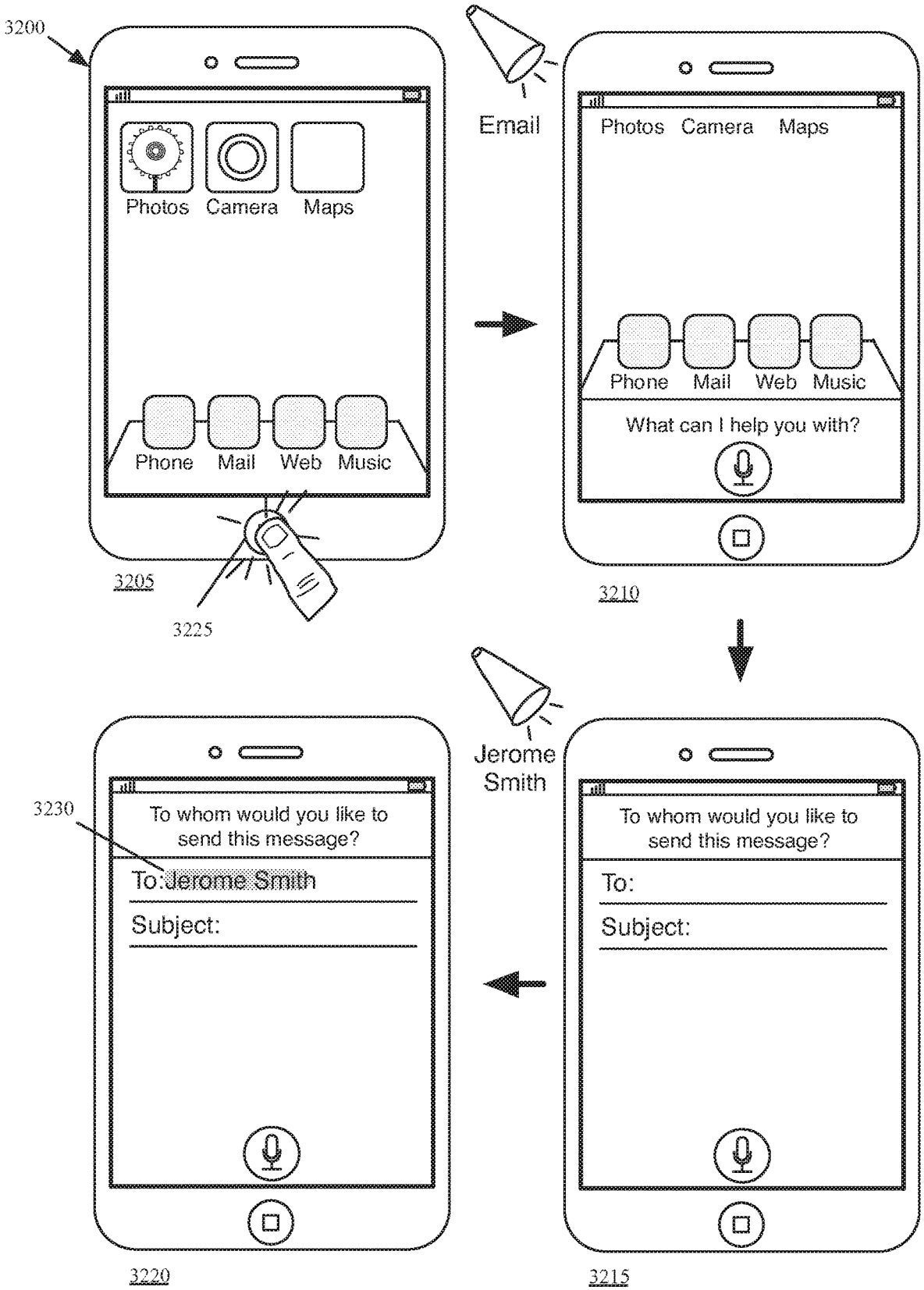
FIG. 32 illustrates the use of the voice recognition function of some embodiments on a mobile device to recognize a recipient e-mail address that was previously harvested and stored in an address history data storage.

FIG. 32 illustrates the use of the voice recognition function of some embodiments on a mobile device 3200 to recognize a recipient e-mail address that was previously harvested and stored in an address history data storage. This figure illustrates four stages 3205-3220 of the mobile device over which the user initiates the voice recognition application, uses voice recognition to open an e-mail application, and dictates a recipient name.

The first stage 3205 illustrates a home page of the portable device 3200. In this case, the user selects a button 3225 in order to initiate voice recognition. The second stage 3210 illustrates that the voice recognition application on the mobile device has begun, as it prompts the user to dictate what the user would like the application to do. As shown, the user states "e-mail", which is translated by the voice recognition application as a request to open the e-mail client on the mobile device in order to send a new e-mail.

Thus, the third stage 3215 illustrates a new e-mail opened, and the voice recognition application asking the user to whom the message should be sent. In addition, at this stage, the user replies with "Jerome Smith". Jerome Smith is not one of the user's contacts in this case, so there is not an e-mail address stored in the user's contacts that maps to the name Jerome Smith. However, in this example, the user has previously received an e-mail from a Jerome Smith, and therefore the address history data storage includes a "Jerome Smith" with a corresponding e-mail address. As shown by the highlighting 3230 at the fourth stage 3220, the voice recognition application has filled in the e-mail address for Jerome Smith in the recipient line of the new e-mail.

Figure 33:
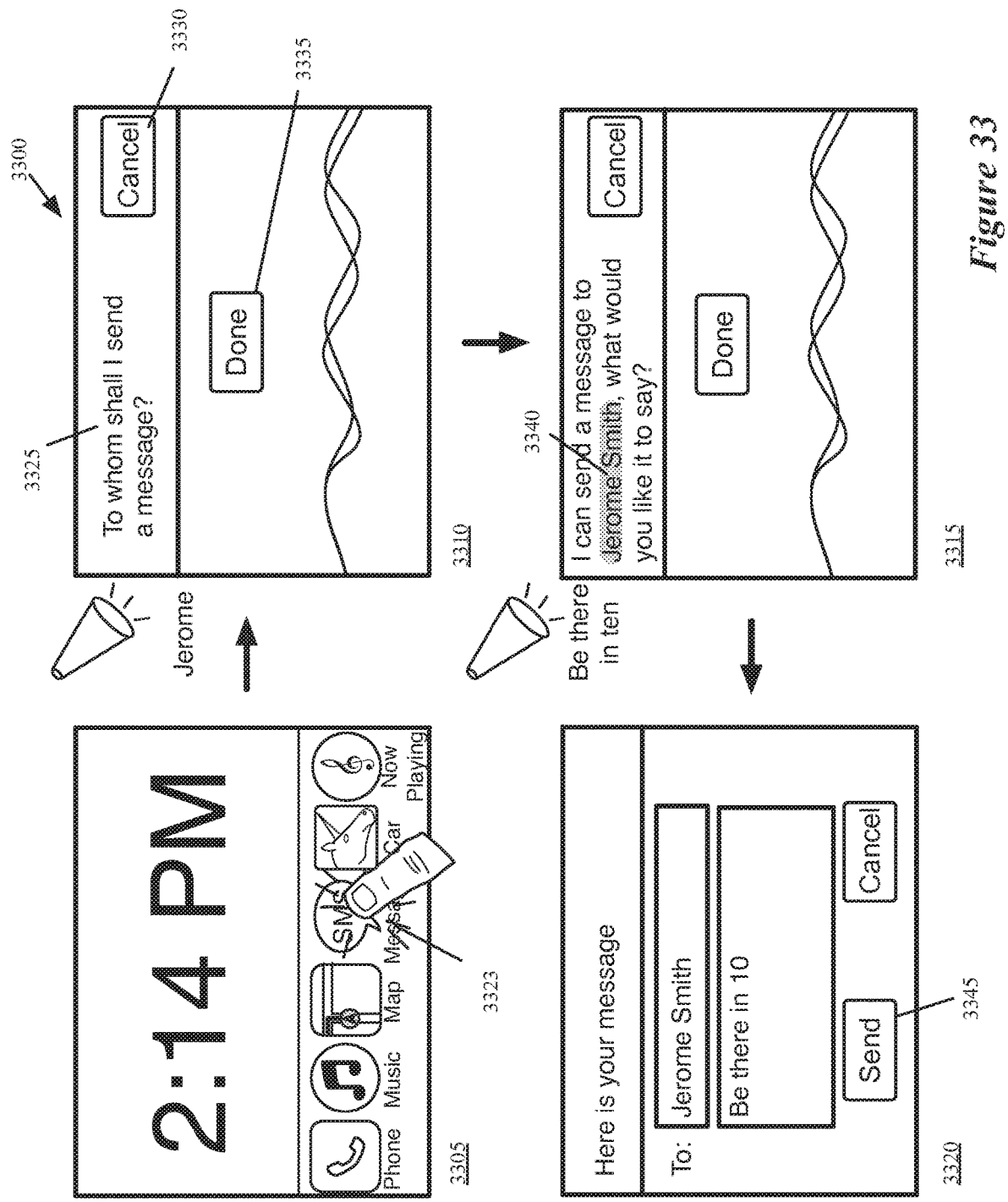
FIG. 33 illustrates a vehicle display screen over several stages in which a user activates a messaging function and dictates a message to a recipient.

The voice recognition application of some embodiments also works with input through a user interface of a vehicle to which the mobile device connects. FIG. 33 illustrates a vehicle display screen over four stages 3305-3320 in which a user activates a messaging function and dictates a message to a recipient. The first stage 3305 illustrates a vehicle display screen home page of some embodiments, driven by the mobile device connected to this vehicle display. In this case, the user selects a messaging control 3323, in order to activate a messaging (e.g., SMS) feature of the portable device.

The second stage illustrates a messaging interface 3300 of some embodiments. The messaging interface 3300 includes a prompt 3325 (which may also be output as audio via the vehicle speakers), a cancel control 3330 for closing the messaging interface without sending a message, and a done control 3335 for indicating to the messaging application that dictation has completed. In the second stage 3310, the messaging feature requests a recipient for a message, and the user dictates "Jerome".

The third stage 3315 illustrates that the messaging feature uses the harvested data of some embodiments to identify a telecommunications address (e.g., phone number, e-mail) to which to send the data. In this case, although the user does not have any contacts named Jerome, a text message had previously been received correlating the name Jerome Smith to a phone number. Thus, the messaging interface 3300 now requests that the user dictate a message to Jerome Smith. As shown by the highlighting 3340, the recipient is a selectable item in some embodiments, which the user can select in order to change recipients for the message. Also, at this stage, the user dictates a message, "Be there in ten". The fourth stage 3320 illustrates the resulting message, with a control 3345 for allowing the user to send the message.

IV. Distributing Harvested Addresses Across Multiple Devices

As mentioned above, some embodiments have four data storages to respectively store physical address data, email address data, telephone store data and group email and telephone address data. To synchronize these data storages across multiple associated devices that connect to the server infrastructure of FIG. 3, some embodiments create a key value store for three of these storages, which are the physical address store, the email address store and the telephone number store. These embodiments store the records in the group data storages in the email address and telephone number stores.

More specifically, in some embodiments, the device and storage infrastructures store harvested data in one or more key value stores. The device and storage infrastructure of some embodiments stores the data in three separate key-value stores. Each store in some embodiments is a table stored on the device. In some embodiments, there is one store for telephone numbers, a second store for e-mails, and a third store for physical addresses. In some embodiments, one or more of the key value storages include entries for both individuals and groups. For example, a key value storage for telephone numbers includes entries for individual phone numbers and groups of phone numbers (e.g., multiple numbers chosen by a user to simultaneously send an SMS message to). The entries for the individual phone numbers each identify a single phone number, while the entries for groups of phone numbers each identify multiple phone numbers. In some embodiments, groups may overlap.

In a key value storage mechanism, there are multiple keys stored in each storage location. Each key is a record. The keys of some embodiments are a hash based on (for example) the values of data associated with the key. The value for the key is an object that contains all the parameters (sometimes called "fields") and the values of those parameters of the record. For example, the value of the key in the e-mail key storage of some embodiments includes parameters such as name, e-mail address, most recent time the address was used, the second most recent time the address was used, etc. The values of those parameters may be data such as "John Smith", "JSMITH@EXAMPLE.COM", "12: 52 PM May $30^{th}$, 2013", "11:12 AM May $30^{th}$, 2013", respectively. The records of some embodiments contain a record of multiple times when the address was last used. For example, some embodiments store a record in the key value of the last five times an address associated with that key value was used. In some embodiments, if an address (e.g., an e-mail address or phone number) is associated with multiple groups, then the device will make an entry in the key storage of that data type for each group that the address is a member of. In some embodiments, the group key values are stored in the same key value storage as the individual key values of the same type. Key values identifying groups of phone numbers are stored in the phone number key storage, as separate entries in the same store as the individual phone numbers. Key values identifying groups of e-mail addresses are stored in the e-mail address key storage, as separate entries in the same store as the individual e-mail addresses. Key values identifying groups of physical addresses are stored in the physical address key storage, as separate entries in the same store as the individual physical addresses.

In some embodiments, each key value storage of a device is synchronized across a network infrastructure with all devices associated with an account on the network infrastructure. When a record is added to a device, this results in a new record being added to all associated devices by the network synchronizer. Similarly, when an entry is modified (e.g., when the user changes the phone number associated with a name entry), the network synchronizer propagates the modification across the network infrastructure to the associated devices. As described above with respect to FIG. 3, in some embodiments, the network synchronizer works through the server infrastructure of the network in order to update devices that are not necessarily all on at the same time as the device on which the user made the modification to the record.

To create and maintain the key value stores, some of these embodiments then use the ubiquity key value storage technology of Apple Inc to maintain the three key value stores on all associated devices in synch. This technology is described in U.S. Published Patent Applications 2012/0310880 and 2012/0185448. Both of these published applications are incorporated herein by reference.

Figure 34:
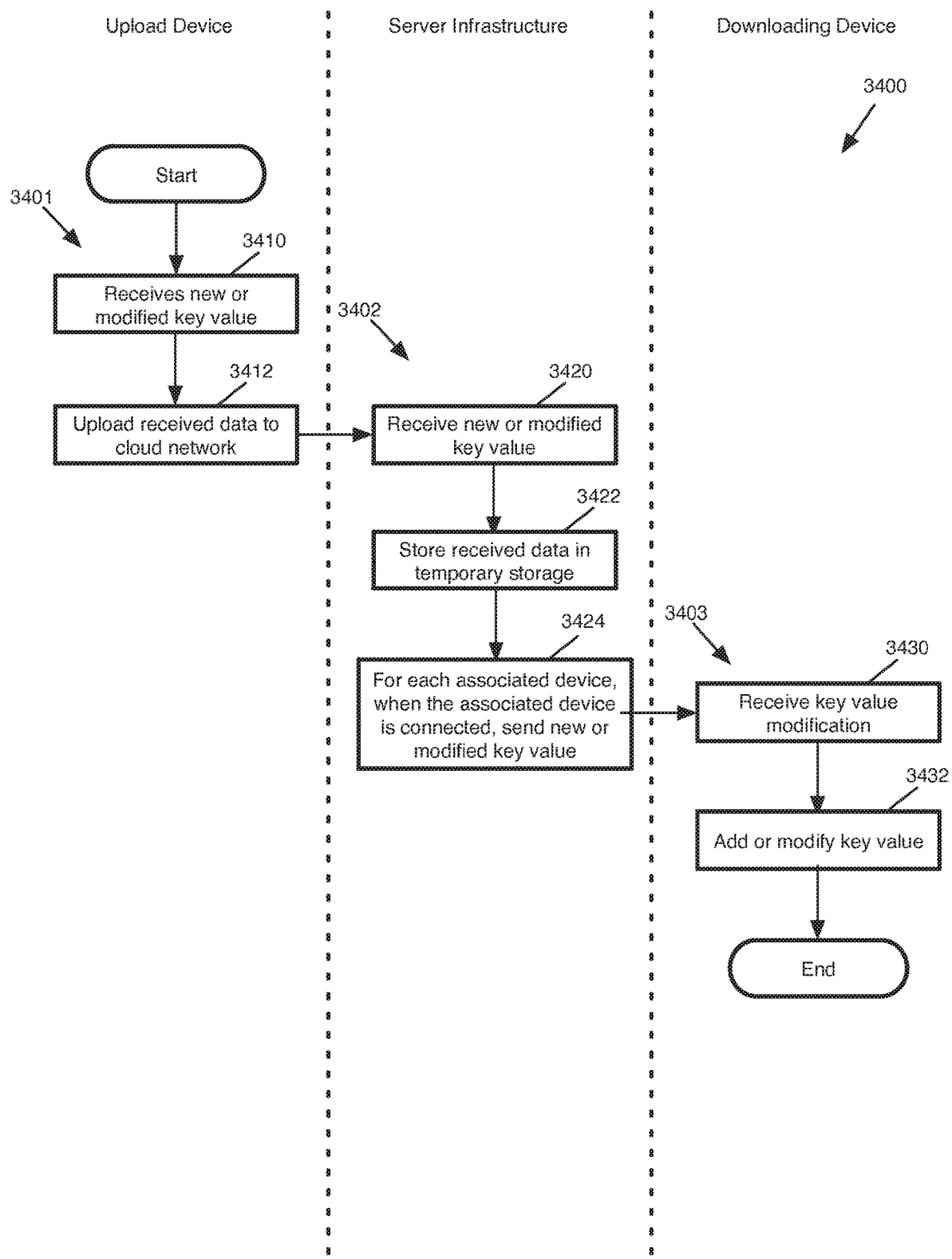
FIG. 34 conceptually illustrates a multi-device process of some embodiments for distributing harvested data from one device to another across a server infrastructure.

FIG. 34 conceptually illustrates a multi-device process 3400 of some embodiments for distributing harvested data from one device to another across a server infrastructure. The figure includes three columns, the first column 3401 conceptually illustrates the steps of the process 3400 performed by a device on which a user creates or modifies an entry in a key value store. The second column 3402 conceptually illustrates the steps of the process 3400 performed by server infrastructure. The third column 3403 conceptually illustrates the steps of the process 3400 performed by a second device that receives the newly created or modified entry (from the first device) through the server infrastructure.

The process 3400 receives (at 3410) at a first device a new key value record or a modification of an existing key value record of a key value store. In some embodiments, the modification changes a value and/or a field of the key value pair. For example, a parameter associated with a record for an e-mail address may change. In some embodiments, one type of modification is to delete the key value.

The process 3400 then uploads (at 3412) the received data (the new or modified key value data) to the server infrastructure. In some embodiments, a modification is uploaded as the original key hash value, and the modified key/value pair. In other embodiments, a modification is uploaded as the original key value record and data identifying the changes to be made to the copy of the record. Other embodiments provide other sets of data that permit the modification to be performed on associated devices.

The process 3400 is then continued in column 3402 by the server infrastructure. The process 3400 receives (at 3420) the new key value or key value modification data from the first device. As mentioned above, a modification may be received in different forms in different embodiments. The process 3400 stores in a temporary storage (at 3422) the new key value or modification data. In some embodiments, the server infrastructure maintains a copy of the key storages of the devices. In some such embodiments, the server infrastructure adds a new key value or modifies a key value upon receiving the data. However, in some embodiments, the network server acts as a conduit for the modification data and does not itself maintain a copy of the full key storages of the devices. In such embodiments, the server only stores the data that it receives in the temporary storage until such time that it can download it to the receiving device(s). The process 3400 then sends (at 3424) the new key value or modification to the key value to each associated device with a copy of the relevant key value storage. When an associated device is not connected to the server infrastructure when the server infrastructure is received, the process 3400 waits until the associated device connects to the network, then sends the modification data to the associated device.

The process 3400 then receives (at 3430) the new key value or modification data from the server infrastructure at the downloading associated device. As mentioned above, the modification data is in different forms in different embodiments. The process 3400 then adds or modifies (at 3432) the key value in the key value storage of the downloading associated device. The process 3400 then ends.

V. Harvesting and Prediction Architecture

Figure 35:
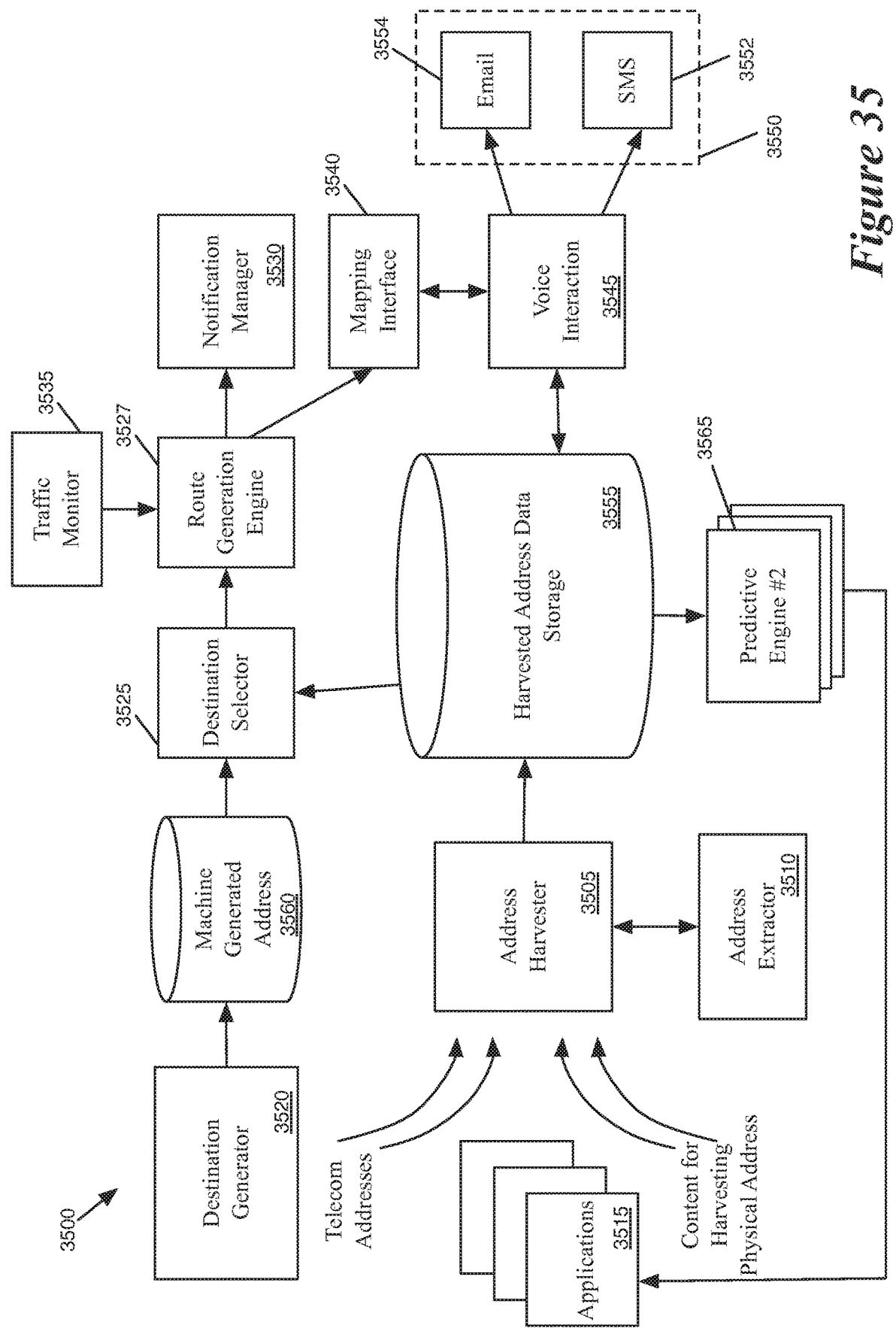
FIG. 35 conceptually illustrates a more detailed example of an architecture of a device of some embodiments that performs such harvesting and prediction.

In some embodiments, the harvested telecom and physical addresses are used by prediction engines that utilize these harvested addresses to better inform decisions made by other applications. FIG. 35 conceptually illustrates a more detailed example of an architecture 3500 of a device of some embodiments that performs such harvesting and prediction.

The architecture 3500 includes an address harvester 3505, an address extractor 3510, a set of applications 3515, a destination identifier 3520, a destination selector 3525, a route generation engine 3527, a notification manager 3530, a traffic monitor 3535, a mapping interface 3540, a set of additional prediction engines 3540, a voice recognition module 3545, and a set of communication applications 3550. In addition, the harvesting architecture includes harvested address data storage 3555 and machine-generated address data storage 3560.

The address harvester 3505 receives both addresses and content from the applications 3515, in some embodiments, and stores both physical and telecommunications addresses in the harvested address data storage 3555. For example, from scheduling applications (e.g., a calendar application, an electronic ticketing application, etc.), the address harvester 3505 directly receives physical addresses to harvest. Furthermore, from electronic messaging applications 3550 (e.g., the SMS application 3552 and e-mail application 3554), the address harvester 3505 receives phone numbers and e-mail addresses associated with incoming content.

The address harvester 3505 additionally receives content from these electronic messaging applications 3550. Both e-mails and text messages may include physical addresses as part of their content. Thus, the address harvester 3505 uses the address extractor 3510 to identify addresses (e.g., based on their formatting) in content received from the electronic messaging applications 3550. In some embodiments, all of the harvested addresses are stored in the harvested address data storage 3555 in a ranked fashion, as described above by reference to FIG. 24. In other embodiments, only some types of the harvested addresses (e.g., physical addresses) are ranked or have an associated ranking score.

In addition to harvested address, the destination generator 3520 also generates addresses and stores these addresses in the machine-generated address data storage 3560. In some embodiments, the destination generator 3520 uses a machine-learning engine to analyze past location data recorded by the device, in order to identify destination zones. That is, the device includes a location identification engine (e.g., a Global Positioning System engine) that determines latitude and longitude coordinates for the device at various times. Based on analyzing these coordinates, the destination generator 3520 of some embodiments identifies locations (e.g., cities, physical addresses) at which the device was located for more than a threshold time period.

The destination generator 3520 stores these locations in the machine-generated address data storage 3560. The destination generator 3520 of some embodiments also uses the machine-learning engine to use identified intermediate locations between different destination zones to create association between different destination zones (e.g., between different predicted destination locations) between which the device travels. The route-generating engine 3527 can then use these associations to define specific routes between destination zones, as further described below.

The architecture 3500 includes a variety of consumers of the harvested and machine-generated addresses. The voice interaction module 3545 of some embodiments uses a potential recipient data storage when preparing a message or initiating a phone call in response to voice instructions. The voice recognition module 3545, which is used by the SMS application 3552 and e-mail application 3554, among other applications, populates recipient fields of these applications using the harvested telecommunications addresses. As shown, these applications additionally feedback data to the address harvester 3505, as described above.

The destination selector 3525, in some embodiments, generates predicted destinations for various times based on the machine-generated address data storage 3560 and/or the harvested addresses in the harvested address data storage 3555. In some embodiments, the destination selector 3525 ranks numerous possible destinations according to various criteria. For instance, if the machine-generated address data identifies a location at which the device arrives every day at a particular time, the destination selector 3525 predicts that the user of the device will want to arrive at the location at the particular time of the current day. The destination selector 3525 of some embodiments sends these predicted destinations to a route generation engine 3527, which generates a route to the destinations. In some embodiments, the route generation engine generates the route itself, while in other embodiments it employs an external server (that is communicatively coupled to the device) to generate the route.

In some embodiments, the route generator 3527 simply obtains two locations and generates or has the route generated based on these two locations. For instance, in some embodiments, the route generator 3527 receives the current location of the device and a predicted destination for the device. In other embodiments, the route generator generates the route (or has the route generated) not only based on the two endpoint locations, but also based on intermediate locations that the destination identifier identified with the endpoint locations, as mentioned above. The destination identifier 3520, destination selector 3525, and route generator 3527 of some embodiments are described in further detail in the concurrently filed U.S. Patent Application entitled "Warning for Frequently Traveled Trips Based on Traffic," U.S. Provisional Patent Application No. 61/832,928 file Jun. 9, 2013, which are both incorporated herein by reference.

The route generator 3527 uses the traffic monitor 3535 in some embodiments to determine traffic along any generated route. The traffic monitor interacts with a traffic monitoring server(s) communicatively coupled to the device, in order to obtain real-time traffic data regarding the generated route. In some embodiments, the traffic monitor is part of the external route generator, and each generated route comes with the current traffic along the route.

Several applications use the predicted destinations of the engine 3525 and subsequently generated routes from the route generation engine 3527. For instance, in some embodiments, the route generation engine 3527 notifies the notification manager 3530 of some embodiments to place in the notification center traffic information as shown in FIGS. 29, 30 and 31. For some such notifications, the route generation engine 3527 supplies its data to one or more other modules (e.g., calendar application) and these other applications supply data (e.g., travel times that are dependent on traffic data) to the notification manager in order for the notification manager to generate the required notification center notices (e.g., calendar events) and displays.

The mapping interface 3540 is an interface of the mapping application operating on the device. In some embodiments, the mapping application uses the destinations and routes from the destination selector 3525 and route generation engine 3527 to present a user with possible easily selectable destinations for navigation. Some embodiments present this data to the user on a vehicle display screen when the device is connected to the vehicle.

In addition, the mapping interface 3540 of some embodiments uses the voice interaction module 3545 to perform voice recognition for location searches in the mapping application. In this case, the voice interaction module 3545 may use the harvested address data storage 3555 to inform the search. Some uses of the mapping application for harvested addresses are described in further detail in the concurrently filed U.S. Patent Application entitled "Mapping Application with Several User Interfaces" U.S. Provisional Patent Application No. 61/832,818 filed Jun. 8, 2013, which are both incorporated herein by reference.

As shown in FIG. 35, the harvested addresses in the data storage 3555 also can be used to drive a variety of other prediction engines 3565 to formulate a variety of other predictions. These prediction engines then drive one or more applications 3515 with their predictions.

VI. Synchronizing Multiple Harvested Data Storaged

Figure 36:
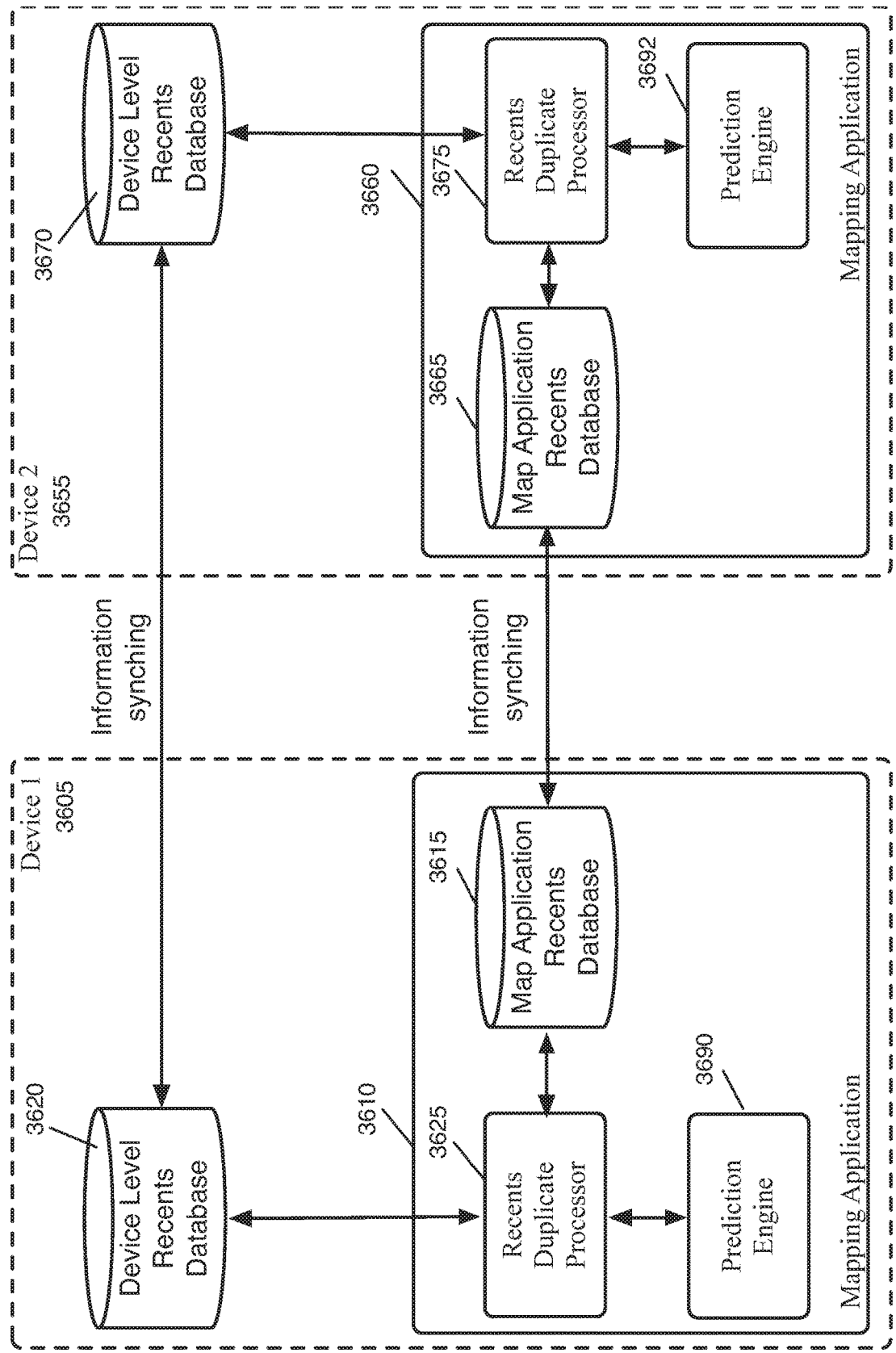
FIG. 36 illustrates multiple harvested address data storages of a device synchronizing with one or more devices through the server infrastructure.

In some embodiments, the device has multiple harvested address data storages and synchronizes these multiple data storages with one or more devices through the server infrastructure. FIG. 36 illustrates one such approach. Specifically, it illustrates that two devices 3605 and 3655 of some embodiments. Each of these devices (3605 or 3655) has one specific harvested address data storage for the map application that executed on the device, and another general harvested address data storage for one or more other applications that execute on the device. Each device uses the server infrastructure (e.g., the infrastructure 315) to synchronize each of its harvested address data storage with other similar data storages of the related device (3610 or 3655). A prediction engine executing on a device can then retrieve harvested addresses from either data storage residing on the device.

FIG. 36 shows two user devices 3605 and 3655 for simplicity but the harvested addresses are shared among any number of associated user devices in some embodiments. As shown, user device 3605 includes a map application 3610. The map application 3610 includes a harvested address data storage 3615, which is used to save recently accessed map information such as recent search results, resent map regions displayed on the devices, recent pins dropped, recent routes, etc. Similarly, user device 3655 includes a map application 3660 with a harvested address data storage 3665.

Each device 3605 and 3655 also includes a device level harvested address data storage 3620 and 3670, respectively. The harvested address data storages saves various physical addresses that are harvested from the bodies of emails and text messages, captured from locations of calendared appointments, captured based on user interactions with the addresses in emails, browsers, etc.

As shown, the map applications 3610 and 3660 each include a harvested addresses duplicate processor (harvested addresses deduper or harvested addresses de-duplicator) 3625 and 3675, and a prediction engine 3690 and 3692. Each prediction engine (e.g., 3690) can formulate one or more predictions based on addresses retrieved from its devices data storages (e.g., 3615 and 3620). For instance, in some embodiments, each prediction engine formulates predictions about a predicted destination or a predicted route to a destination based on harvested addresses that the prediction engine retrieves from the data storages (e.g., 3615 and 3620) of its device through the address duplicate processor.

The harvested addresses duplicate processor 3625 retrieves the desired harvested addresses (e.g., addresses that have a certain ranking and/or addresses that were harvested within a certain time period) from the two data storages (e.g., 3615 and 3620), compares them with each other to identify duplicate addresses, discards one address from each identified duplicate pair, and supplies to the prediction engine the list of addresses without any duplicates. In some embodiments, the prediction engine first retrieves the addresses from its device's two storage and then supplies these addresses to the duplicate processor for it to eliminate any duplicate copies. The prediction engine can then formulate its predictions (e.g., identify predicted destinations or routes) based on the list of addresses retrieved from both data storages.

FIG. 36 also illustrates that some embodiments (1) synchronize the map application address data storages 3615 and 3665 between the user devices that are associated with each other (e.g., registered to the same user in a remote storage and computing service), and (2) synchronize the general address data storages 3620 and 3670 between the associated user devices. As mentioned above, this synchronization is facilitated by the server infrastructure (e.g., infrastructure 315, which is not shown in this figure). Also, in some embodiments, the devices and the server infrastructure use the key-value storage mechanism (e.g., the ubiquitous key-value storage mechanism) mentioned above.

VII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger application while remaining distinct software inventions. In some embodiments, multiple software inventions can also be implemented as separate applications. Finally, any combination of separate applications that together implement a software invention described here is within the scope of the invention. In some embodiments, the software applications, when installed to operate on one or more electronic systems, define one or more specific machine implementations that execute and perform the operations of the software applications.

Figure 37:
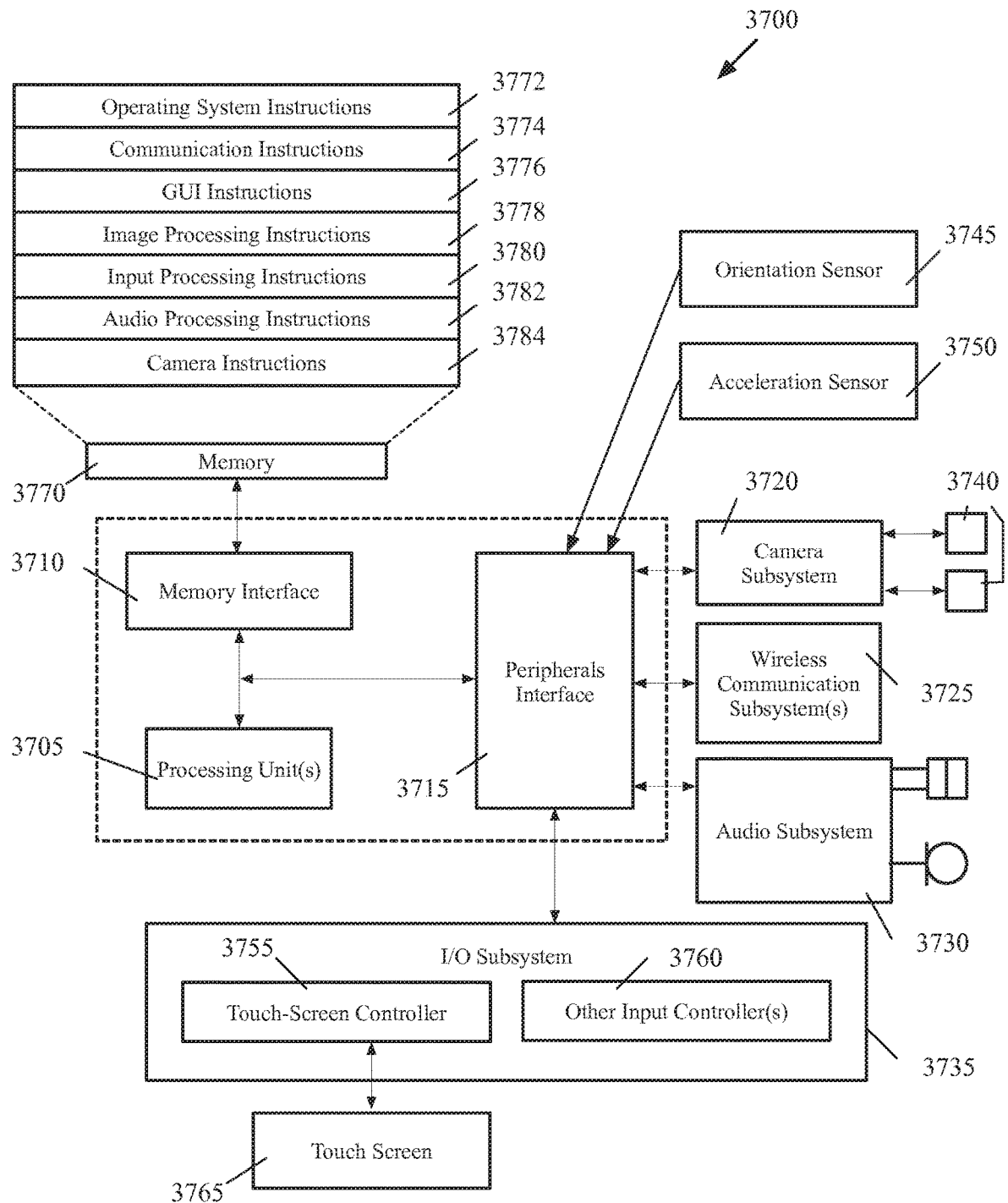
FIG. 37 is an example of an architecture of a mobile computing device of some embodiments of the invention.

The map applications of some embodiments operate on mobile devices, such as smart phones (e.g., iPhones●) and tablets (e.g., iPads●). FIG. 37 is an example of an architecture 3700 of such a mobile computing device. Examples of mobile computing devices include smartphones, tablets, laptops, etc. As shown, the mobile computing device 3700 includes one or more processing units 3705, a memory interface 3710 and a peripherals interface 3715.

The peripherals interface 3715 is coupled to various sensors and subsystems, including a camera subsystem 3720, a wireless communication subsystem(s) 3725, an audio subsystem 3730, an I/O subsystem 3735, etc. The peripherals interface 3715 enables communication between the processing units 3705 and various peripherals. For example, an orientation sensor 3745 (e.g., a gyroscope) and an acceleration sensor 3750 (e.g., an accelerometer) is coupled to the peripherals interface 3715 to facilitate orientation and acceleration functions.

The camera subsystem 3720 is coupled to one or more optical sensors 3740 (e.g., a charged coupled device (CCD) optical sensor, a complementary metal-oxide-semiconductor (CMOS) optical sensor, etc.). The camera subsystem 3720 coupled with the optical sensors 3740 facilitates camera functions, such as image and/or video data capturing. The wireless communication subsystem 3725 serves to facilitate communication functions. In some embodiments, the wireless communication subsystem 3725 includes radio frequency receivers and transmitters, and optical receivers and transmitters (not shown in FIG. 37). These receivers and transmitters of some embodiments are implemented to operate over one or more communication networks such as a GSM network, a Wi-Fi network, a Bluetooth network, etc. The audio subsystem 3730 is coupled to a speaker to output audio (e.g., to output voice navigation instructions). Additionally, the audio subsystem 3730 is coupled to a microphone to facilitate voice-enabled functions, such as voice recognition (e.g., for searching), digital recording, etc.

The I/O subsystem 3735 involves the transfer between input/output peripheral devices, such as a display, a touch screen, etc., and the data bus of the processing units 3705 through the peripherals interface 3715. The I/O subsystem 3735 includes a touch-screen controller 3755 and other input controllers 3760 to facilitate the transfer between input/output peripheral devices and the data bus of the processing units 3705. As shown, the touch-screen controller 3755 is coupled to a touch screen 3765. The touch-screen controller 3755 detects contact and movement on the touch screen 3765 using any of multiple touch sensitivity technologies. The other input controllers 3760 are coupled to other input/control devices, such as one or more buttons. Some embodiments include a near-touch sensitive screen and a corresponding controller that can detect near-touch interactions instead of or in addition to touch interactions.

The memory interface 3710 is coupled to memory 3770. In some embodiments, the memory 3770 includes volatile memory (e.g., high-speed random access memory), non-volatile memory (e.g., flash memory), a combination of volatile and non-volatile memory, and/or any other type of memory. As illustrated in FIG. 37, the memory 3770 stores an operating system (OS) 3772. The OS 3772 includes instructions for handling basic system services and for performing hardware dependent tasks.

The memory 3770 also includes communication instructions 3774 to facilitate communicating with one or more additional devices; graphical user interface instructions 3776 to facilitate graphic user interface processing; image processing instructions 3778 to facilitate image-related processing and functions; input processing instructions 3780 to facilitate input-related (e.g., touch input) processes and functions; audio processing instructions 3782 to facilitate audio-related processes and functions; and camera instructions 3784 to facilitate camera-related processes and functions. The instructions described above are merely exemplary and the memory 3770 includes additional and/or other instructions in some embodiments. For instance, the memory for a smartphone may include phone instructions to facilitate phone-related processes and functions. Additionally, the memory may include instructions for a map application as well as other applications. The above-identified instructions need not be implemented as separate software applications or modules. Various functions of the mobile computing device can be implemented in hardware and/or in software, including in one or more signal processing and/or application specific integrated circuits.

While the components illustrated in FIG. 37 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 37 may be split into two or more integrated circuits.

Figure 38:
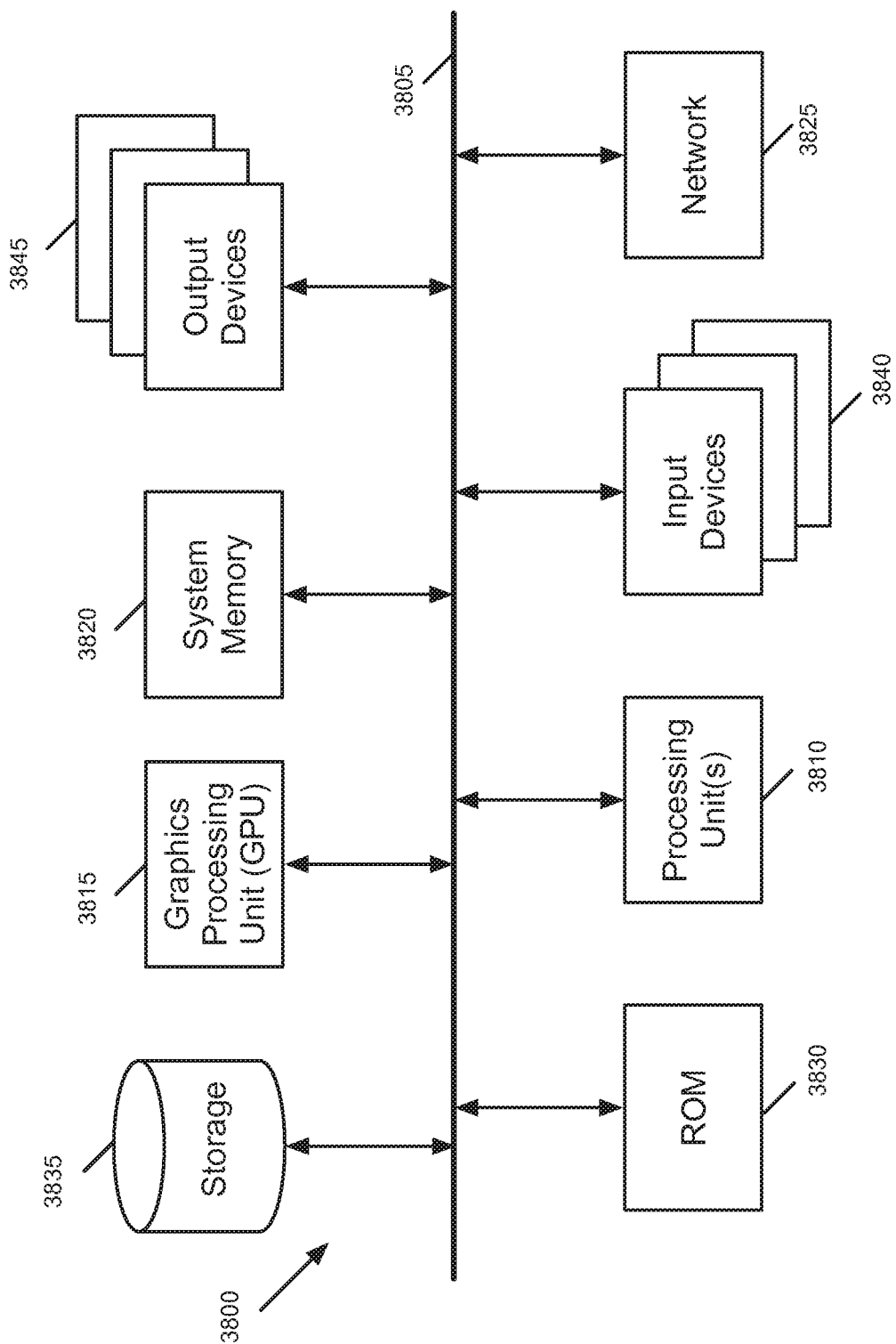
FIG. 38 conceptually illustrates another example of an electronic system with which some embodiments of the invention are implemented.

FIG. 38 conceptually illustrates another example of an electronic system 3800 with which some embodiments of the invention are implemented. The electronic system 3800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3800 includes a bus 3805, processing unit(s) 3810, a graphics processing unit (GPU) 3815, a system memory 3820, a network 3825, a read-only memory 3830, a permanent storage device 3835, input devices 3840, and output devices 3845.

The bus 3805 collectively represents all system, peripheral, and chipset buses that communicatively connect the numerous internal devices of the electronic system 3800.

For instance, the bus 3805 communicatively connects the processing unit(s) 3810 with the read-only memory 3830, the GPU 3815, the system memory 3820, and the permanent storage device 3835.

From these various memory units, the processing unit(s) 3810 retrieves instructions to execute and data to process in order to execute the processes of the invention. The processing unit(s) may be a single processor or a multi-core processor in different embodiments. Some instructions are passed to and executed by the GPU 3815. The GPU 3815 can offload various computations or complement the image processing provided by the processing unit(s) 3810. In some embodiments, such functionality can be provided using CoreImage's kernel shading language.

The read-only-memory (ROM) 3830 stores static data and instructions that are needed by the processing unit(s) 3810 and other modules of the electronic system. The permanent storage device 3835, on the other hand, is a read-and-write memory device. This device is a non-volatile memory unit that stores instructions and data even when the electronic system 3800 is off. Some embodiments of the invention use a mass-storage device (such as a magnetic or optical disk and its corresponding disk drive, integrated flash memory) as the permanent storage device 3835.

Other embodiments use a removable storage device (such as a floppy disk, flash memory device, etc., and its corresponding drive) as the permanent storage device. Like the permanent storage device 3835, the system memory 3820 is a read-and-write memory device. However, unlike storage device 3835, the system memory 3820 is a volatile read-and-write memory, such a random access memory. The system memory 3820 stores some of the instructions and data that the processor needs at runtime. In some embodiments, the invention's processes are stored in the system memory 3820, the permanent storage device 3835, and/or the read-only memory 3830. From these various memory units, the processing unit(s) 3810 retrieves instructions to execute and data to process in order to execute the processes of some embodiments.

The bus 3805 also connects to the input and output devices 3840 and 3845. The input devices 3840 enable the user to communicate information and select commands to the electronic system. The input devices 3840 include alphanumeric keyboards and pointing devices (also called "cursor control devices"), cameras (e.g., webcams), microphones or similar devices for receiving voice commands, etc. The output devices 3845 display images generated by the electronic system or otherwise output data. The output devices 3845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 38, bus 3805 also couples electronic system 3800 to a network 3825 through a network adapter (not shown). In this manner, the computer can be a part of a network of computers (such as a local area network ("LAN"), a wide area network ("WAN"), or an Intranet, or a network of networks, such as the Internet. Any or all components of electronic system 3800 may be used in conjunction with the invention.

Some embodiments include electronic components, such as microprocessors, storage and memory that store computer application instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer application that is executable by at least one processing unit and includes sets of instructions for performing various operations. Examples of computer applications or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 39:
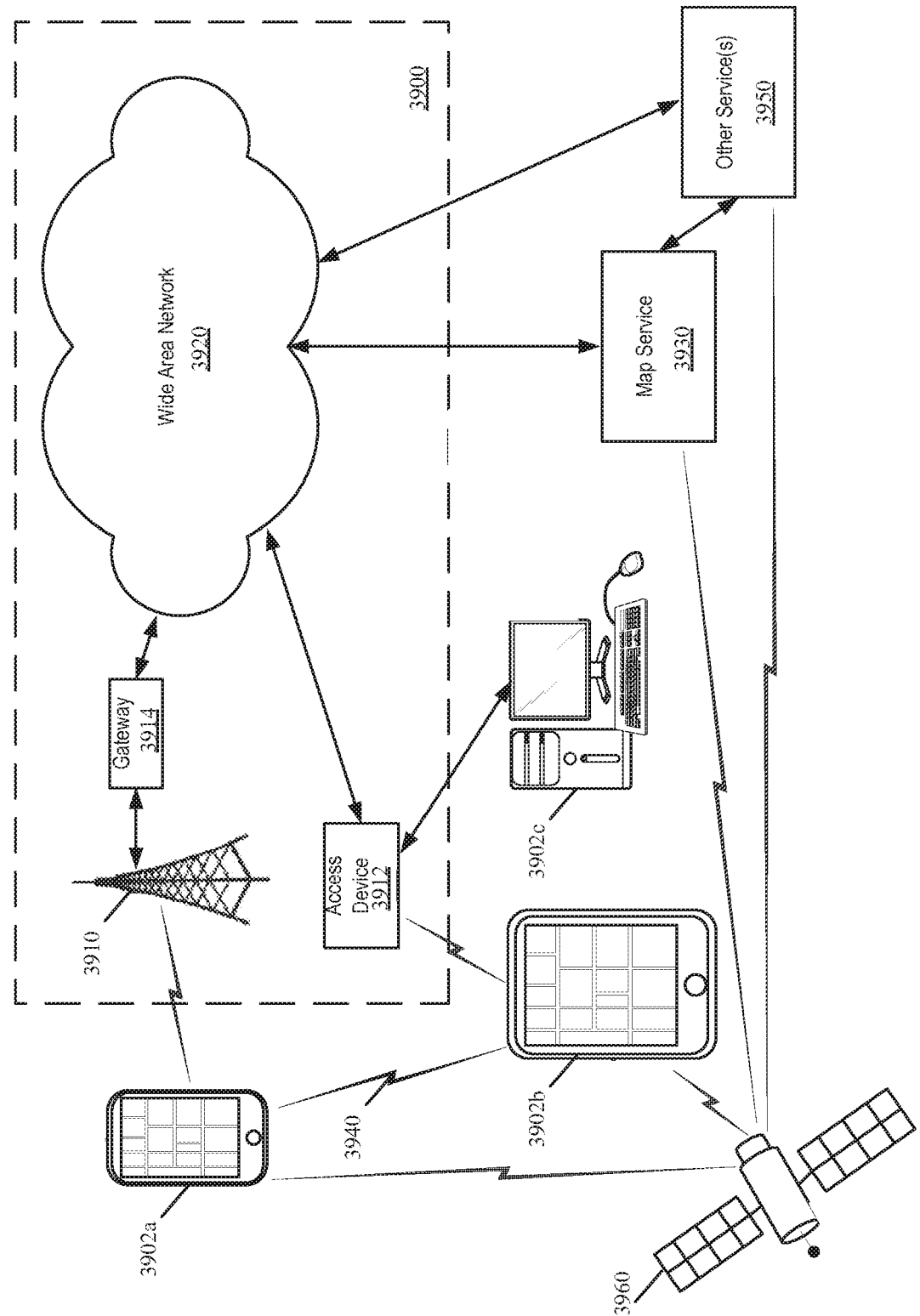
FIG. 39 illustrates a map service operating environment according to some embodiments.

Various embodiments may operate within a map service operating environment. FIG. 39 illustrates a map service operating environment according to some embodiments. A map service 3930 (also referred to as mapping service) may provide map services for one or more client devices 3902a-3902c in communication with the map service 3930 through various communication methods and protocols. A map service 3930 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device is currently located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 3902a-3902c may utilize these map services by obtaining map service data. Client devices 3902a-3902c may implement various techniques to process map service data. Client devices 3902a-3902c may then provide map services to various entities, including, but not limited to, users, internal software or hardware modules, and/or other systems or devices external to the client devices 3902a-3902c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be for a specific maps or portions of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, requests for current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and, as such, the above examples are not intended to be limiting.

Various embodiments of client devices (e.g., client devices 3902a-3902c) are implemented on different portable-multifunction device types. Client devices 3902a-3902c utilize map service 3930 through various communication methods and protocols. In some embodiments, client devices 3902a-3902c obtain map service data from map service 3930. Client devices 3902a-3902c request or receive map service data. Client devices 3902a-3902c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. In some embodiments, the client devices allow the device to adjust the virtual camera display orientation to bias toward the route destination. Some embodiments also allow the virtual camera to navigate turns by simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet, which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 39 illustrates one possible embodiment of an operating environment 3900 for a map service 3930 and client devices 3902a-3902c. In some embodiments, devices 3902a, 3902b, and 3902c communicate over one or more wire or wireless networks 3910. For example, wireless network 3910, such as a cellular network, can communicate with a wide area network (WAN), such as the Internet, by use of gateway 3914. A gateway 3914 in some embodiments provides a packet oriented mobile data service, such as General Packet Radio Service (GPRS), or other mobile data service allowing wireless networks to transmit data to other networks, such as wide area network. Likewise, access device 3912 (e.g., IEEE 802.11g wireless access device) provides communication access to WAN 1160. Devices 3902a and 3902b can be any portable electronic or computing device capable of communicating with a map service. Device 3902c can be any non-portable electronic or computing device capable of communicating with a map service.

In some embodiments, both voice and data communications are established over wireless network 3910 and access device 3912. For instance, device 3902a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 3910, gateway 3914, and WAN 1160 (e.g., using Transmission Control Protocol/Internet Protocol (TCP/IP) or User Datagram Protocol (UDP)). Likewise, in some implementations, devices 3902b and 3902c can place and receive phone calls, send and receive e-mail messages, and retrieve electronic documents over access device 3912 and WAN 1160. In various embodiments, any of the illustrated client devices may communicate with map service 3930 and/or other service(s) 3950 using a persistent connection established in accordance with one or more security protocols, such as the Secure Sockets Layer (SSL) protocol or the Transport Layer Security (TLS) protocol.

Devices 3902a and 3902b can also establish communications by other means. For example, wireless device 3902a can communicate with other wireless devices (e.g., other devices 3902b, cell phones, etc.) over the wireless network 3910. Likewise devices 3902a and 3902b can establish peer-to-peer communications 3940 (e.g., a personal area network) by use of one or more communication subsystems, such as Bluetooth● communication from Bluetooth Special Interest Group, Inc. of Kirkland, Wash. Device 3902c can also establish peer to peer communications with devices 3902a or 3902b (not shown). Other communication protocols and topologies can also be implemented. Devices 3902a and 3902b may also receive Global Positioning Satellite (GPS) signals from GPS satellites 3960.

Devices 3902a, 3902b, and 3902c can communicate with map service 3930 over one or more wired and/or wireless networks, 3912 or 3910. For instance, map service 3930 can provide map service data to rendering devices 3902a, 3902b, and 3902c. Map service 3930 may also communicate with other services 3950 to obtain data to implement map services. Map service 3930 and other services 3950 may also receive GPS signals from GPS satellites 3960.

In various embodiments, map service 3930 and/or other service(s) 3950 are configured to process search requests from any of the client devices. Search requests may include but are not limited to queries for businesses, addresses, residential locations, points of interest, or some combination thereof. Map service 3930 and/or other service(s) 3950 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 3930 and/or other service(s) 3950 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 3930 and/or other service(s) 3950, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 3930 and/or other service(s) 3950 provide one or more feedback mechanisms to receive feedback from client devices 3902a-1602c. For instance, client devices may provide feedback on search results to map service 3930 and/or other service(s) 3950 (e.g., feedback specifying ratings, reviews, temporary or permanent business closures, errors etc.); this feedback may be used to update information about points of interest in order to provide more accurate or more up-to-date search results in the future. In some embodiments, map service 3930 and/or other service(s) 3950 may provide testing information to the client device (e.g., an A/B test) to determine which search results are best. For instance, at random intervals, the client device may receive and present two search results to a user and allow the user to indicate the best result. The client device may report the test results to map service 3930 and/or other service(s) 3950 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A non-transitory machine readable medium storing a program for providing machine-generated physical addresses on a first device of a plurality of devices, the program for execution by at least one processing unit, the program comprising sets of instructions for:

storing location data for the first device in a first data storage over time;

identifying, from the location data, a location where the first device was located for at least a threshold time period;

generating, from the identified location, a machine-generated physical address that is distinct from a first plurality of physical addresses harvested from a plurality of applications executing on the first device, the plurality of applications including a mapping application; and presenting, by a user interface of the mapping application, a traffic notification for traffic along a route to the machine-generated physical address, the traffic notification including a route segment indicator for a route segment of a route to the machine-generated physical address and a traffic level descriptor indicating a traffic level along the route segment.

2. The non-transitory machine readable medium of claim 1, wherein the location data is generated by a location application of the first plurality of applications.

3. The non-transitory machine readable medium of claim 1, further comprising:
by an address harvesting engine of the first device, harvesting the first plurality of physical addresses from the mapping application, and storing the first plurality of physical addresses in a specific harvested address data storage of the first device;
by the address harvesting engine, harvesting a second plurality of physical addresses from a plurality of applications other than the mapping application executing on the first device, and storing the second plurality of physical addresses in a general harvested address data storage; and
synchronizing the specific harvested address data storage and the general harvested address data storage with at least one other harvested address data storage, the at least one other harvested address data storage residing on a second device of the plurality of devices.

4. The non-transitory machine readable medium of claim 3, wherein the specific harvested address data storage stores recently accessed map information.

5. The non-transitory machine readable medium of claim 3, wherein the general harvested address data storage stores one or more of an email address, a telecom address, and a text messaging SMS address.

6. The non-transitory machine readable medium of claim 3, further comprising:
retrieving, by a duplicate processor of the first device, a first address from the specific harvested address data storage and a second address from the general harvested address data storage;
identifying, by the duplicate processor, the first address to be a duplicate of the second address;
discarding the first address; and
supplying the second address to a prediction engine of the first device.

7. The non-transitory machine readable medium of claim 1, further comprising:
causing, by a network synchronizer of the first device, the first device to communicate with a second device of the plurality of devices through a server infrastructure, wherein the server infrastructure is a cloud infrastructure.

8. The non-transitory machine readable medium of claim 1, wherein the first device and a second device of the plurality of devices are associated with a single user account.

9. The non-transitory machine readable medium of claim 1, wherein the first device and a second device of the plurality of devices are designated as owned by a single owner.

10. The non-transitory machine readable medium of claim 1, further comprising:
detecting, by a network synchronizer of the first device, an entry of a new physical address through one of the plurality of applications;
transmitting the new physical address to a second data storage of a second device of the plurality of devices through a server infrastructure using a ubiquitous key value storage mechanism.

11. The non-transitory machine readable medium of claim 1, wherein the plurality of applications includes a communication application, further comprising:
detecting that the communication application is creating a new physical address; and
supplying the new physical address to an address harvester of the first device as the physical address is being created.

12. The non-transitory machine readable medium of claim 1, wherein the program further comprises sets of instructions for:
determining that the first device will travel to the machine-generated physical address within a threshold period of time starting from a current time; and
in response to the determination, presenting the traffic notification.

13. The non-transitory machine readable medium of claim 1, further comprising:
determining a first group of locations at which the device was located for a first period of time;
generating a first destination zone based on the first group of locations;
determining a second location at which the device was located for a second period of time;
generating a second destination zone based on the second group of locations;
storing the first destination zone and the second destination zone in a machine-generated address data storage;
identifying an intermediate location between the first destination zone and the second destination zone;
generating a first association between the first destination zone and the second destination zone based on the intermediate location; and
based on the first association, generating a first route between the first destination zone and the second destination zone.

14. A method of harvesting addresses on a first device of a plurality of devices, the method implemented by a computing device that includes one or more processors and a memory device, the method comprising:
storing location data for the first device in a first data storage over time;
identifying, from the location data, a location where the first device was located for at least a threshold time period;
generating, from the identified location, a machine-generated physical address that is distinct from a first plurality of physical addresses harvested from a plurality of applications executing on the first device, the plurality of applications including a mapping application; and
presenting, by a user interface of the mapping application, a traffic notification for traffic along a route to the machine-generated physical address, the traffic notification including a route segment indicator for a route segment of a route to the machine-generated physical address and a traffic level descriptor indicating a traffic level along the route segment.

15. The method of claim 14, wherein the location data is generated by a location application of the first plurality of applications.

16. The method of claim 14, further comprising:
by an address harvesting engine of the first device, harvesting the first plurality of physical addresses from the mapping application, and storing the first plurality of physical addresses in a specific harvested address data storage of the first device;
by the address harvesting engine, harvesting a second plurality of physical addresses from a plurality of applications other than the mapping application executing on the first device, and storing the second plurality of physical addresses in a general harvested address data storage; and synchronizing the specific harvested address data storage and the general harvested address data storage with at least one other harvested address data storage, the at least one other harvested address data storage residing on a second device of the plurality of devices.

17. The method of claim 16, wherein the specific harvested address data storage stores recently accessed map information.

18. The method of claim 16, wherein the general harvested address data storage stores one or more of an email address, a telecom address, and a text messaging SMS address.

19. The method of claim 16, further comprising:
retrieving, by a duplicate processor of the first device, a first address from the specific harvested address data storage and a second address from the general harvested address data storage;
identifying, by the duplicate processor, the first address to be a duplicate of the second address;
discarding the first address; and
supplying the second address to a prediction engine of the first device.

20. The method of claim 14, further comprising:
causing, by a network synchronizer of the first device, the first device to communicate with the second device through a server infrastructure, wherein the server infrastructure is a cloud infrastructure.

21. The method of claim 14, wherein the first device and a second device of the plurality of devices are associated with a single user account.

22. The method of claim 14, wherein the first device and a second device of the plurality of devices are designated as owned by a single owner.

23. The method of claim 14, further comprising:
detecting, by a network synchronizer of the first device, an entry of a new physical address through one of the plurality of applications;
transmitting the new physical address to the second data storage through the server infrastructure using a ubiquitous key value storage mechanism.

24. The method of claim 14, wherein the plurality of applications includes a communication application, further comprising:
detecting that the communication application is creating a new physical address; and
supplying the new physical address to an address harvester of the first device as the physical address is being created.

25. A system comprising:
one or more processors; and
a non-transitory computer-readable medium including one or more sequences of instructions that, when executed by one or more processors, cause the processors to perform operations comprising:
storing location data for the first device in a first data storage over time;
identifying, from the location data, a location where the first device was located for at least a threshold time period;
generating, from the identified location, a machine-generated physical address that is distinct from a first plurality of physical addresses harvested from a plurality of applications executing on the first device, the plurality of applications including a mapping application; and
presenting, by a user interface of the mapping application, a traffic notification for traffic along a route to the machine-generated physical address, the traffic notification including a route segment indicator for a route segment of a route to the machine-generated physical address and a traffic level descriptor indicating a traffic level along the route segment.

26. The system of claim 25, wherein the location data is generated by a location application of the first plurality of applications.

27. The system of claim 25, further comprising:
by an address harvesting engine of the first device, harvesting the first plurality of physical addresses from the mapping application, and storing the first plurality of physical addresses in a specific harvested address data storage of the first device;
by the address harvesting engine, harvesting a second plurality of physical addresses from a plurality of applications other than the mapping application executing on the first device, and storing the second plurality of physical addresses in a general harvested address data storage; and
synchronizing the specific harvested address data storage and the general harvested address data storage with at least one other harvested address data storage, the at least one other harvested address data storage residing on a second device of the plurality of devices.

28. The system of claim 27, wherein the specific harvested address data storage stores recently accessed map information.

29. The system of claim 27, wherein the general harvested address data storage stores one or more of an email address, a telecom address, and a text messaging SMS address.

30. The system of claim 27, further comprising:
retrieving, by a duplicate processor of the first device, a first address from the specific harvested address data storage and a second address from the general harvested address data storage;
identifying, by the duplicate processor, the first address to be a duplicate of the second address;
discarding the first address; and
supplying the second address to a prediction engine of the first device.

31. The system of claim 25, further comprising:
causing, by a network synchronizer of the first device, the first device to communicate with the second device through a server infrastructure, wherein the server infrastructure is a cloud infrastructure.

32. The system of claim 25, wherein the first device and a second device of the plurality of devices are associated with a single user account.

33. The system of claim 25, wherein the first device and a second device of the plurality of devices are designated as owned by a single owner.

34. The system of claim 25, further comprising:
detecting, by a network synchronizer of the first device, an entry of a new physical address through one of the plurality of applications;
transmitting the new physical address to a second data storage of a second device of the plurality of devices through the server infrastructure using a ubiquitous key value storage mechanism.

35. The system of claim 25, wherein the plurality of applications includes a communication application, further comprising:
- detecting that the communication application is creating a new physical address; and
- supplying the new physical address to an address harvester of the first device as the physical address is being created.

* * * * *